United States Patent [19]
Bloch et al.

[11] 3,937,892
[45] Feb. 10, 1976

[54] ELECTRONIC TIME-DIVISION-MULTIPLEXED PABX TELEPHONE SYSTEM

[75] Inventors: Alan Bloch, New York, N.Y.; Charles B. Falconer, Hamden; David L. Joslow, Harold M. Straube, both of Chester, all of Conn.

[73] Assignee: Chestel, Inc., Chester, Conn.

[22] Filed: Jan. 21, 1974

[21] Appl. No.: 435,318

Related U.S. Application Data

[63] Continuation-in-part of Ser. No. 296,322, Oct. 10, 1972, abandoned.

[52] U.S. Cl. .................... 179/15 AL; 179/15 BY
[51] Int. Cl.[2] .......................................... H04J 3/12
[58] Field of Search ........ 179/15 AL, 15 BF, 15 BY

[56] References Cited
UNITED STATES PATENTS

| | | | |
|---|---|---|---|
| 3,457,373 | 7/1969 | Van Duuren et al. | 179/15 BF |
| 3,564,145 | 2/1971 | Deutsch et al. | 179/15 AL |
| 3,626,100 | 12/1971 | McNeilly et al. | 179/15 AL |
| 3,646,273 | 2/1972 | Nadir et al. | 179/15 BA |
| 3,718,768 | 2/1973 | Abramson et al. | 179/15 BA |
| 3,731,002 | 5/1973 | Pierce | 179/15 AL |
| 3,732,374 | 5/1973 | Rocher et al. | 179/15 AL |
| 3,781,478 | 12/1973 | Blahut et al. | 179/15 AL |
| 3,789,148 | 1/1974 | Ishii | 179/15 AL |
| 3,803,405 | 4/1974 | Ohnsorge et al. | 250/199 |

*Primary Examiner*—Thomas W. Brown
*Attorney, Agent, or Firm*—McCormick, Paulding & Huber

[57] ABSTRACT

A private automatic branch exchange (PABX) telephone system includes a number of stations connected to a transmission cable by appliques. By digital messages sent over a communication line in the cable, in signalling and supervision time slots, the appliques communicate with one another to make and break talking path connections between stations, which talking path connections utilize other time slots of the communication line, and to perform other signalling and supervision functions. A system clock broadcasts timing signals to the appliques over a timing line in the cable, separate from the communication line, to synchronize the operation of the appliques and to define the time slots into which the usage of the communication line is broken. The system clock also maintains traffic on the communication line by detecting the end of each signalling and supervision message and by initiating a new message upon the detection of such end of message. The system clock also may repetitively broadcast some signalling and supervision messages of its own over the communication line. Except for these functions performed by the system clock, the system operates substantially entirely through the appliques and no common or central control equipment is required. Any number of appliques may be incorporated into the system, up to its maximum capacity, by merely connecting the appliques to the transmission cable, with each applique being connectable to the cable at any desired point therealong and being capable of being moved from one point to another to change the physical location of stations without interferring with the operation of the system.

27 Claims, 27 Drawing Figures

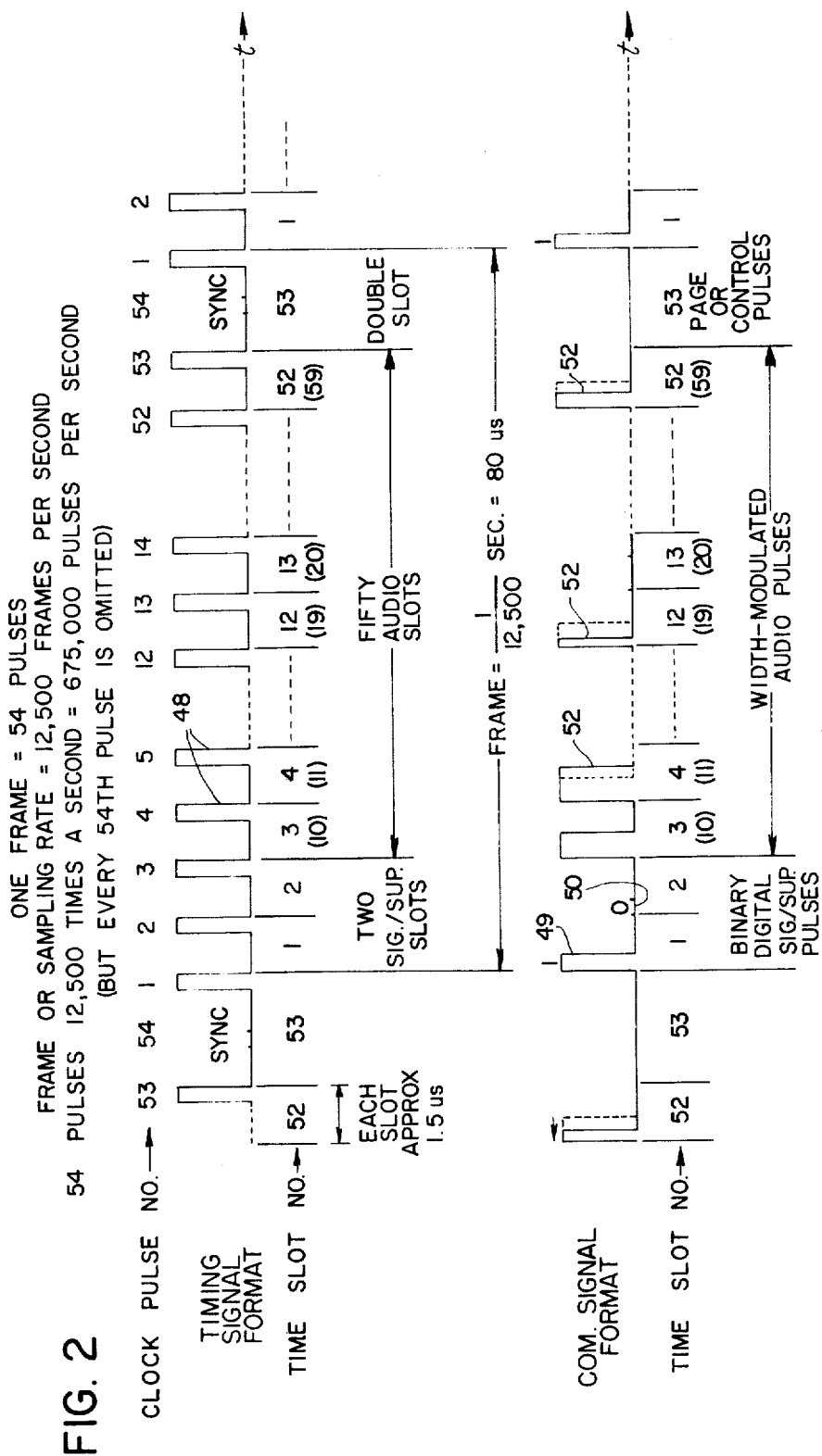

FIG. 9

1. ACCESS CALL REGISTER. IF EMPTY, HEAR DIAL TONE, GO ON.
2. MAKE FIRST ENTRY. DIAL TONE STOPS. IF ENTRY IS A DIGIT, GO ON.
3. IF ENTRY IS "0", JUMP TO STEP 9.
   IF ENTRY IS "1" THROUGH "5", JUMP TO STEP 8.
   IF ENTRY IS "6" THROUGH "9", GO ON.
4. PAUSE, OR MAKE NEXT ENTRY.
   IF PAUSE, JUMP TO STEP 6.
   IF ENTRY, GO ON
5. IF ENTRY IS "*" OR A DIGIT, GO ON.
6. RESTRICTIONS? IF NOT, GO ON.
7. REPERTORY DIALING? IF NOT, JUMP TO STEP 9.
8. MAKE NEXT ENTRY. IF ENTRY IS A DIGIT, GO ON.
9. COMPLETE ENTRY IS CONVERTED TO AN ADDRESS AND PLACED IN CALL DESTINATION REGISTER.

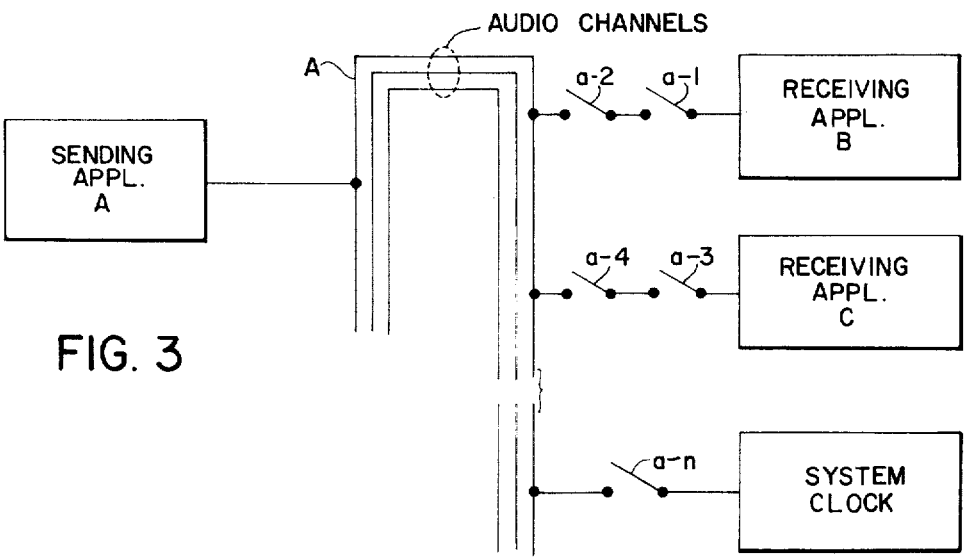

FIG. 3

21. BUSY SIGNAL STOPS, THE CALL IS PLACED, GO ON.

22. IS THE CALL ACCEPTED?  IF NO, JUMP TO STEP 25.

IF YES, GO ON.

23. THE CALLER HEARS AN AUDIBLE RING SIGNAL. IS THE CALL ANSWERED?  IF YES, CALL IS COMPLETED.

IF NO, GO ON.

24. IS BREAK-IN REQUEST SET UP?  IF YES, JUMP BACK TO STEP 22.

IF NO, GO ON.

25. CLEAR ACCESSED CALL REGISTER. IS THERE A FORWARD OF ANY TYPE?  IF NO, CANCEL THE CALL.

IF YES, JUMP BACK TO STEP 20.

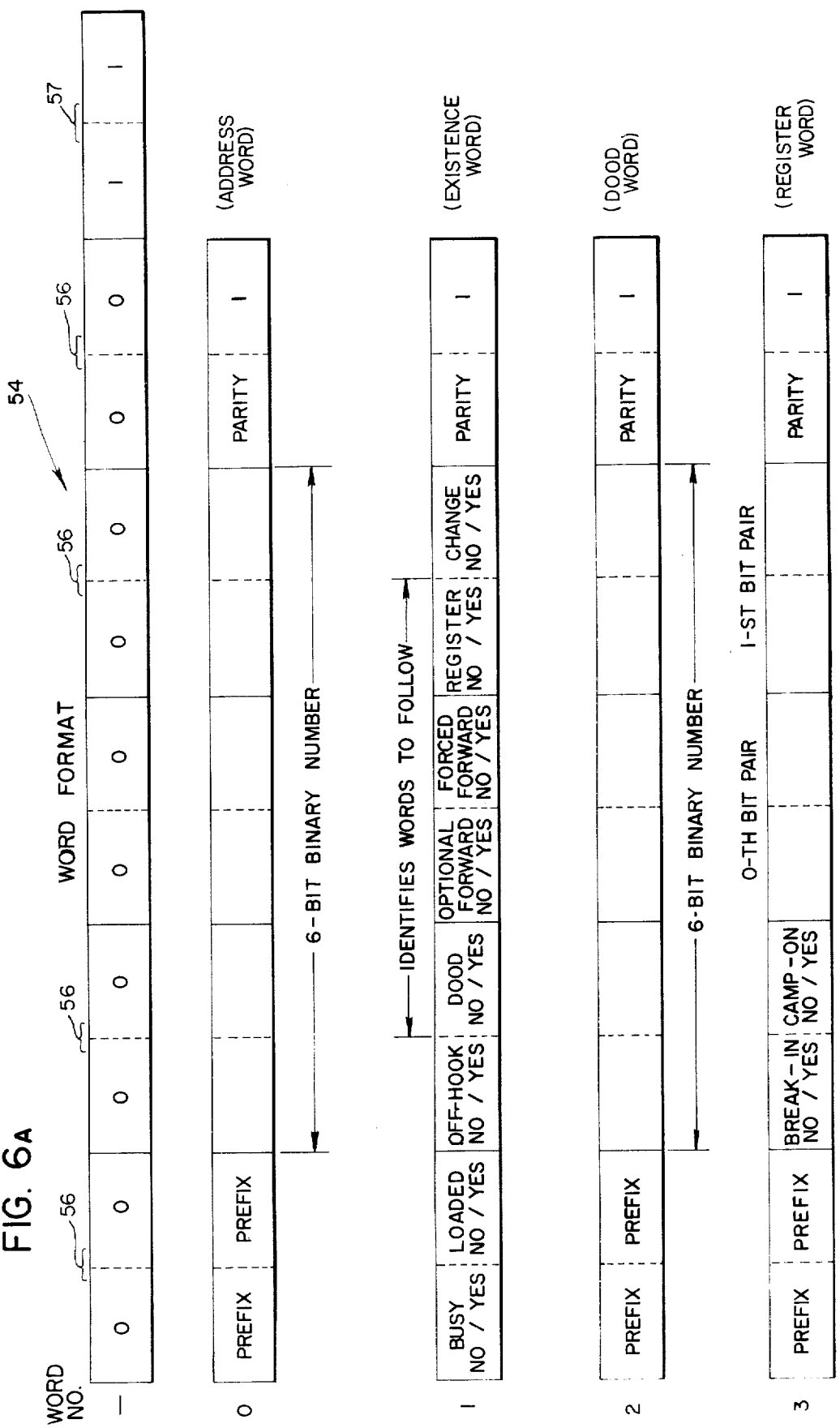

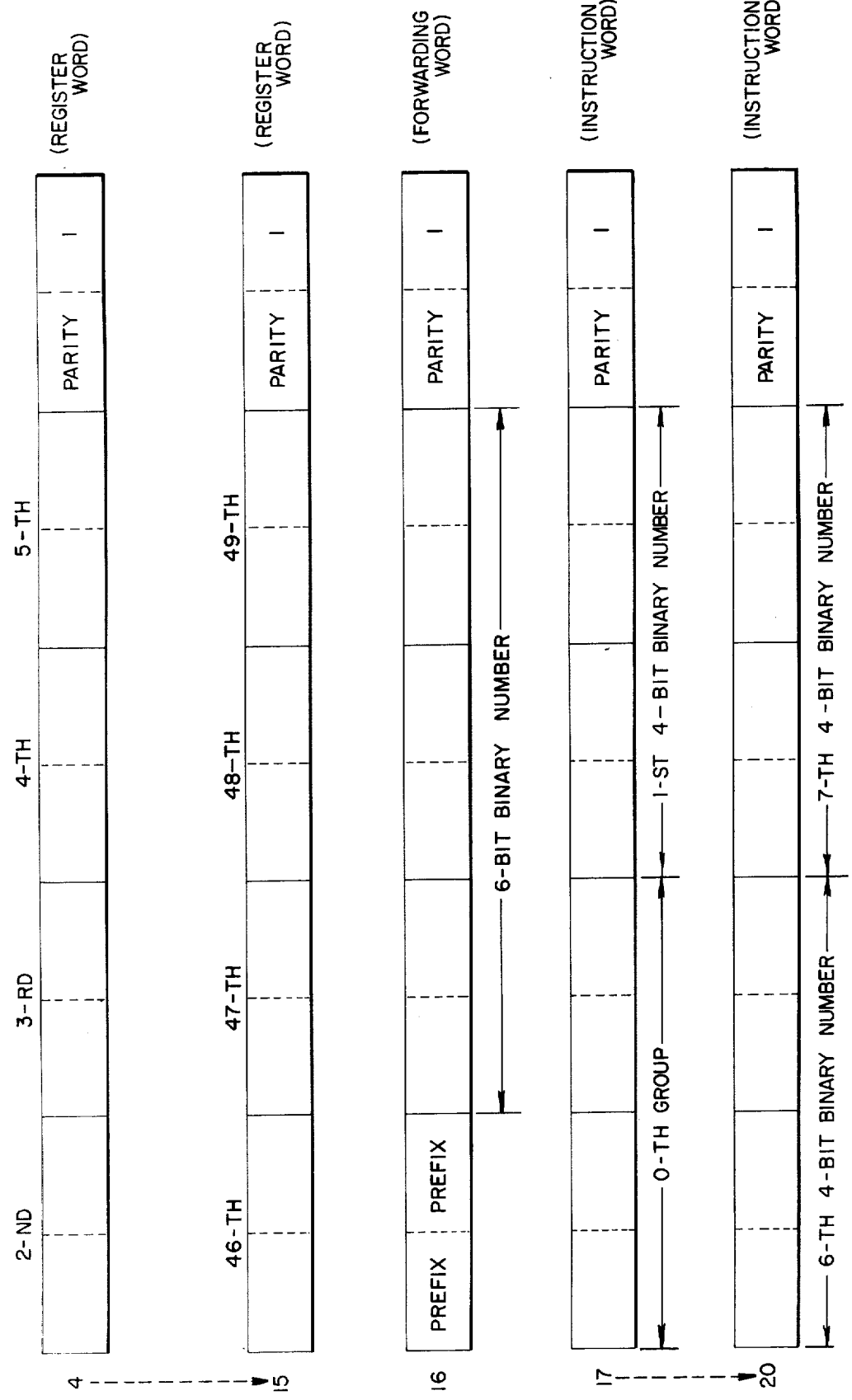

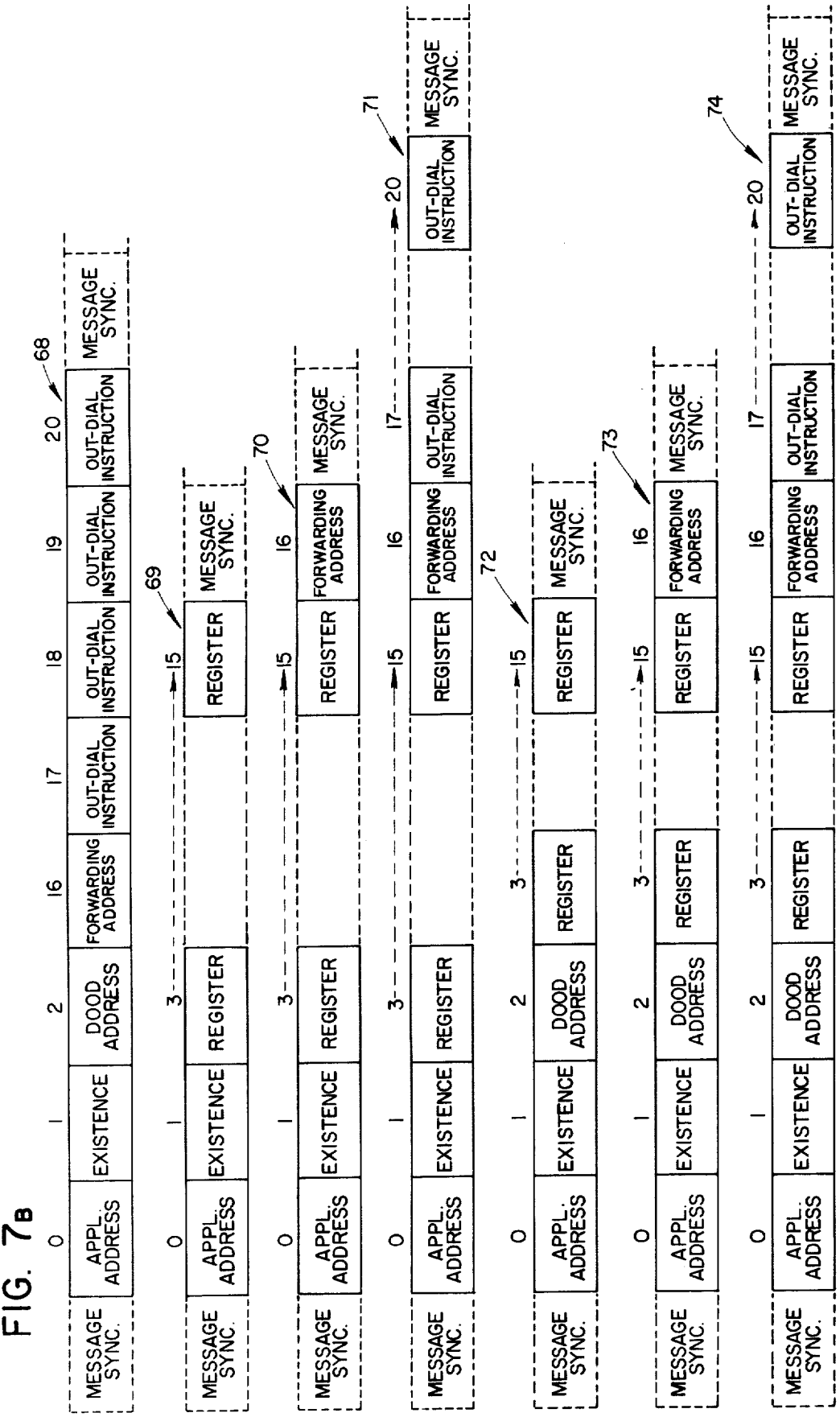

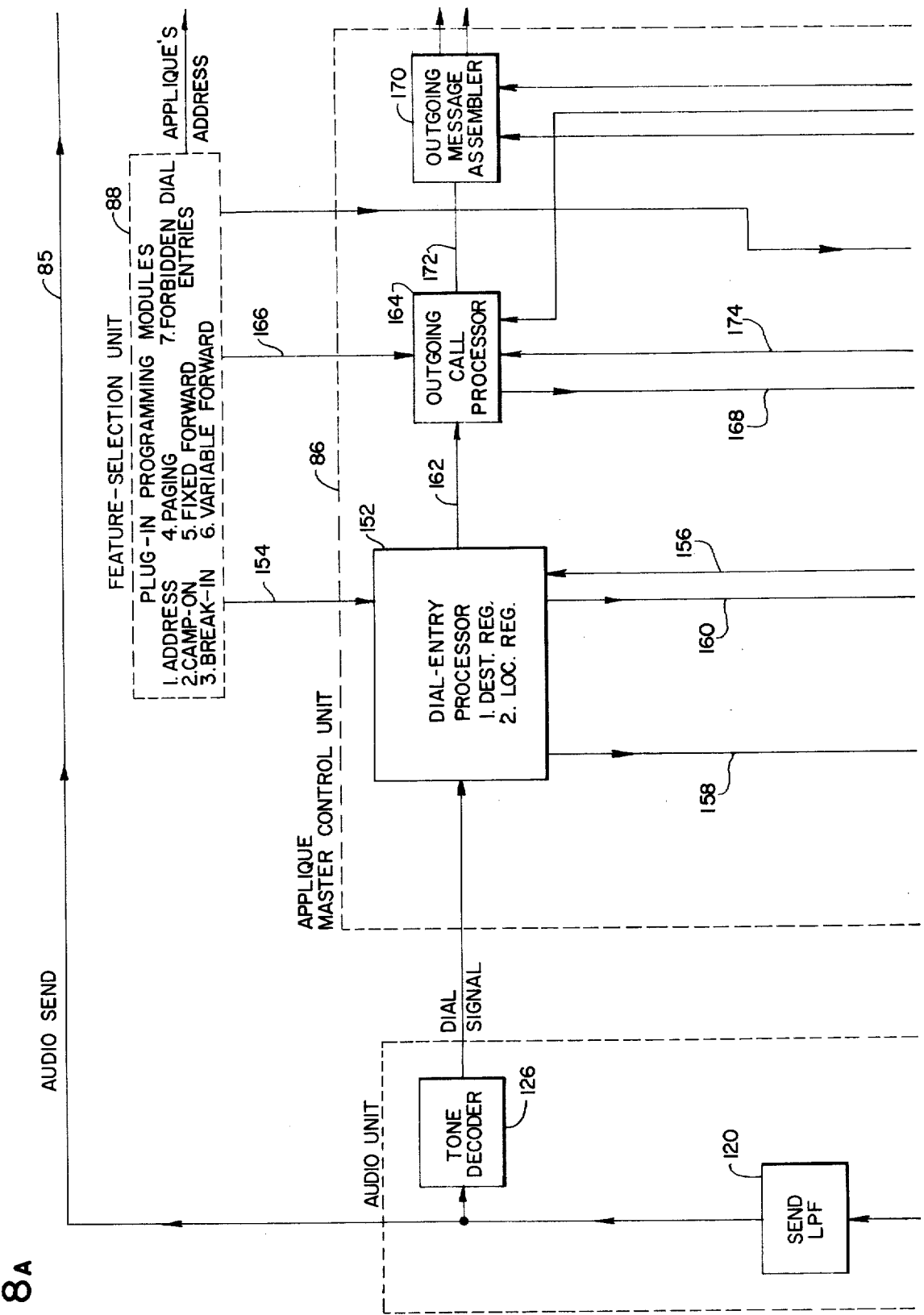

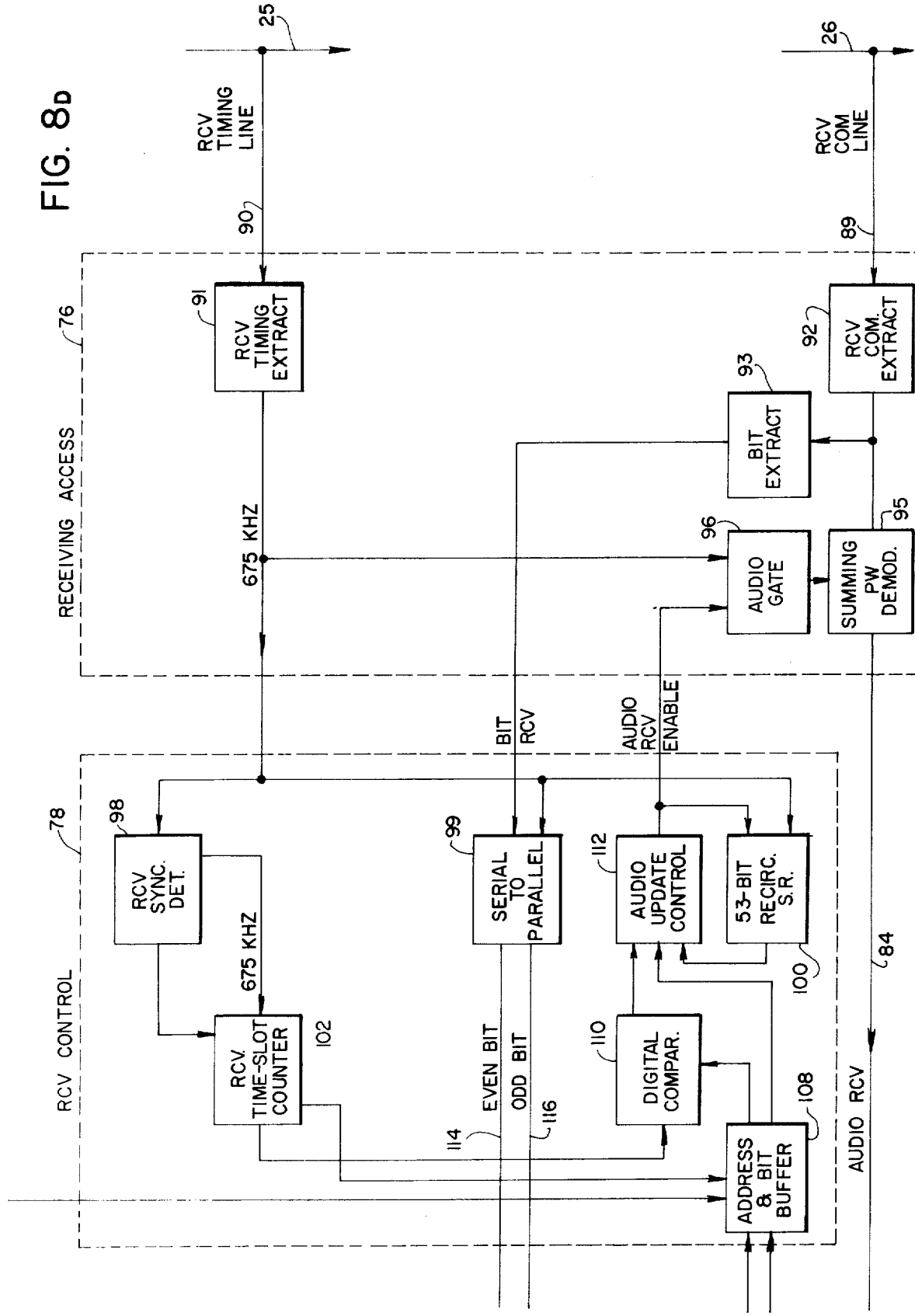

FIG. 10

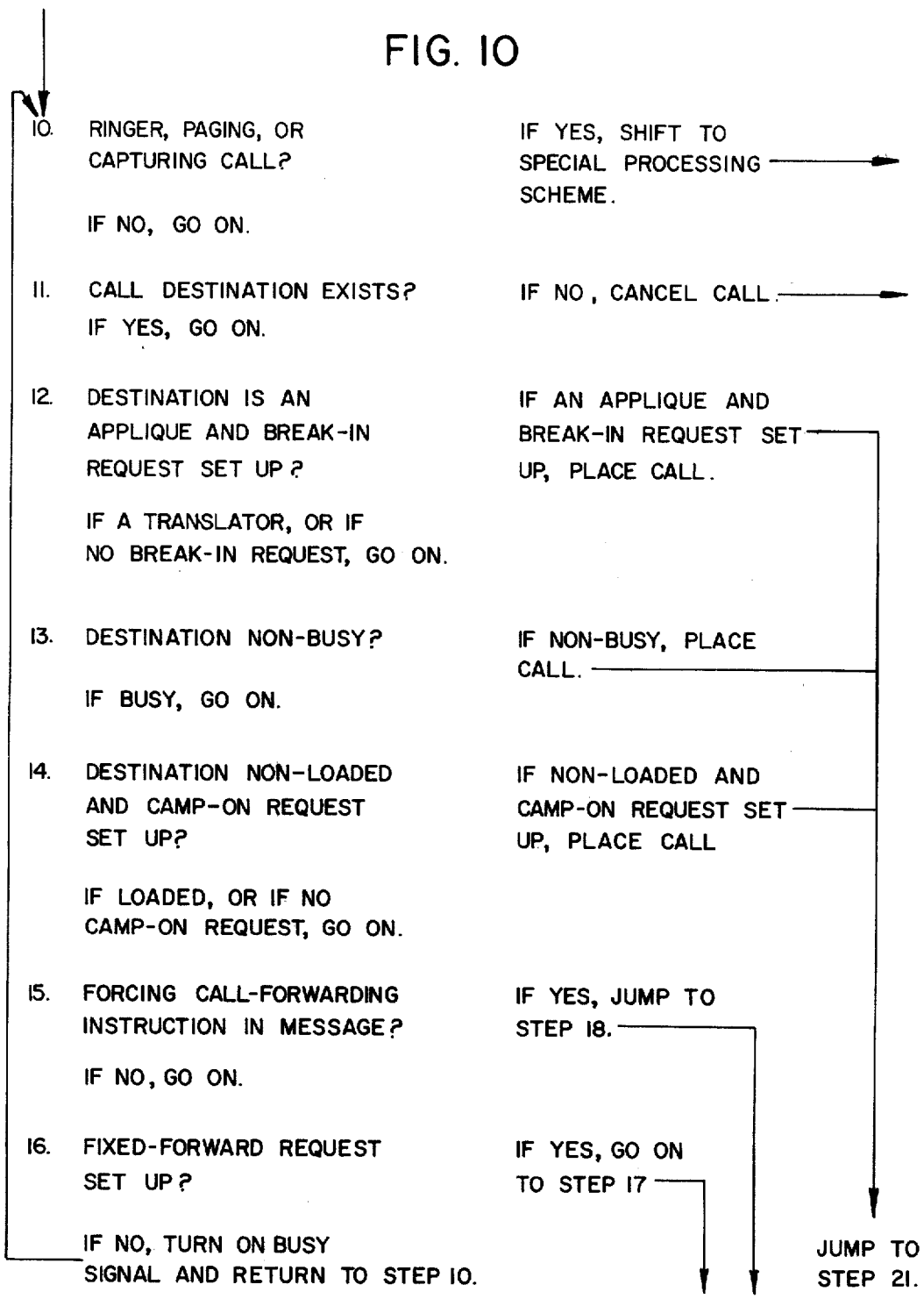

| | | |
|---|---|---|
| 10. | RINGER, PAGING, OR CAPTURING CALL? | IF YES, SHIFT TO SPECIAL PROCESSING SCHEME. |
| | IF NO, GO ON. | |
| 11. | CALL DESTINATION EXISTS? | IF NO, CANCEL CALL. |
| | IF YES, GO ON. | |
| 12. | DESTINATION IS AN APPLIQUE AND BREAK-IN REQUEST SET UP? | IF AN APPLIQUE AND BREAK-IN REQUEST SET UP, PLACE CALL. |
| | IF A TRANSLATOR, OR IF NO BREAK-IN REQUEST, GO ON. | |
| 13. | DESTINATION NON-BUSY? | IF NON-BUSY, PLACE CALL. |
| | IF BUSY, GO ON. | |
| 14. | DESTINATION NON-LOADED AND CAMP-ON REQUEST SET UP? | IF NON-LOADED AND CAMP-ON REQUEST SET UP, PLACE CALL |
| | IF LOADED, OR IF NO CAMP-ON REQUEST, GO ON. | |
| 15. | FORCING CALL-FORWARDING INSTRUCTION IN MESSAGE? | IF YES, JUMP TO STEP 18. |
| | IF NO, GO ON. | |
| 16. | FIXED-FORWARD REQUEST SET UP? | IF YES, GO ON TO STEP 17 |
| | IF NO, TURN ON BUSY SIGNAL AND RETURN TO STEP 10. | JUMP TO STEP 21. |

FIG. 13

| | | |
|---|---|---|
| 11-1. | CAPTURING CALL? | IF YES, JUMP TO STEP 11-7. |
| | IF NO, GO ON. | |
| 11-2. | PLACE CALL DESTINATION ADDRESS IN INSTRUCTION LOCATION REGISTER, GO ON. | |
| 11-3. | RINGER CALL? | |
| | IF YES, TURN ON AUDIBLE RING, GO ON. | |
| | IF NO, GO ON. | |
| 11-4. | ZONE RINGER CALL? | |
| | IF NO, SET UP BREAK-IN REQUEST, GO ON. | |
| | IF YES, GO ON. | |
| 11-5. | CALL REGISTER EMPTY? | IF NON-EMPTY, COMPLETED CALL. |
| | IF EMPTY, GO ON. | |
| 11-6. | BREAK-IN REQUEST SET UP? | IF YES, JUMP BACK TO STEP 11-5. |
| | IF NO, CANCEL CALL, RETURN TO STEP I(b) OF MAIN SEQUENCE. | |

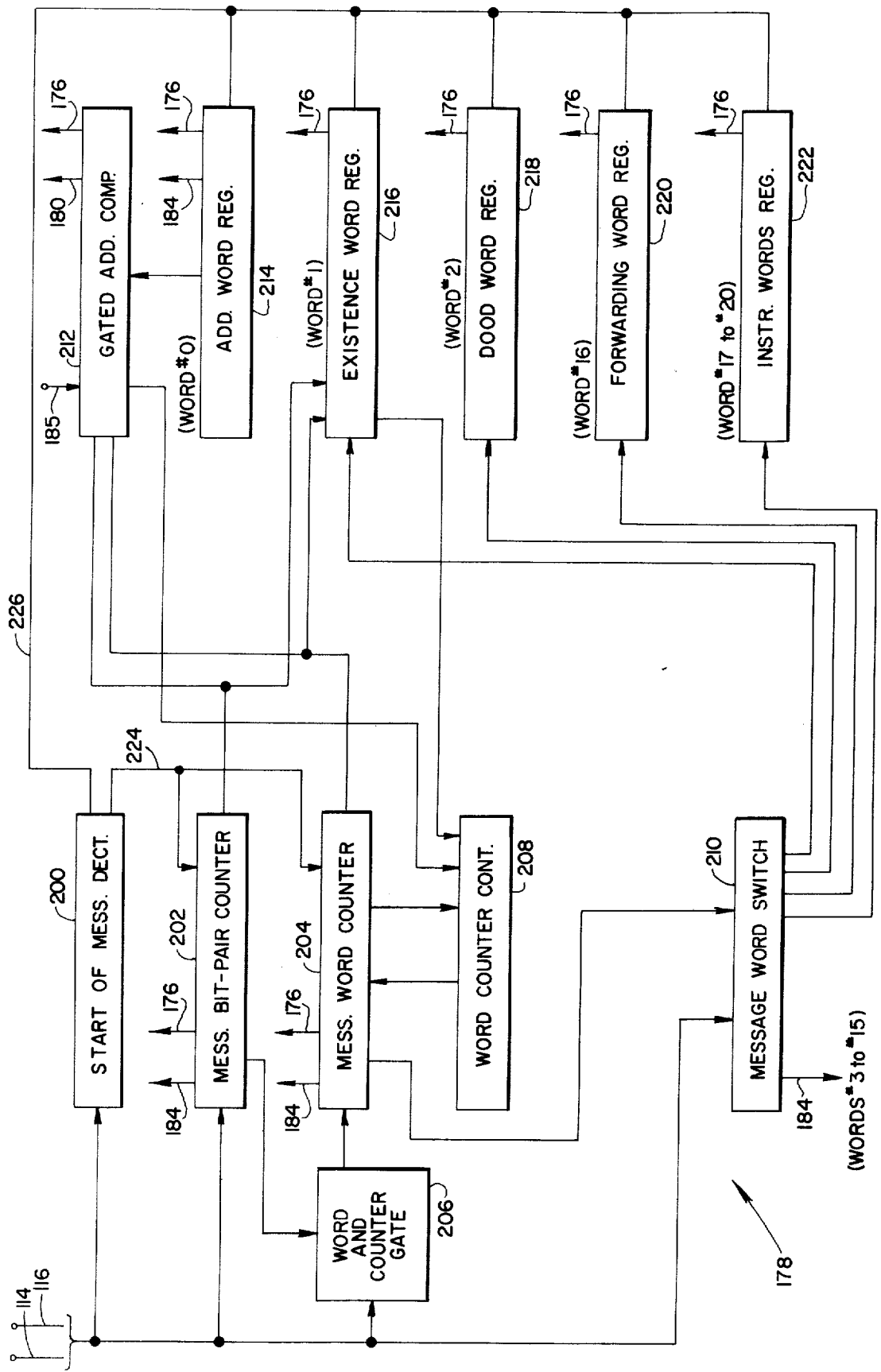

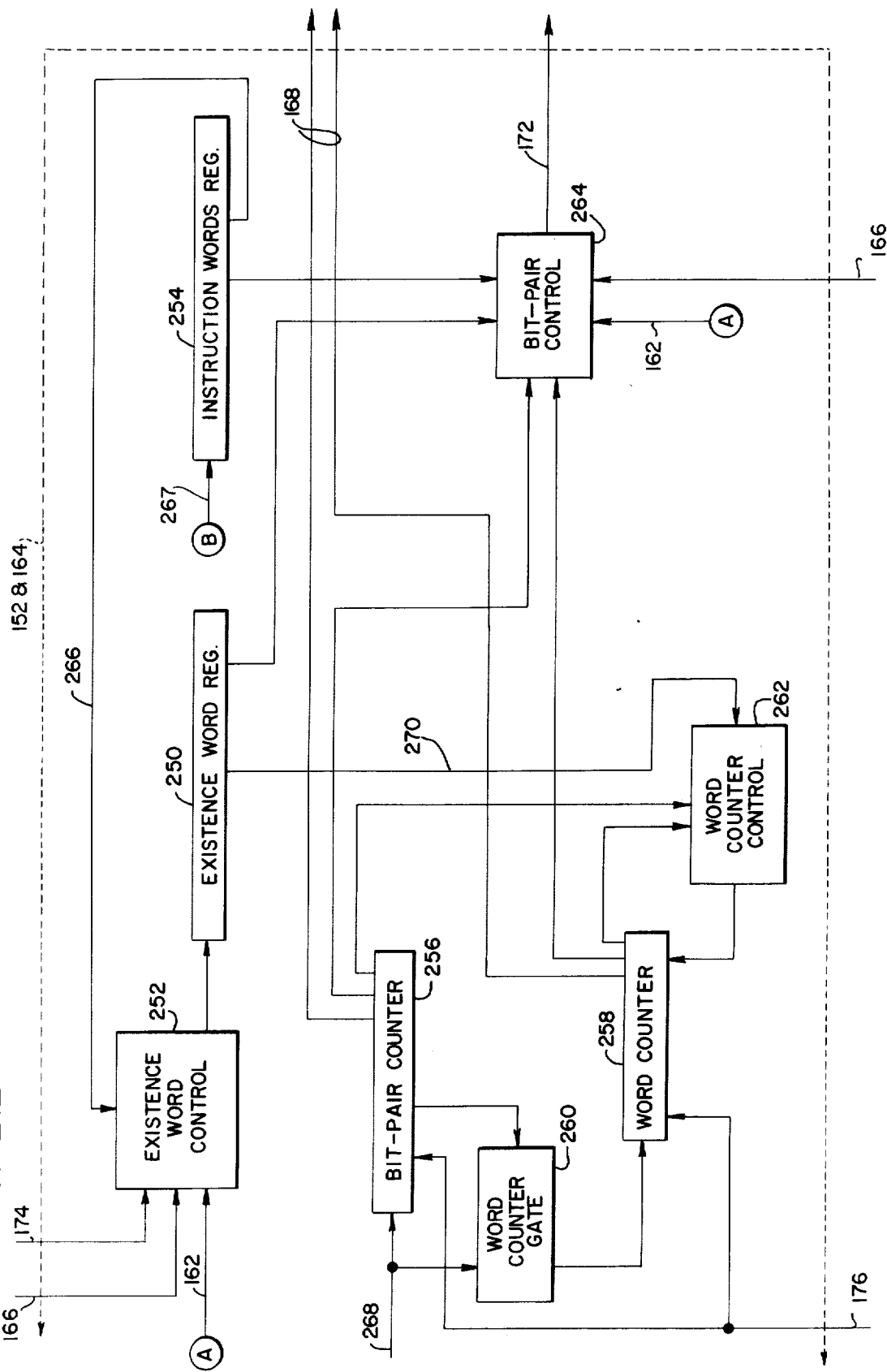

ELECTRONIC TIME-DIVISION-MULTIPLEXED PABX TELEPHONE SYSTEM

CROSS-REFERENCE TO RELATED APPLICATION

This application is a continuation-in-part of application Ser. No. 296,322, filed Oct. 10, 1972, and now abandoned.

BACKGROUND OF THE INVENTION

This invention relates to an electronic time-division-multiplexed private automatic branch exchange (PABX) telephone system, and deals more particularly with such a system which operates essentially without any central or common control and wherein the signalling and supervision functions and the making and breaking of talking path connections are distributed over a number of units, referred to as "appliques", connected to a transmission cable at spaced points therealong and defining stations at which telephones, trunk lines or other pieces of equipment are interfaced with the system.

A PABX is an on-premises telephone system, usually of relatively small size in comparison to telephone company exchanges, intended to service a limited number of stations as found, for example, within a business office or manufacturing plant. Generally, such a system automatically provides for the making and breaking of connections between the various stations of the system and between the stations of the system and one or more trunk lines to the outside world without the need for a switchboard or switchboard operator, although an attendant or operator may often be used to process special calls, such as outgoing and incoming trunk calls.

In the past PABXs have conventionally included central or common control units to which all of the stations of the system are connected by individual lines, the switching equipment for making connections between the various stations and most other major parts of the system, except for the telephones, being part of the common control. As a general practice, present common control units are constructed to service a given maximum number of stations, for example, one hundred stations, and for each potential station, whether used or not, includes a substantial amount of switching equipment exclusively assigned to such station. Therefore, when a common control is used with less than its maximum number of stations, a substantial part of it remains unused and the cost of the system per installed line may become quite high for a system having a number of installed stations considerably less than the maximum number permitted by the common control. Also, the necessity in a conventional PABX system of running individual lines from each subscriber station to the common control makes installation of such a system expensive both in the amount of materials and installation time required, and since the common control is a relatively complex piece of equipment, maintenance is difficult and requires the services of a high skilled technician.

The general object of this invention is to provide a PABX system by means of which the installed cost per line or per subscriber station of the system may be substantially reduced in comparison to coventional PABX systems. This object is achieved by, among other things, eliminating the common control equipment and distributing the switching and signalling and supervision functions of the system throughout a number of appliques each serving an individual station, with the result that only a number of appliques equal to the desired number of stations need be provided with no equipment remaining unused. Also, the appliques are connected to a single transmission cable, containing a relatively low number of conductors, which run from one station to the next so as to reduce installation and/or rearrangement labor and material expense to a minimum.

Another object of the invention is to provide a PABX system which may be selectively adapted, at little expense, to provide a large number of customer service features, some of which are usually not available in conventional PABX systems, such features being, for example, camp-on, fixed forward call transfer, variable forward call transfer, grade of service variation, break-in capability, zone or universal ringing, paging and repertory dialing.

Still another object of the invention is to provide a PABX communication system of the foregoing character made up essentially of semiconductor elements and electronic circuits capable in large part of being reduced to integrated circuit components.

Other objects are to provide a PABX communication system having low initial capital and installation costs, flexibility of growth and features, requiring a minimum of maintenance, of small size, having low power consumption and wherein rearrangement of the telephones can be carried out by the average user without requiring the services of a skilled technician.

Other more detailed objects of the invention will be apparent from the following description of the preferred embodiment of the invention.

In the system illustrated herein a multiconductor cable is described as the transmission medium. However, it should be understood that in its broader aspects the invention is not limited to use with such a cable and instead other types of linear transmission media may be employed. Also, in the illustrated system the timing and communication signals are transmitted on separate lines, but this is not necessary to the broader aspects of the invention, the invention embracing the possibility of transmitting the timing signals and the communication signals on the same line.

SUMMARY OF THE INVENTION

This invention resides in a PABX telephone system comprising a lineal transmission medium, such as a cable, a number of station defining appliques connected to the transmission cable at spaced points along the length thereof and a timing signal generator referred toas a system clock. The transmission cable includes a timing line and a communication line. Each of these lines originates at the system clock and proceeds from the system clock to the end of the cable. At the end of the cable, it reverses direction and proceeds from the end of the cable back to the system clock at which it is terminated. Each line, therefore, as viewed from the system clock, has one outgoing leg and one returning leg. The system clock has a timing generator which transmits timing pulses to the outgoing leg of the timing line for timing the operation of the appliques. Communication signals are transmitted over the communication line between the various appliques and the system clock. The usage of the communication line, through the action of the timing pulses, is divided into repetitive frames each divided into a number of individual time slots. A majority of the time slots of each frame are slots, referred to as audio time slots, used to provide time-division-multiplexed voice communication capability between the various appliques. A smaller number of time slots are slots, referred to as signalling and supervision time slots, used for handling signalling and supervision messages transmitted to the appliques. The system clock includes a means for initiating signalling and supervision messages to the appliques and the appliques in turn complete the messages to indicate to all other appliques their present condition, and by the interexchange of such messages, the appliques operate to establish talking paths between themselves, such talking paths utilizing audio time slots in which the voice signal is transmitted by modulated pulses.

The transmission cable includes regenerators at spaced points along its length to reshape both the timing signals and the communication signals and to cause both to flow in unison along the timing and communication lines in one direction only. The distance between the regenerators, and the impedance of the line terminations made thereat, is such that any signal reflected from a regenerator terminal and arriving at an applique terminal with such time delay as to possibly produce crosstalk or timing problems is of sufficiently low amplitude as to avoid such crosstalk or timing problems.

Each applique includes a communication receiving terminal through which communication signals, both signalling and supervision signals and audio signals, are extracted from the communication line and a communication sending terminal through which communication signals are injected onto the communication line. With regard to the direction of signal flow over the communication line, all of the sendig terminals of the appliques, as a group, are connected to the communication line in advance of the receiving terminals so that a message injected onto the communication line by any applique passes the receiving terminals of all appliques, and is, therefore, made available to all appliques, before reaching the system clock where it is terminated.

Also, each applique includes a sending timing circuit operating in conjunction with a circuit for injecting signals onto the communication line for identifying the timing slots, and a receiving timing circuit operating in conjunction with a circuit for extractig signals from the communication line for also identifying the timing slots. The sending timing circuit is responsive to the timing pulses and is connected to the timing line at the same point as that at which the sending terminal is connected to the communication line. Likewise, the receiving timing circuit is responsive to the timing pulses and is connected to the timing line at the same point as that at which the receiving terminal is connected to the communication line. Therefore, although the various sending and receiving terminals of the various appliques are located various distances from one another along the communication line, and although the messages traveling over the communication line are subject to propagation delay so that any bit of information on the communication line does not appear at all terminals at precisely the same time, the identification of the time slots of the communication signal at each communication line terminal remains accurate since the timing pulses move in parallel with the communication signals and at any point along the timing line have the same propagation delay as has the communication signal at the corresponding point of the communication line, and since at each communication terminal the time slots of the communication line are identified by timing pulses taken from the corresponding point of the timing line.

BRIEF DESCRIPTION OF THE DRAWINGS

FIG. 2 is a diagram showing the format of the timing and communication signals used in the system of FIG. 1.

FIG. 3 is a block diagram showing the functional equivalent of the flow path of an audio signal transmitted from one sending applique to a number of receiving components in the system of FIG. 1.

FIGS. 6a and 6b, when assembled as shown in FIG. 15, form a single figure, referred to herein as FIG. 6, which is a diagram showing the format of the different words used in the signalling and supervision messages used in the system of FIG. 1.

FIGS. 7a and 7b, when assembled as shown in FIG. 16, form a single figure, referred to herein as FIG. 7, which shows the format of the different signalling and supervision messages used in the system of FIG. 1.

FIGS. 8a, 8b, 8c and 8d, when assembled as shown in FIG. 17 form a single figure, referred to herein as FIG. 8, which is a block diagram of one of the line appliques of the system of FIG. 1.

FIGS. 9, 10, 11, 12, 13 and 14, are diagrams showing the steps involved in the processing of outgoing call originating dial entries to an applique of the system of FIG. 1.

FIG. 15 is a view showing the manner in which FIGS. 6a and 6b are assembled to form FIG. 6.

FIG. 16 is a diagram showing the manner in which FIGS. 7a and 7b are assembled to form FIG. 7.

FIG. 17 is a view showing the manner in which FIGS. 8a, 8b, 8c and 8d are assembled to form FIG. 8.

FIG. 19 is a block diagram showing further details of the incoming message distributor of FIG. 8.

FIG. 21a and FIG. 21b, when assembled with FIG. 21a at the left and FIG. 21b at the right, form a single figure, referred to herein as FIG. 21, showing further details of the dial-entry processor and of the outgoing call processor of FIG. 8.

DESCRIPTION OF THE PREFERRED EMBODIMENT

General Organization

Figure 1:
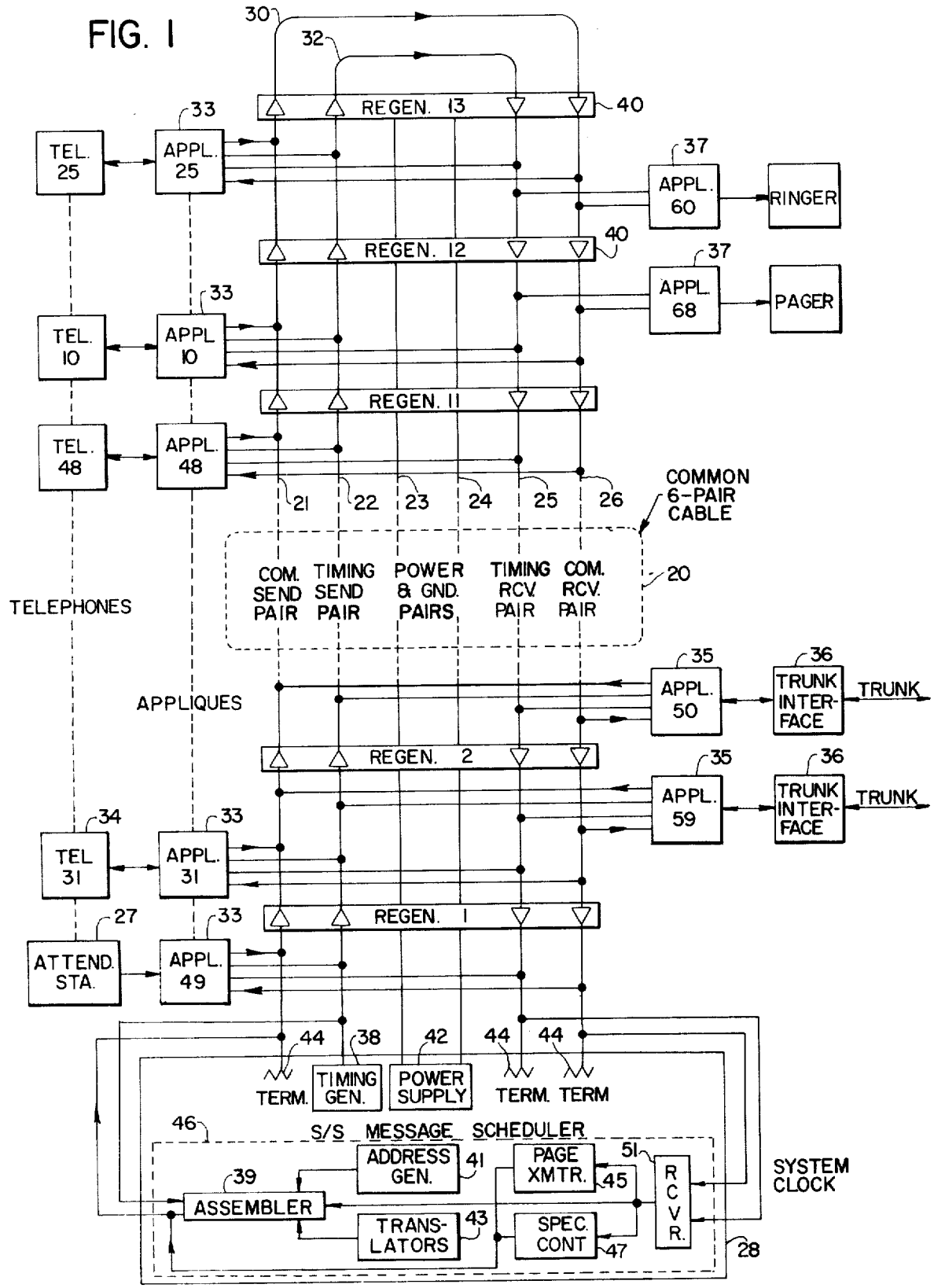
FIG. 1 is a drawing showing in block diagram form a complete communication system embodying this invention.

FIG. 1 is a block diagram showing schematically the basic arrangement of a PABX communication system embodying this invention. Referring to this figure, the illustrated system uses a single transmission cable 20 containing six lines 21, 22, 23, 24, 25 and 26, each of which is in turn comprised of a pair of conductors. This cable may be a standard inside wiring cable, and may, for example, be a multiconductor flat cable to which the required connections are made by quick connecting solderless tapping terminals which are readily applied to the cable with little effort. At one end of the cable, which may be considered to be its inner or home end, is a system clock 28. At the outer end of the cable, the line 21 is connected to the line 26, thereby forming a single continuous line, indicated by the reference numeral 30, of loop configuration which starts from the system clock 28, proceeds to the outer end of the cable and then returns to the system clock, the line 21 being the outgoing leg of the line 30 and the line 26 being the return leg of the line 30. Likewise, at the outer end of the cable, the line 22 is connected to the line 25 to form a single continuous looped line 32 of which the line 22 is the outgoing leg and the line 25 the return leg.

Connected with the transmission cable 20 are a number of appliques which define the various stations of the system. The largest number of appliques are appliques 33, 33 of a type used to connect telephones 34, 34 to the system and are referred to as "line" appliques. The telepones are touch-dial instruments with twelve key touch-dial pads. A typical system also usually includes a smaller number of appliques 35, 35, referred to as "trunk" appliques, used to tie the system to a telecommunications network, or to other systems outside the PABX, by way of trunk interface units 36, 36. Still further, a system may include one or more appliques 37, 37, referred to as "dummy" appliques, for tying to the system other pieces of equipment, such as paging or ringing units, which do not require two-way talking path connections with other appliques. The dummy appliques do not originate any traffic on the communication line and, therefore, appear silent to the remainder of the system. Also, one or more of the line appliques may be used to service an attendant's station 27 through an accessory interface to a single telephone having a 12-key dial or touch-dial pad, pickup keys (one for each applique), and a hold button. Or, when required, a special attendant's console, with more sophisticated displays, can be interfaced.

The number and mix of appliques may be varied widely to suit the particular needs of the system user. Furthermore, a system utilizing the broader aspects of the invention may be made to be either blocking or non-blocking. As will be evident hereinafter, the illustrated system is a non-blocking system wherein each line applique and trunk applique has exclusively assigned to it one of the audio time slots of the time-division-multiplexed communication signal. Therefore, the maximum number of line and trunk appliques is limited to the number of audio time slots of the communication signal. By way of example, the illustrated system uses a communication signal with fifty audio time slots which limits the system to a total of fifty line and trunk appliques. FIG. 1 shows the system with such maximum number appliques, there being forty line appliques assigned station numers 10 to 49 and ten trunk appliques asssigned station numbers 50 to 59. The dummy appliques 37, 37 do not require the exclusive assignment thereto of an audio time slot and, therefore, a variable number of these appliques may be included in the system regardless of the number of line and trunk appliques used. Of course, the system may use a lesser number of line and trunk appliques than the number of audio time slots made available in the communication signal. Also from FIG. 1 it should be noted that as to their station numbers, the line and trunk appliques need not appear in any particular sequence along the cable 20. That is, although each applique has a particular station number assigned to it, such applique may be attaced to the cable 20 at any desired point regardless of the points at which other appliques are attached. The assignment of a station number of an applique is preferably accomplished through the use of a circuit board or other module capable of being plugged into the remainder of the applique. Other plug-in modules may also be used to assign the applique a particular grade of service and various service features.

As an alternative to the system being non-blocking with each applique exclusively associated with one of the time slots of the communication signal, as in the illustrated case, it could include a means for assigning time slots to the appliques as required. With such a slot assignment means available, the system could be made to include a much larger total number of line and trunk appliques than the number of available audio time slots. Such a system would be a blocking system since under conditions of heavy system usage, some of the appliques might temporarily be blocked from establishing a connection with another applique because of all the audio time slots being assigned to other appliques.

The system clock 28 includes a timing generator 38 which transmits timing pulses onto the line 32, referred to as the "timing" line. As explained in more detail hereinafter, the pulses produced by the timing generator serve to divide time into repetitive frames with each frame including a number of divisions or time slots. The line 30, referred to as the "communication" line, transmits communication signals between the various appliques and the system clock. Through the action of the timing signals produced by the timing generator 38 and appearing on the line 32, the usage of the communication line 30 is divided into the aforesaid repetitive frames of time slots. As far as the usage of the communication line 30 is concerned, some of the time slots of each frame are used to transmit signalling and supervision signals and other time slots are used to transmit audio signals. For convenience, the communication made available by the time slots assigned to the signalling and supervision signals is sometimes hereinafter referred to as the "signalling and supervision channel" or "SS channel", and the communication channels made available by the time slots assigned to the audio signals are sometimes referred to as the "audio channels". Also, one or more time slots of each frame may be used to transmit audio signals to paging units and/or to transmit special control signals, such as a signal to disable a malfunctioning applique, to the appliques, and the communication channel made available by such slots is sometimes referred to herein as the "paging and special control channel". The audio signals appearing in the audio time slots may be modulated in accordance with any well-known method of pulse modulation used in conventional time-division-multiplexed systems, such as pulse amplitude modulation, pulse width modulation, pulse position modulation, pulse code modulation or delta modulation. By way of example, pulse width modulation is hereinafter shown as the type of modulation used in the illustrated system.

Still with reference to FIG. 1, one-way movement of the timing and communication signals over the lines 30 and 32 is obtained by a number of signal regenerators 40, 40 inserted at appropriate intervals along the cable.

These regenerators dictate one-way transmissions therethrough in the directions indicated in FIG. 1, and they also serve to reshape the communication and timing signals. That is, by the time the communication and timing signals reach a particular regenerator, they may have become slightly degenerated. The regenerator receives these degenerated signals, reshapes them to their original form and launches them on the following sections of the communication and timing lines. Since all of the information transmitted over the communication and timing lines is in the form of pulses, the regenerators need not be complex linear repeaters of the type which faithfully reproduce amplitude but rather they can be merely simple pulse regenerators that square-up the edges of the received pulses and re-launch them at approximately standard amplitude.

As a signal reaches a regenerator terminal, a certain portion of it is reflected backwardly along its line, and due to propagation delay, it is possible that such reflected signal might become so delayed as to overlap the active or signal carrying portion of an adjacent time slot and cause crosstalk or switching problems. This can be avoided by properly selecting various related parameters, including the duration or length of the time slots, the portion of each slot devoted to actively carrying a signal and the portion devoted to providing a guard space between its active portion and the active portion of the adjacent slot, the impedance mismatch present at the regenerator/line terminals, the spacing between the regenerators, and the type of modulation used. For example, if the transmission medium is a typical telephone wiring cable and the modulation is pulse width modulation utilizing approximately 1.5 microsecond time slots, and if the guard space between the trailing edge of a fully-modulated signal pulse and the trailing edge of an adjacent unmodulated pulse is approximately 1 microsecond, and practical impedance mismatches of 5 to 10% are permitted at the regenerator/line terminals, then the regenerators should be spaced from one another by maximum spacings of about 200 feet in a long system (about 2600 feet or greater) if 70 dB or greater crosstalk loss between voice channels is to be realized. Of course, it should be understood that different maximum spacings between the regenerators may be used, and will allow the attainment of acceptable crosstalk levels if other types of modulation are used or if other ones of the parameters mentioned above are changed. In general, as the overall length of the system is reduced, somewhat greater spacings between the regenerators can be used.

The two lines 23 and 24 of the transmission cable 20 are power and ground pairs which carry power to the signal regenerators 40, 40, to the appliques and to the trunk interfaces. In long systems, one or more additional pairs may be paralleled with the pairs 23 and 24 to avoid undue voltage drop along these power and ground pairs. In FIG. 1 the connections between the power lines 23 and 24 and the appliques and the trunk interfaces have been omitted for clarity.

As mentioned, the system clock includes a timing generator 38 which produces timing pulses transmitted to the appliques over the timing line 32. In addition to this, the system clock also includes a power supply 42 for the power lines 23 and 24 and terminating networks 44, 44 connected to the sending leg 21 of the communication line and to the receiving legs 25 and 26 of the timing and communication lines for terminating the signals moving into such networks. Also, the system clock includes an assembly, referred to as a signalling and supervision message scheduler 46, which controls and schedules signalling and supervision message traffic on the SS channel of the communication line 30 and which also injects paging signals and special control signals onto the paging and special control channel of the communication line 30. The message scheduler 46 includes a number of units which, as shown in general by the block diagram of FIG. 1, includes an assembler 39, an address generator 41, a translator unit 43, a paging transmitter 45, a special control unit 47 and a receiver 51.

As to its function of controlling and scheduling message traffic on the SS channel of the communication line, the message scheduler 46 initiates messages sent in sequence from each line and trunk applique to all other appliques to provide for an interchange of information among the appliques concerning their present status. Each such message initiation consists of an address word, produced by the address generator 41 and injected onto the SS channel of the communication line by the assembler 39, addressed to a particular applique. The addressed applique, if present in the system, adds additional information, indicative of its current status, to the address word to complete a message which is then receivable by all of the appliques as a result of its passage past the communication receiving terminals of all the appliques. When the receiver 51 detects the end of one message, it initiates a new message by causing the assembler 39 to inject a new address word, taken from the address generator 41, onto the SS channel of the communication line. The address generator 41 includes a list of address words, one for each potential line and trunk applique of the system, which list is repetitively run through in sequence so that periodically each line and trunk applique is addressed by its characteristic address word appearing on the SS channel of the communication line. The address words may, therefore, be considered enabling signals which periodically enable each applique to obtain sending access to the SS channel of the communication line to report its condition or status to all other appliques.

The message scheduler 46 in addition to repetitively transmitting the list of address words on the SS channel also transmits, at the end of each run through of the address list supplied by the address generator 41, a sequence of other messages supplied by the translator unit 43 containing information useful by the appliques in completing certain types of connections as hereinafter described in more detail.

The translator unit 43 is comprised of a number of "translators", each of which translators supplies a predetermined message and each of which is assigned a different identifying number. One purpose of these translators is to permit the imposition of certain restrictions on the use of individual line appliques. Some appliques are directly addressed appliques which can be reached by another applique dialing its identifying or address number. Other appliques are referred to as indirectly addressed appliques and can only be reached by another applique by the applique first gaining access to and making use of information broadcast by a certain translator. For example, a trunk applique is usually an indirectly addressed applique which can be reached by another applique only by the other applique dialing the digit 9. This conditions the logic of the calling applique to make connection with the trunk applique. If it is desired to restrict a given line applique from reaching, by direct dialing, an indirectly addressed applique, such as a trunk applique, the restriction is effected by a module plugged into the applique which prevents that applique from accepting the translator message required to reach the indirectly addressed applique.

The translator messages transmitted on the SS channel by the system clock contain call forwarding information which is equivalent to statements like the following examples: (1) If you hold a dial entry 9 (which is ordinarily used to access a local trunk applique), call applique number 50; or (2) If you hold a dial entry 0 (which is ordinarily used to access the attendant's station), call applique number 49. As used herein, the symbol 0 is used to represent the dial entry made by the 0 or operator key of the touch-tone pad.

As explained in more detail hereinafter, such statements are of the kind made by "standard" translators. In addition, the translator unit 43 of the system clock may also include one or more "extended translators" which supply messages, broadcast on the SS channel, including out-dialing instructions. The message provided by an extended translator may, for example, contain information equivalent to the following statements: (1) If you are calling applique and hold a dial entry 85, used to access a frequently called off-premises destination through an outside exchange, proceed as though you held a dial entry 7 in order to reach a trunk applique connected to that exchange, and when you reach such an applique, instruct it to inspect this message in order to obtain an out-dialing instruction; and (2) If you are a trunk applique which has been instructed to inspect this message, proceed by out-dialing number 284-3613 to the exchange to which you are connected.

As to the function of the message scheduler 46 to inject paging and special control signals onto the paging and control channel of the communication line, when one applique wishes to make a paging call, the voice or audio signal from that applique, and which appears on the audio channel assigned thereto, is received by the receiver 51 and transmitted to the paging transmitter 45 which retransmits such audio signal on the communication line in the paging and special control signal channel. The dummy appliques servicing paging units in turn are adapted to receive all audio signals appearing on the paging and special control channel and the paging units convert such audio signals into audible signals emitted from speakers in the units. Also, the receiver 51 monitors the signalling and supervision messages appearing on the receive or return leg 26 of the communication line 30 and detects erroneous messages produced by a malfunctioning applique. In response to such detection of an erroneous message, the receiver 51 produces an output to the special controller 47 which in turn provides a special control signal injected onto the paging and control channel of the communication line which signal disables the malfunctioning applique and effectively removes it from the system.

TIMING AND COMMUNICATION SIGNALS

FIG. 2 shows the format of the timing signal which appears on the timing line 32 and the related format of the communication signal which appears on the communication line 30. Considering first the timing signal, this signal consists of clock or timing pulses 48, 48 produced by the timing generator 38 and transmitted by the timing line 32. In the illustrated case, these pulses 48, 48 appear at a rate of 675 kHz with every 54th pulse of the pulse stream being omitted. These missing pulses divide the pulse stream into repetitive 80 microsecond frames wherein each missing pulse defines the end of a frame and hence constitutes a frame synchronization signal. Within each frame the pulses 48, 48 divide the frame into 53 time slots or periods with the trailing edge of each pulse being taken to mark the beginning of the associated time slot. The first 52 time slots are of equal duration. At the end of each frame, following the 52 time slots of equal duration, is a double duration time slot resulting from the fact that the 54th clock pulse is missing. Therefore, in each frame each time slot, except for the double duration slot, is of approximately 1.5 microsecond duration and each frame has a period of 80 microseconds. Accordingly, the frames repeat themselves at a rate of 12,500 times per second and the various individual signals transmitted by the communication line, and which are assigned exclusive ones of the communication channels defined by the time slots, are sampled at a corresponding sampling rate of 12,500 samples per second.

The timing signal essentially divides time into the aforesaid time slots and frames, and this division of time is applied to the usage of the communication line 30. That is, on the communication line bits of information appear in the time slots established by the timing signal and are related to different individual signals. Referring to the communication signal format as shown in FIG. 2, the first two time slots, used on a shared basis by the various appliques and the system clock, are signalling and supervision time slots. The information appearing in these slots on the communication line is in a binary form and consists of the presence or absence of a pulse. The appearance of a pulse in one of these time slots is taken to represent a binary one and the absence of a pulse in one of these time slots is taken to represent a binary zero. Therefore, by way of example, in FIG. 2 the pulse 49 appearing in the number 1 time slot of the illustrated frame is taken to be a binary one and the absence of a pulse, as indicated at 50, in the number 2 time slot is taken to represent a binary zero. Since there are two signalling and supervision time slots in each frame and since the frame rate is 12.5 kHz, signalling and supervision information is transmitted on the communication line at a rate of 25,000 bits per second. Also, since there are two signalling and ssupervision time slots in each frame, two bits of signalling and supervision information are transmitted per frame. These two bits are referred to as a bit pair, and to distinguish each bit of a bit pair from one another, the bit which appears in the number 1 time slot is referred to as the "even" bit and the bit which appears in the number 2 time slot is referred to as the "odd" bit.

The next 50 time slots of each frame are audio time slots are are each exclusively assigned (on a dedicated basis) to a respective one of the 50 potential line and trunk appliques. For convenience, these audio time slots are numbered 3 to 53 in FIG. 2 with the number in parentheses below each slot number indicating the address or identifying number of the applique assigned to the slot. The audio slots are used to convey voice signals by audio modulated pulses. As mentioned previously, various different types of pulse modulation may be used without departing from the invention, and the illustrated form of modulation is pulse width modulation (pwm). When a first applique is actively talking to a second applique, the voice signal from the first applique is transmitted to the second applique by modulated pulses produced in the repetitively appearing time slots (one per frame) assigned to the first applique. If the second applique talks back to the first applique, the voice signal from the second applique is transmitted to the first applique by modulated pulses produced in the repetitively appearing time slots (one per frame) assigned to the second applique. In FIG. 2, the pulses 52, 52 represent pulse width modulated pulses appearing in their associated audio time slots. The solid lines indicate the actual shape of the pulses and the broken lines represent the shape of a standard or unmodulated audio pulse. If the system includes less than 50 line and trunk appliques, then some of the audio time slots will remain unused and no audio signals or pulses will ever appear in such time slots. Also, it will be understood that audio modulated pulses appear in an audio time slot only when the associated applique is talking to another applique and when the applique is not talking no modulated pulses appear in its time slot.

The 53rd time slots provided by the repetitive frames are used, on a shared basis, either to transmit audio signals, originating from a line or trunk applique and retransmitted by the paging transmitter 45 to one or more special appliques servicing one or more paging units, or to transmit special control signals to the appliques which control signals may be used, among other things, to disable a malfunctioning applique. Therefore, the signal, if any, which appears in each 53rd time slot is either an audio modulated pulse transmitted to a paging applique or a binary digital special control pulse transmitted to the appliques.

For convenience, the repetitively appearing time slots into which the usage of the communication line is broken may be considered to divide the communication line into 52 communication channels. One channel is the SS channel provided by the two signalling and supervision time slots of each frame. Fifty other channels are the 50 voice channels provided by the 50 audio time slots of each frame, and the last channel is the paging and control channel provided by the 53rd time slot of each frame. Although all of the latter slot could conceivably be used, in the present embodiment only the first half (approximately 1.5 microseconds) is actually used for communication signals.

Referring to FIG. 1, the outgoing leg 21 of the communication line 30 may be considered to constitute the sending end of all of the communication channels provided by the communication line, and the return leg 26 to constitute the receiving end of all such channels. It should also be noted from FIG. 1 that each line and trunk applique has a sending terminal connected to the sending leg 21 of the communication line 30 and a receiving terminal connected to the receiving leg 26 of the communication line. Therefore, when a line or trunk applique injects information onto the sending leg 21, it travels to the receiving leg and becomes available to the receiving terminals of all appliques.

The sending end and the receiving end of each channel (the SS channel, the 50 voice channels and the paging and control channel) are separately available at every point along the length of the transmission cable. Access to the sending ends of the channels is, however, limited in the following ways:

1. The system clock and all of the line and trunk appliques have periodic sequential access to the sending end of the SS channel. Scheduling of such access is performed by the message scheduler 46 of the system clock.
2. Each line and trunk applique has access to the sending end of a single one of the fifty voice channels, and no other system component has access to the sending end of that channel.
3. A dummy applique has no access to the sending end of any channel.
4. The system clock has access to the sending end of the paging and control channel, but no other system component has access to the sending end of that channel.

The system clock and all of the line and trunk appliques have access to the sending end of the SS channel on a time-shared sequential basis. The dummy appliques, which originate no traffic on the SS channel have no access to the sending end of that channel. The system clock, and all of the appliques, including the dummy appliques, have full-time access to the receiving end of the SS channel.

The time-sharing or scheduling of access to the sending end of the SS channel is controlled by the system clock in accordance with the following sequential routine:

1. The system clock transmits an enabling or address word to a particular line or trunk applique.
2. The address applique, if it exists (that is, if it is installed in the system), responds by injecting onto the SS channel its own signalling and supervision information which information appears in the form of a word or words added to the address word to form a complete signalling and supervision message.
3. Subsequently, the system clock detects the fact that the SS channel is idle (that is, it detects the end of the message initiated by the address word), and it then sends an enabling or address word to another applique.
4. After the system clock has sequenced through a set of fifty address words, each addressed to a respective one of the fifty potential line and trunk applique stations, it transmits its own sequence of signalling and supervision messages provided by the translators in the message scheduler.
5. Following transmission of the translator messages, the system clock returns to the set of address words and the process is repeated.

The system clock has access to the sending end of the paging and control channel on an exclusive basis. Every dummy applique used for paging has full-time access to the receiving end of the paging and control and receives whatever audio signal is transmitted on that channel by the system clock. Dummy appliques which are not used for paging have no access to the receiving end of the paging and control channel. During paging, the system clock transmits an audio signal, received from an applique or from a source external to the system, on the control channel, together with a signal which enables the audio circuits in the dummy appliques used for paging. When a line or trunk applique wishes to access the paging dummy applique or appliques, it includes an appropriate signal in its signalling and supervision message. This signal instructs the system clock to listen on the voice channel assigned to that applique and to re-transmit the audio signal it receives from that applique on the paging and control channel together with the necessary control signals.

Every applique, including the dummy appliques, has full-time access to the receiving end of the control channel, but that access is only for the purpose of receiving control signals. If the system clock determines, by observing the signalling and supervision messages on the SS channel, that a particular applique is malfunctioning, it sends a disabling signal, addressed to the malfunctioning applique on the control channel to functionally remove such malfunctioning applique from the system.

GENERAL APPLIQUE CONSIDERATIONS

An applique is a device which provides an interface between the transmission cable 20 and a telephone instrument, trunk line or other communication line or piece of equipment connected to the system. The line and trunk appliques each provide a two-way talking path interface between the system and the associated telephone instrument or trunk line. Each dummy applique provides only a one-way interface (receives only either ringer, paging or control imputs) between the system and the area serviced by the dummy.

Considering the line and trunk appliques, each one of these appliques in the system has an identifying number or address drawn from the set 10 through 59 and exclusively assigned to it. Each of these appliques may also either be directly addressable or indirectly addressable. An applique which is directly addressable may be accessed, assuming that it is not busy, by a two-digit dial entry which is the same as the applique's identifying number. An applique which is indirectly addressable cannot be directly accessed by a dial entry. Instead, it may be accessed by way of a translator, or a call may be forwarded to it as a result of an attempt to access another applique which is busy. For example, if an attendant's station is included in the system, such station may use one or more indirectly addressable appliques which may be accessed by the dial entry 0. Similarly, the appliques which are connected to local trunk lines are ordinarily indirectly addressable and may ordinarily be accessed by the dial entry 9.

If a dial entry is made to a nonexistent applique, that is, if no applique installed in the system has an identifying number equal to the dial entry drawn from the set 10 through 59, or if the dial entry is the same as the identifying number assigned to an indirectly addressable applique, the call is processed by the call-processing logic in the calling applique as a call to a nonexistent destination. The call is automatically cancelled and the caller hears a reorder signal. After a short period, the reorder signal stops and the caller is offered a dial tone.

As to the dummy appliques, two types are provided, namely "ringer" appliques and "paging" appliques. A ringer dummy is equipped to control two ringers or other signalling devices, one ringer being a universal ringer and the other a zone ringer. A paging dummy is equipped to deliver audio information through an associated paging unit which may consist of a self-contained amplifier and speaker in the dummy. The illustrated system accommodates a maximum of 20 dummy appliques and those which are installed may be any desired mix of the two types.

Every dummy applique has either one or two identifying numbers in the form of two digit decimal numbers drawn from the set 60 through 68. These numbers are not assigned to any other system components. A ringer dummy may be assigned one number drawn from the set 60 through 67, or may be assigned the number 60 and one other number drawn from the same set. A paging dummy is always assigned the number 68.

A ringer dummy may be accessed either by a universal ringer call or by a zone ringer call. A universal ringer call is originated by a dial entry 60. This dial entry accesses every ringer dummy which carries an identifying number 60 whether or not it also carries a second identifying number and causes it to activate its universal ringer. A zone ringer call is originated by a dial entry drawn from the set 61 through 67. Such dial entry accesses every ringer dummy which carries an identifying number the same as the dial entry, whether or not it also carries a second identifying number, and causes it to activate its zone ringer.

A paging call is originated by a dial entry 68. It accesses every paging dummy and sets up a one-way talking path from the calling applique to the audio output of every paging dummy.

A ringer call of either the universal or zone type may be captured by a capturing call originated by a dial entry 6. Similarly, a paging call may be captured by a capturing call, originated by a dial entry 69. In either case, the capturing process establishes a conventional call between the original calling applique through which the dummys were accessed and the capturing applique through which the capturing call is placed. Accessing of the dummys by the original calling applique stops as soon as the original call is captured.

The originator of a ringer call of either type hears an audible ring whether or not the system contains any dummys which are accessed by the call. This audible ring stops when the call is captured. An uncaptured universal ringer call continues until it is cancelled by the caller. An uncaptured zone ringer call continues for a short time and is then automatically cancelled by the calling applique. The caller then hears a reorder signal followed by a dial tone.

GENERAL TRANSLATOR CONSIDERATIONS

A translator is a module which is part of the message scheduler 46 of the system clock 28 of the system shown in FIG. 1. As mentioned, the information stored by the translators is transmitted, periodically, on the SS channel of the communication line 30 and is thereby made available to every applique in the system. Every translator is either a "standard" translator which stores a call forwarding instruction without an outdialing instruction, or an "extended" translator, which stores a call forwarding instruction with an out-dialing instruction.

Every translator is assigned an identifying number which is either a one-digit decimal number drawn from the set 0, 7, 8, and 9 or a two-digit decimal number drawn from the set 70 through 97. No translator has more than one identifying number and no numer is assigned to more than one translator. A maximum of 32 translators may be installed in the system, and if fewer than 32 translators are in the system, the assigned identifying numbers may be drawn in any desired way from the available list of 32 numbers.

A standard translator stores the equivalent of two identifying numbers. One of these is its own identifying number and the other is ordinarily the identifying number of an indirectly addressable applique to which a call from a calling applique is routed after the calling applique inspects the translator's message appearing on the commmunication line.

An extended translator stores the equivalent of two identifying numbers and also stores an out-dialing instruction which may be as long as 14 digits. One identifying number is the translator's own number. The other identifying number is either the number of a directly addressable applique which is connected to the desired outside exchange or the number of a standard translator which routes calls to an indirectly addressable applique connected to that exchange.

A line applique may or may not store one or more restrictions which prevent that applique from accessing certain translators. Subject to these restrictions, a caller may access any translator by making a dial entry which is the same as the identifying number of that translator. The calling applique at which the dial entry is made then looks for a message on the SS channel of the communication line associated with the accessed translator and, from that message, it obtains a new call destination. When the new call destination is obtained from the message of an extended translator, the calling applique subsequently instructs the called applique which it reaches to obtain an out-dialing instruction from the message associated with the extended translator.

If the dial entry designed to access a translator is one against which there is a restriction stored in the calling applique, the call is automatically cancelled, the caller hears a reorder signal for a short time and then receives a dial tone. The same thing happens if the dial entry is one for which there is no translator installed in the system.

It should be noted that an applique may be conditioned to automatically forward, when it is busy, a call made to it to another applique. Accordingly, only one translator is required for forwarding calls to a group of trunk appliques if all of the trunks served by those appliques are considered to be equivalent and if the trunk appliques are set to forward calls to one another.

The restrictions mentioned above operate to prevent direct access, by means of a dial entry to various translators and groups of translators by the applique to which the restrictions are applied. As discussed hereinafter, the restrictions are programmed into the applique by means of plug-in modules. In the presently preferred embodiment of the invention, there are six restrictions which are identified as follows:

Restriction No. 1 — Translator No. 7
Restriction No. 2 — Translator No. 8
Restriction No. 3 — Translator No. 9
Restriction No. 4 — Translators No. 70 through No. 79
Restriction No. 5 — Translators No. 80 through No. 89
Restriction No. 6 — Translators No. 90 through No. 97

This means that when restriction No. 1 is programmed into an applique, that applique is prevented from directly accessing translator No. 7, when restriction No. 2 is programmed into an applique, that applique is prevented from directly accessing translator No. 8, etc. There is no restriction available to prevent direct access to translator No. 0.

It should be noted that these restrictions apply only to direct access by means of a dial entry. A caller who is unable, because of restriction No. 3, for example, to reach without assistance an applique which must be accessed by a dial entry 9, may make a dial entry 0 which ordinarily accesses the attendant's station. The attendant can then access the desired applique by means of a dial entry 9, and can subsequently transfer the call, after that applique has been reached, to the original caller. The same result can be achieved if the original caller dials any system subscriber whose applique does not store a restriction against the dial entry 9.

Translator identifying numbers are customarily, but not necessarily, assigned on the basis of the following scheme:

No. 0 – assigned to a standard translator which forwards calls to the system attendant.
No. 9 and No. 90 through No. 97 — assigned to standard translators which forward calls to local trunks and to groups of local trunks, and extended translators which set up local outside calls.
No. 8 and No. 80 through No. 89 — assigned to standard translators which forward calls to toll trunks, WATS lines, and groups of toll trunks and/or WATS lines, and extended translators which set up long-distance outside calls.
No. 7 and No. 70 through No. 79 — assigned to standard translators which forward calls to tie lines and to groups of tie lines, extended translators which set up outside calls through tie lines, and standard translators which forward calls to system subscribers who desire that direct access to themselves be restricted.

COMPONENT ADDRESSES

As brought out above, a unique address or identifying number is assigned to each line and trunk applique and to each translator. Such address appears in each signalling and supervision message transmitted on the SS channel of the communication line and serves to identify the source of the message. That is, for example, if a message contains, in its address word, the address of translator No. 9, then the presence of that address indicates that the message is one coming from translator No. 9.

Also, at least one address is assigned to every dummy applique. The address assigned to the dummys are not necessarily unique, and the same address may be assigned to more than one dummy. Two addresses may be assigned to some dummys. These addresses do not, however, appear in the address words of any signalling and supervision messages since the dummy appliques do not inject any information onto the SS channel.

Two additional addresses, used in the system but not assigned to any system component, are the addresses associated with capturing calls, as described hereinafter.

All addresses are of the same form. Each consists of a two bit prefix followed by a six bit binary number.

The signalling and supervision messages sent from the line and trunk appliques are initiated by the system clock, as previously explained, by the system clock sending address words, addressed to the appliques in sequence, on the SS channel with the appliques, if present, adding additional words to the address words to form complete messages. A full sequence of address words consists of fifty such words. The numerical portions of the addresses contained in these address words are, in order, the binary equivalents of the identifying numbers. The address, in each address word, has a prefix which is either 00, indicating a directly addressable applique, or 01, indicating an indirectly addressable applique. If a particular address word, during the transmission of one sequence of the 50 address words, elicits a response from an applique, the same prefix is used in that address word during the next sequence. If the address word elicits no response, during the next sequence it appears with the alternate prefix.

AUDIO CHANNEL USAGE

The way in which talking path connections are made between the line and trunk appliques is set out in detail hereinafter. At this point, however, the manner in which such connections are made is broadly described to provide a better understanding of the material which follows. For this purpose, reference is made to FIGS. 3, 4 and 5 which show the functional equivalents of certain audio signal flow paths. As discussed previously, the communication line is time-division-multiplexed to provide a number of communication channels fifty of which are audio channels. Each line and trunk applique has exclusive access to the sending end of a single one of these fifty audio channels. If the system includes fewer than 50 line and trunk appliques, then some audio channels remain unassigned and unused.

Every applique has access to the receiving end of every voice channel, as also does the system clock. This access, however, is subject to control by the applique to which the voice channel is assigned. That is, a receiving applique has access to the audio channel on which the sending applique transmits, but such access is controlled by the sending applique, through its signalling and supervision messages sent on the SS channel.

Turning to FIG. 3, this figure shows the functional equivalent of an audio signal flowing from a single sending applique through its assigned audio channel to a number of receiving appliques and to the system clock. For clarity, only three audio channels are shown (but keep in mind that the separate audio channels functionally depicted as separate lines are not in actuality separate lines but rather time-divided portions of a single line) and the one assigned to the sending applique A is indicated by the reference numeral A. Every other applique, B and C, and the system clock has receiving access to the channel A. Each receiving applique B and C has a receiving terminal connected to the channel A through two switches. That is, the receiving applique B is connected to the channel A through switches $a$-1 and $a$-2. The receiving applique C is connected to the channel A by switches $a$-3 and $a$-4. The system clock is connected to the channel A by a single switch $a$-$n$. One of the two switches associated with each receiving applique is operated by the receiving applique at its own discretion and the other of the two switches is controlled by the sending applique by means of instructions sent to the receiving applique on the SS channel. For example, considering the receiving applique B, this receiving applique at its own discretion operates the switch $a$-1. The switch $a$-2 is also operated by the receiving applique B but only in response to control instructions sent to it by the sending applique A. Therefore, access to the receiving end of a particular voice channel is controlled both by the sending and receiving appliques.

As to the system clock, this unit is connected to the voice channel A through a single switch $a$-$n$ which is controlled by the system clock in response to instructions sent to it by the sending applique on the SS channel.

Figure 4:
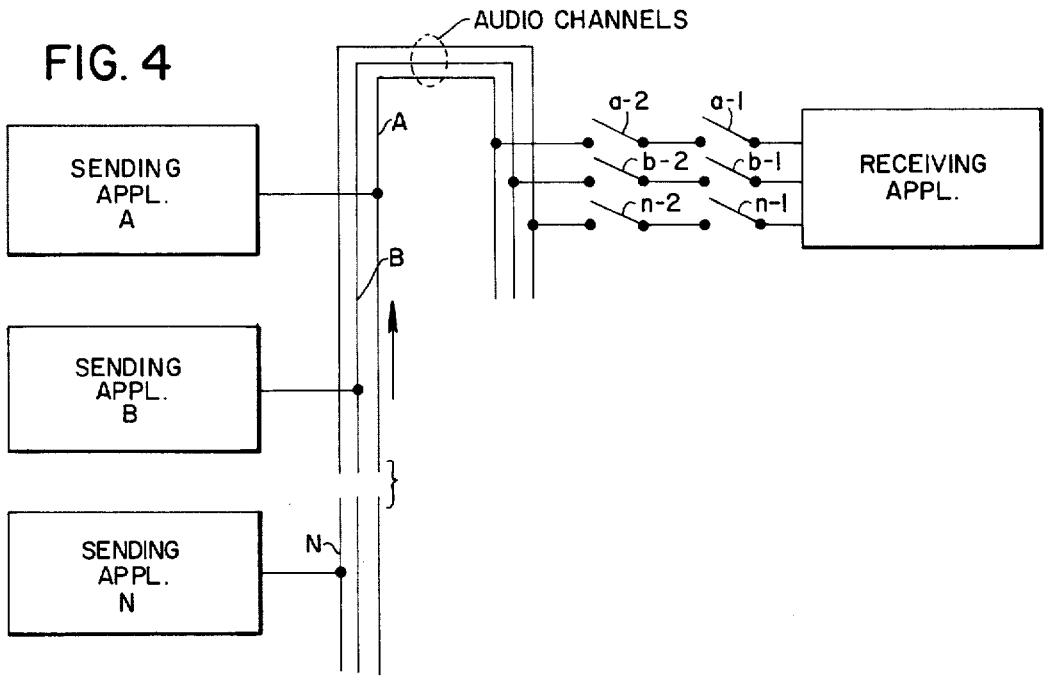
FIG. 4 is a block diagram showing the functional equivalent of the flow paths of a number of audio signals flowing from a number of sending appliques to one receiving applique in the system of FIG. 1.

FIG. 4 shows a functional equivalent of the flow of audio signals from a number of sending appliques to a single receiving applique. Referring to this figure, the three illustrated sending appliques A, B and N are connected respectively to audio channels A, B and N (but again keep in mind that the separate audio channels functionally depicted as separate lines are not in actuality separate lines but rather time-divided portions of a single line). The receiving applique is in turn connected to all three audio channels by three different lines each containing two switches. The first line, connected to channel A, includes switches $a$-1 and $a$-2, the second line, connected to channel B, includes switches $b$-1 and $b$-2, and the third line, connected to channel N, contains switches $n$-1 and $n$-2. The switches $a$-1, $b$-1 and $n$-1 are controlled independently by the receiving applique at its own discretion. The switches $a$-2, $b$-2 and $n$-2 are controlled in response to instructions sent to the receiving applique, on the SS channel, by the sending appliques A, B, and N, respectively. Therefore, in FIG. 4, if the sending applique A wishes to talk to the receiving applique, it instructs the receiving applique to close the switch $a$-2, and if the receiving applique wishes to receive the audio signal sent from the applique A, it closes the switch $a$-1.

Figure 5:
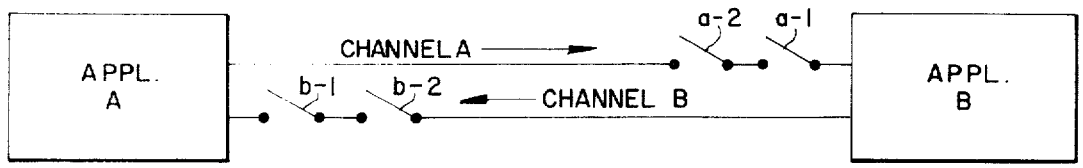
FIG. 5 is a block diagram showing the functional equivalent of a two-way talking path between two appliques in the system of FIG. 1.

With a total of 50 line and trunk appliques installed in the system, there are 1,225 distinct two-way talking paths that can be set up between one applique and another. Any two appliques, working in concert, can establish an operating two-way talking path between them. Either applique, with or without the concurrence of the other, can make the path inoperative in both directions. FIG. 5 shows the functional equivalent of a two-way talking path between two appliques A and B.

Referring to FIG. 5, the two-way talking path between the appliques A and B is comprised of two separate one-way paths. One of these one-way paths utilizes the audio channel A, assigned to the applique A, and the other path utilizes the audio channel B, assigned to applique B. The making and breaking of each one-way talking path between the two appliques is controlled by two switches. As to channel A, these two switches are the switches $a$-1 and $a$-2. As to channel B, these are the switches $b$-1 and $b$-2. In each channel one of the two switches is operated independently by the receiving applique and the other is operated, by the receiving applique, in accordance with instructions transmitted to the receiving applique by the sending applique.

More clearly, in each talking path or channel, one switch is controlled by the sending applique and the other switch is controlled by the receiving applique. Therefore, in the case illustrated by FIG. 5, if applique A wishes to make a two-way talking path with applique B, applique A closes switch $b$-1 and instructs applique B to close switch $a$-2. Similarly, if applique B wishes the talking path to be operative, applique B closes switch $a$-1 and instructs applique A to close switch $b$-2. Therefore, it will be seen that if both appliques wish the two-way talking path to be operative, and close the switches as above described in accordance with such wishes, the talking path is operative in both directions. On the other hand, if only one applique wishes the talking path to be operative, or if neither wishes it to be operative, it is non-operative in both directions.

In the case of paging, a one-way talking path is set up between a sending applique and a paging dummy applique by the sending applique closing, through instructions sent to the system clock, the switch by which its audio channel is connected to the system clock. The system clock thereby receives the message sent by the sending applique on its audio channel and it re-transmits this audio signal onto the control channel to which the paging dummy is connected.

SIGNALLING AND SUPERVISION WORD STRUCTURE

The signalling and supervision signals which are transmitted in the SS channel of the communication line, as previously mentioned, are fundamentally binary digital pulses transmitted and received in bit pairs, one bit pair being transmitted during the course of each frame of timing pulses. These bit pairs are in turn assembled into words and the words are assembled into messages.

FIG. 6 shows the structure of the various words used to form messages. The message format allows for 21 different words, each with its own function. These are uniquely identifiable as words 0 thrrough 20, as indicated at the left-hand margin of FIG. 6. Word 0 always appears in a message and the other words may or may not appear. Those words which do appear are transmitted in numerical order, starting with word 0. Each message word 0 to 20 is comprised of five bit pairs giving it a length of 10 bits. The last bit pair of each of these words is used for error checking purposes and consists of 1 bit, the final bit, which is always 1 and a parity bit which is of such a value as to make the number of 1 bits in the word even.

Preceding each message is a signal, which may be considered as another word and which is indicated by the reference numeral 54 in FIG. 6. This word 54 acts to indicate the end of one message and the start of the next message. It consists of at least five consecutive bit pairs 56, 56 (which are not part of any message) in which each of the bit values are 00, followed by another bit pair 57 in which the bit values are 11. The word 54 is hereinafter referred to as a message sync. signal and in a message is immediately followed by word 0.

Word 0 is the "address" word which indicates the source of the following portion of the message. The first bit pair of this word is a prefix which identifies the type of device identified by the word. That is, the prefix 00 identifies a directly addressable applique, the prefix 01 identifies an indirectly addressable applique, and the prefix 10 identifies a translator. Following the initial bit pair are three bit pairs presenting a six bit binary number which, connected to decimal form, is the identifying number assigned to the applique or transistor addressed by the address word. The fifth bit pair of the word consists of the error checking parity and 1 bits.

Word 1 is the "existence" word which, if present in a message, indicates that the addressed source is operatively installed in the system. It further provides information concerning the present status of the source and the format of the following portion of the message. When an existence word does not appear in a message, that message contains only an address word and all other words are absent. As will be apparent from FIG. 6, the first three bit positions of the existence word indicate the source status and are referred to rrespectively as the "busy bit", the "loaded bit" and the "off-hook bit". The next four bit positions of the existence word identify the words which are to follow and are respectively referred to as the "dood" bit, the "optional-forwarding" bit, the "forced-forwarding" bit and the "register" bit. The next bit is referred to as the "change" bit and the last two bits are the parity and 1 bits. In the message of an applique, the busy bit of the existence word is 1 if the applique is busy and 0 if the applique is non-busy. In the message of a translator, this bit is always 1. An applique is busy when at least one of the following conditions exists: (1) the applique is in off-hook status, (2) at least one of the call registers in the applique is non-empty, or (3) the applique stores a variable forward. When none of these conditions exists, the applique is non-busy or free.

In the message of an applique the loaded bit is 1 if the applique is loaded and 0 if the applique is non-loaded. In the message of a translator, this bit is always 1. An applique is loaded when at least one of the following conditions exists: (1) the applique is in on-hook status, (2) the camp-on call register in the applique is non-empty, (3) the camp-on call register in the applique is accessed, (4) the applique stores a restriction against acceptance of an incoming call on a camp-on basis, or (5) the applique stores a variable forward. When none of these conditions exists, the applique is non-loaded or clear.

From the above discussion of the busy and loaded bits, it will be clear that at least one of these bits in an existence word will be 1. Accordingly, the appearance of a bit pair 00 immediately following the address word is a definite indication that the existence word is absent from the message, in which case all other words, except the address word, are also absent.

In the message of an applique, the off-hook bit is 1 if the applique is in off-hook status, and is 0 if it is in non-off-hook status. In the message of a translator, this bit is always 1. An applique is in off-hook status when it is being accessed by the telephone instrument or outside exchange to which it is connected, whether that acdess is ab initio or in response to a signal from the applique. When it is not being so accessed, the applique is in non-off-hook status or in on-hook status.

In any message, the dood bit of the existence word is 1 when the dood word word 2 appears in the message and the bit is 0 when the dood word is absent. A dood word never appears in the message of a translator and, therefore, in the message of a translator the dood bit of the existence word is always 0. A dood word appears in the message of an applique only when one of the following conditions exists: (1) the applique is accessing dummys in connection with a ringer call, (2) the applique is accessing the system clock in connection with a paging call, (3) the applique is processing an outgoing call, and has accepted a call forwarding instruction which includes an out-dialing instruction, or (4) the applique is processing an outgoing call originated by a called instruction stored in a repertory dialing attachment whether or not it includes an out-dialing instruction.

The optional forwarding and forced forwarding bits of the existence word are best considered together. These two bits are 11 when the forwarding word (word 16) and the instruction words (words 17 through 20) appear in the message. In this case, the call forwarding instruction, implied by the presence of the forwarding word, is considered to be a forcing call forwarding instruction, and the instruction words contain an out-dialing instruction. These bits are 01 when the forwarding word appears in the message and the instruction words are absent, if the call forwarding instruction is considered to be a forcing call forwarding instruction. These bits are 10 when the forwarding word appears in the message and the instruction words are absent, if the call forwarding instruction is considered to be an optional call forwarding instruction. These bits are 00 when the forwarding word and the instruction words are absent from the message.

The register bit of the existence word, in any message, is 1 when the register words (words 3 through 15) appear in the message, and is 0 when they are absent. The register words never appear in a message associated with a translator and, therefore, in a translator message the register bit is always 0.

The change bit of the existence word is used to indicate whether or not a change has taken place in the register words of a message associated with an applique. In the case of a translator message, this bit is always 0. The change bit is 1 when all of the following conditions exist: (1) the register words appear in the message (implying that the message is an applique message), (2) the register words appeared in the last message associated with the same applique, and (3) at least one of the one hundred register bits of the register words has a value in the current message which is different from its value in the last message associated with the same applique. If all of these conditions do not exist, the change bit is 0.

Word number 2, still with reference to FIG. 6, is the "dood" word. The first two bits of this word are prefix bits which indicate the nature of the six bit binary number appearing in the next six bit positions of the word. The prefix 11 indicates that the six bit binary number is the address of a dummy applique. Any other prefix indicates that the six bit binary number is the address of a unit storing a variable forward with out-dial instructions which has been accepted by the calling applique. In particular, the prefix 00 indicates that the unit storing the out-dial instructions is a directly addressable applique, the prefix 01 indicates that the unit storing the out-dial instructions is an indirectly addressable applique, and the prefix 10 indicates that the unit storing the out-dial instructions is a translator.

Words 3 through 15 are register words which together contain a total of one hundred and four information bits, the last two bits of each word being the error-checking parity and 1 bits. The first four of the information bits are individually identified as discussed below and the remaining one hundred bits are referred to as "register" bits and are provided by 50 bit pairs indentified as the 0-th bit pair through the 49-th bit pair. When, during the assembly of an outgoing message in an applique, it is seen that all 100 of the register bits are zeros, the 13 register words are omitted from the outgoing message. If one or more of the register bits has the value 1, and 13 register words are included in the message.

The first two bits of the first register word, word 3, are prefix bits which identify the class of the related applique. That is, the appliques, other than dummy appliques, may be assigned to any one of four different classes. Therefore, an applique receiving a call may, by inspecting the signalling and supervision message of the calling applique, particularly the prefix bits of the first register word, word 3, determine the class of that applique. This information can then be displayed by a special applique used at the attendant's station, or by an accessory display if the attendant's station uses one or more line appliques. The attendant can, therefore, handle calls arriving at the attendant's station on the basis of a priority scheme associated with the class of the call originating applique. A typical class assignment and the register word two bit prefix assigned to each class is preferably as follows:

| | |
|---|---|
| Prefix "00" - | all appliques not assigned to another class. |
| Prefix "01" - | those appliques connected to local trunks. |
| Prefix "10" - | those appliques connected to tie lines. |
| Prefix "11" - | those appliques serving subscribers whose calls to the attendant's station are to be given priority over all other internal calls. |

The next two bits of the first register word, word 3, are referred to as the "break-in" bit and the "camp-on" bit, respectively. The break-in bit is 1 when a break-in request is set up in the applique with which the message is associated, and it is 0 if no break-in request is set up. As to the camp-on bit, this bit is 1 when a camp-on request is set up in the applique with which the message is associated, and it is 0 if no camp-on request is set up.

The remaining two information bit pairs in word 3 and the 48 information bit pairs in words 4 through 15 contain the 100 register bits as mentioned above. They are numbered, in pairs, as shown in FIG. 6 in sequential order from 0 to 49. These 50 bit pairs of the register words are collectively referred to as the "register bit pairs".

The register bit pairs indicate the status of all of the 49 potential talking paths between the applique in question and all other 49 potential line and trunk appliques. In particular, if $i$ is the numerical portion of the address of the applique which originates a message, then the $j$-th bit pair, where $(j \neq i)$, carries information about the status of the talking path between the $i$-th applique (which originates the message) and some other applique whose identifying number is $j$. It should be noted, however, that this information is concerned only with the status of one end of the talking path, that is, the end at the $i$-th applique which originates the message. This end of the talking path may be referred to as the near end. If $i$ is the identifying number of the applique which originates the message, then the $i$-th bit pair represents a trivial condition and is always 00.

The near end status of a talking path is indicated by the following values for a register bit pair:

Bit pair 00 — no call exists or there is an incoming call which is not accepted.

Bit pair 01 — there is an established call on hold at this end, or there is an incoming call which has been accepted and acknowledged but not yet answered.

Bit pair 11 — there is an established call which is live at this end, or there is an outgoing call, not necessarily answered, acknowledged or accepted, at this end.

Bit pair 10 — an established call has been terminated at this end, or an unacknowledged outgoing call has been cancelled at this end (this signal is automatically changed, later, to 00).

Word 16 is referred to as the "forwarding" word, and when it appears in a signalling and supervision message, it always contains an address indicating a new destination of a call originally directed to the applique with which the message is associated. The first two bits of the forwarding word are prefix bits which identify the sort of new destination to which the call is to be directed. The prefix 00 indicates a directly addressable applique, the prefix 01 indicates an indirectly addressable applique, the prefix 10 indicates a translator, and the prefix 11 indicates a dummy applique. The next three bit pairs of the forwarding word contain the identifying number of the device to which the call is to be directed as a new destination. The new destination address held in the forwarding word, by the first four bit pairs of the word, is specified by the rules given below:

1. In a message associated with an applique which stores a variable forward, the forwarding word, word 16, contains the internal address which is part of that variable forward, whether or not the applique also stores a fixed forward of either type. If the variable forward includes an out-dialing instruction, such out-dialing instruction is contained in the instruction words which follow.
2. In a message associated with an applique which stores a fixed forward but does not store a variable forward, the forwarding word always contains the address held as a fixed forward. If the applique is processing an outgoing call originated by a call instruction stored in a repertory dialing attachment, the out-dialing instruction contained in that call instruction is included in the instruction words which then appear in the message and the forwarding bit pair of the existence word is 11. If the call instruction stored in the repertory dialing attachment does not include an out-dialing instruction, the instruction words appear, nonetheless, in the message, as a sequence of zeros, and the forwarding bit pair of the existence word has the same value, 11. If the applique is not processing such a call, the instruction words are absent and the forwarding bit pair of the existence word is then 10 if the stored fixed forward is optional and 01 if it is forced.
3. In a message associated with an applique which stores neither a fixed forward nor a variable forward, if the applique is processing an outgoing call originated by a call instruction stored in a repertory dialing attachment, the situation is the same as in (2) above except that the address contained in the forwarding word is a dead address which, when it is accepted by the address of a call destination, causes an outgoing call to be cancelled. If the applique is not processing such a call, the forwarding word and the instruction words are absent and the forwarding bit pair is 00.
4. In a message associated with a standard translator, the forwarding word contains the forwarding address held by that translator, the instruction words are absent, and the forwarding bit pair of the existence word is 01.
5. In a message associated with an extended translator, the forwarding word and the instruction words always appear in the message. The forwarding word holds the internal address of the call forwarding instruction stored by the translator or holds a dead address if the translator stores no call forwarding instruction. The instruction words which follow contain the out-dialing instruction included in the stored call forwarding instruction, or contain zeros if the call forwarding instruction does not include an out-dialing instruction or if no call forwarding instruction is stored. In all cases, the forwarding bit pair of the existence word is 11.

Following the forwarding word, word 16, are words 17 to 20, called "instruction words", used to contain out-dialing instructions associated with an off-premises forward. These words appear in a signalling and supervision message of an applique which stores a variable forward only if that variable forward includes an out-dialing instruction. They always appear in the message of an applique which is processing an outgoing call originated by a call instruction stored in a repertory dialing attachment, and they always appear in the message of an extended translator. They appear, carrying zeros, when the call instruction stored in the repertory dialing attachment includes no out-dialing instruction, or when the extended translator stores either no call forwarding instruction or one which includes no out-dialing instruction. A zero is interpreted as an instruction not to send an out-dialing signal and, on this basis, it may be said that the instruction words, whenever they appear in a message, carry an out-dialing instruction. They are either all present or all absent. They never appear when the forwarding word, word 16, is absent. The first four bits of the first instruction word, word 17, are referred to as the 0-th group and are used as explained below. The remaining information bits of the instruction words are divided into seven groups of four bits each each providing a four-bit binary number. These seven groups may, therefore, be used to store, in binary form, the equivalent of a seven digit decimal number.

From the foregoing, it will be understood that in a single supervision and signalling message an out-dialing sequence of seven decimal digits or fewer may be contained in the block of four instruction words contained in the message. A longer out-dialing sequence may be transmitted by containing it in several blocks of instruction words which are sent in order, one block at a time, in successive messages. The 0-th group of bits in a block of instruction words, that is, the first four bits of word 17, is related to the number of blocks of instruction words in which the out-dialing sequence is contained. A binary zero in the 0-th group indicates that "this block of four instruction words contains a complete out-dialing sequence". A binary $n$ in the 0-th group (where $n$ is drawn from the set of decimal numbers 1 through 14) indicates that "this block of four instruction words is the $n$-th block of a set of more than n blocks which together contain a complete out-dialing sequence". A binary fifteen in the 0-th group indicates that this block of four instruction words is the last block of a set of more than one block which contains a complete out-dialing instruction.

SIGNALLING AND SUPERVISION MESSAGE STRUCTURE

The signalling and supervision words as described above in connection with FIG. 6 are assembled to form complete messages transmitted on the signalling and supervision channel. The different ways in which the words may be assembled into messages are shown in FIG. 7.

Figure 7A:
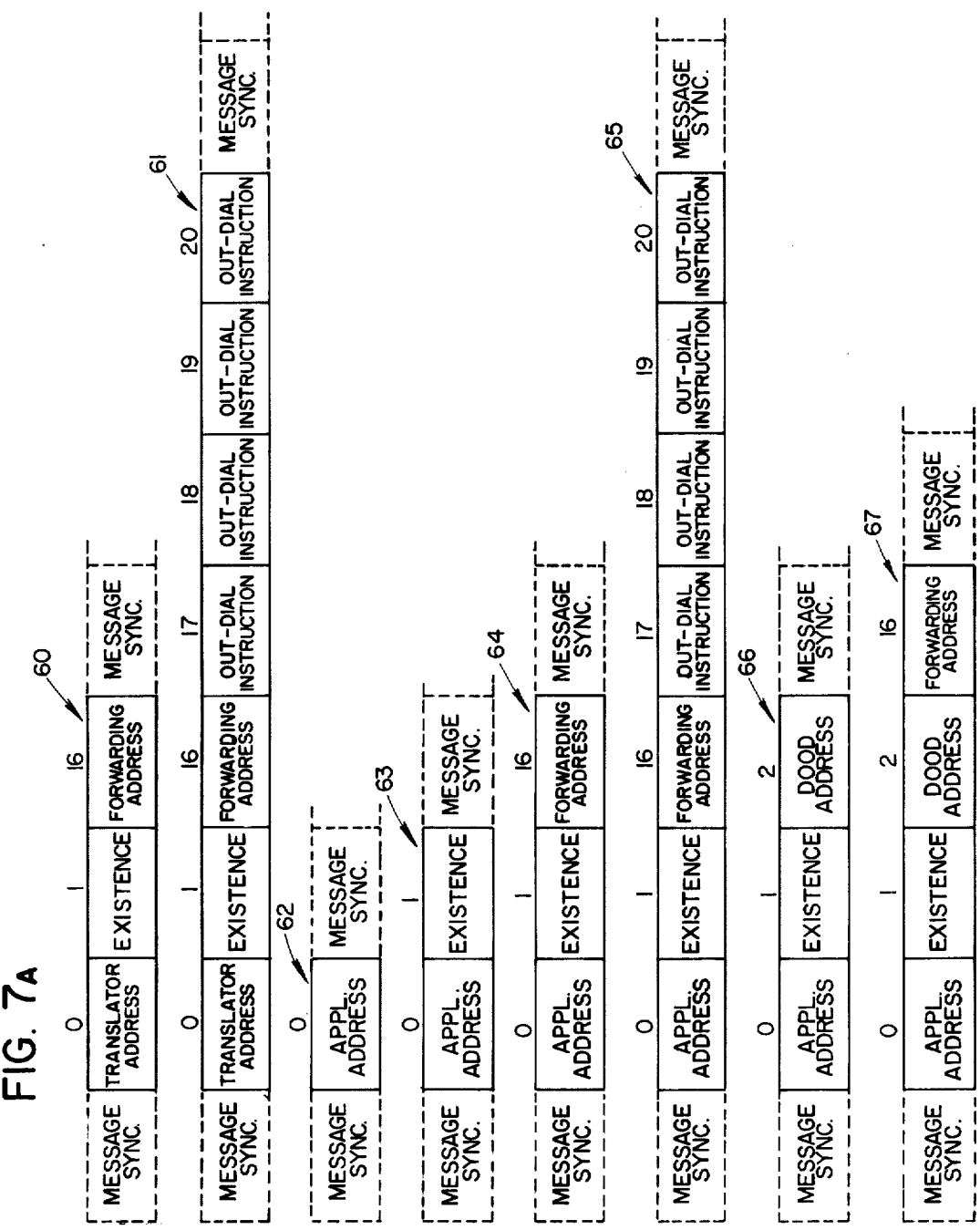

Referring to FIG. 7, the different illustrated messages are designated by reference numerals 60 to 74. The number appearing above each word is the identifying number of the word as defined in connection with FIG. 6.

As mentioned previously, the message scheduler 46 maintains message traffic on the communication line by alternately doing two things. First, it broadcasts to all of the appliques connected to the system information from all of the translators included in the message scheduler. Second, it subsequently sequentially sends enabling or address words to all potential line or trunk appliques which enables each such applique, if it exists, to transmit information on the SS channel of the communication line by adding words to the message initiated by its address word. The first function of the message scheduler may be referred to as "translator broadcasting" and the second function may be referred to as "applique queing". These functions are repetitively and continuously performed.

Referring to FIG. 7, the illustrated messages 60 and 61 are "translator" messages transmitted by the message scheduler during a period of translator broadcasting. Message number 60 is of the type which contains information taken from a standard translator, such translator being one which stores in internal forwarding address only. This message, following the message sync., consists of an address word, identifying the address of the translator with which the message is associated, an existence word and a forwarding word, the latter containing the address of the entity to which a call addressed to the translator in question is to be forwarded.

Message 61 is of the type associated with an extended translator which includes an off-premises out-dialing instruction. This message is similar to the message 60 except for including out-dial instruction words 17 through 20, which contain the out-dial instruction.

The messages indicated by reference numerals 62 to 74 are "applique" messages pertaining to the line and trunk appliques. Each of these messages, immediately following the message sync., includes an address word which is originated by the message scheduler of the system clock. If the applique to which this address word is addressed exists, that applique responds and adds additional words to complete the message.

Message 62 of FIG. 7 is a message related to a nonexistent applique, that is, an applique not installed in the system. This message consists only of the applique address word which is produced by the system clock. Since the applique to which the address word is addressed does not exist, it cannot respond, and after the appearance of the address word, a number of empty SS time slots are received by the system clock and detected as the end of the message, and a new message is thereupon originated by the system clock transmitting a new applique address word onto the SS channel.

Message 63 is a message associated with an applique which exists in the system but is for the time being in a quiescent state. That is, it has no outgoing or established calls associated with it. The addressed applique is also one which does not include a fixed forward or variable forward address. The message, therefore, consists only of an applique address word and an existence word.

Message 64 is a message associated with a quiescent applique which stores either a fixed forward address or a variable forward address. This message is similar to the message 63 except for including a forwarding address word.

Message 65 is a message associated with a quiescent applique which stores a variable forward address with out-dial instructions. This message is similar to the message 64 except for including out-dial instruction words 17 through 20.

Message 66 is a message associated with an applique in the process of placing a call to a dummy applique, the addressed applique being one which does not store any fixed or variable forward address. This message, in addition to an address word and an existence word, also includes a dood word.

Message 67 is a message associated with an applique in the process of placing a call to a dummy applique and storing either a fixed forward address or a variable forward address, but no out-dial instructions. This message is similar to the messsage 66 except for including a forwarding address word.

Message 68 is a message associated with an applique in the process of placing a call to a dummy applique and storing a variable forward address with out-dial instructions. This word is similar to the word 67 except for including out-dial instruction words 17 through 20.

The message 69 is a message associated with an applique either in the process of placing a call to another line or trunk applique or in the middle of such a call, and not storing a fixed forward or variable forward address. This message in addition to an address word and in existence word includes a set of register words, words 3 to 15.

The message 70 is a message associated with an applique either placing a call to another line or trunk applique or in the middle of such a call and also storing either a fixed forward address or a variable forward address. This message is similar to the message 69 except for including a forwarding address word.

The message 71 is a message associated with an applique placing a call to another line or trunk applique or in the middle of such a call and storing a variable forward address with out-dial instructions. This message is similar to the message 70 except for including out-dial instruction words 17 to 20.

The message 72 is a message associated with an applique either placing a call to another line or trunk applique and which also is either placing a call to a dummy applique or which has been redirected by a variable forward with out-dial instructions, the applique not storing a fixed or variable forward. This message, in addition to the address and existence words, also includes a dood word, and register words 3 to 15.

Message 73 is a message associated with an applique in a condition similar to that with which the message 72 is associated except that the applique with which the message 73 is associated is one which stores either a fixed forward address or a variable forward address without out-dialing instructions. The message 73, therefore, additionally includes a forwarding word.

Message 74 is a message associated with an applique in a condition similar to that with which the message 73 is associated except that the applique with which the message 74 is associated is one which stores a variable forward with outdial instructions, and, therefore, the message additionally includes out-dial instruction words 17 to 20.

APPLIQUE CONSTRUCTION

Figure 8B:
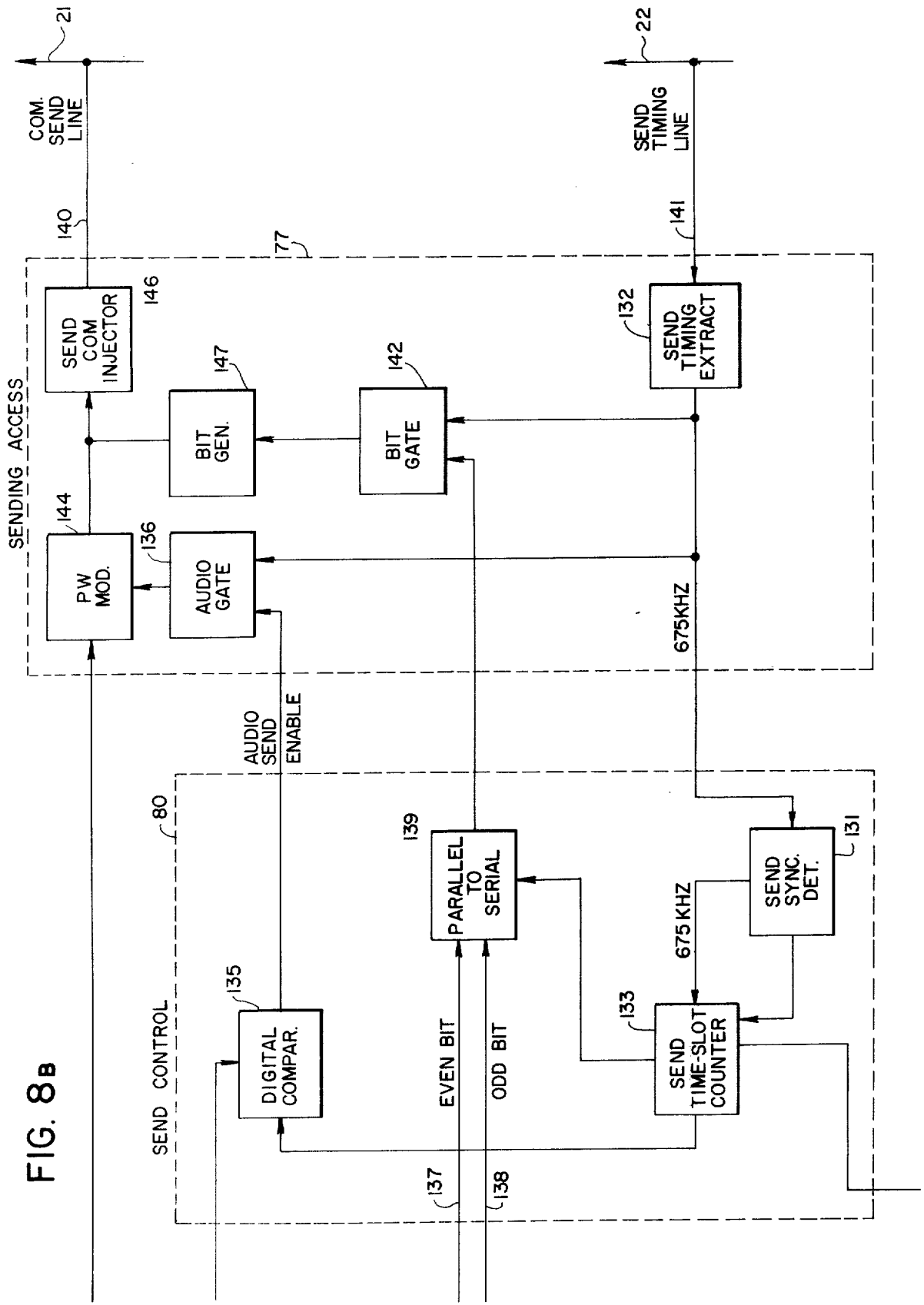
Figure 8C:
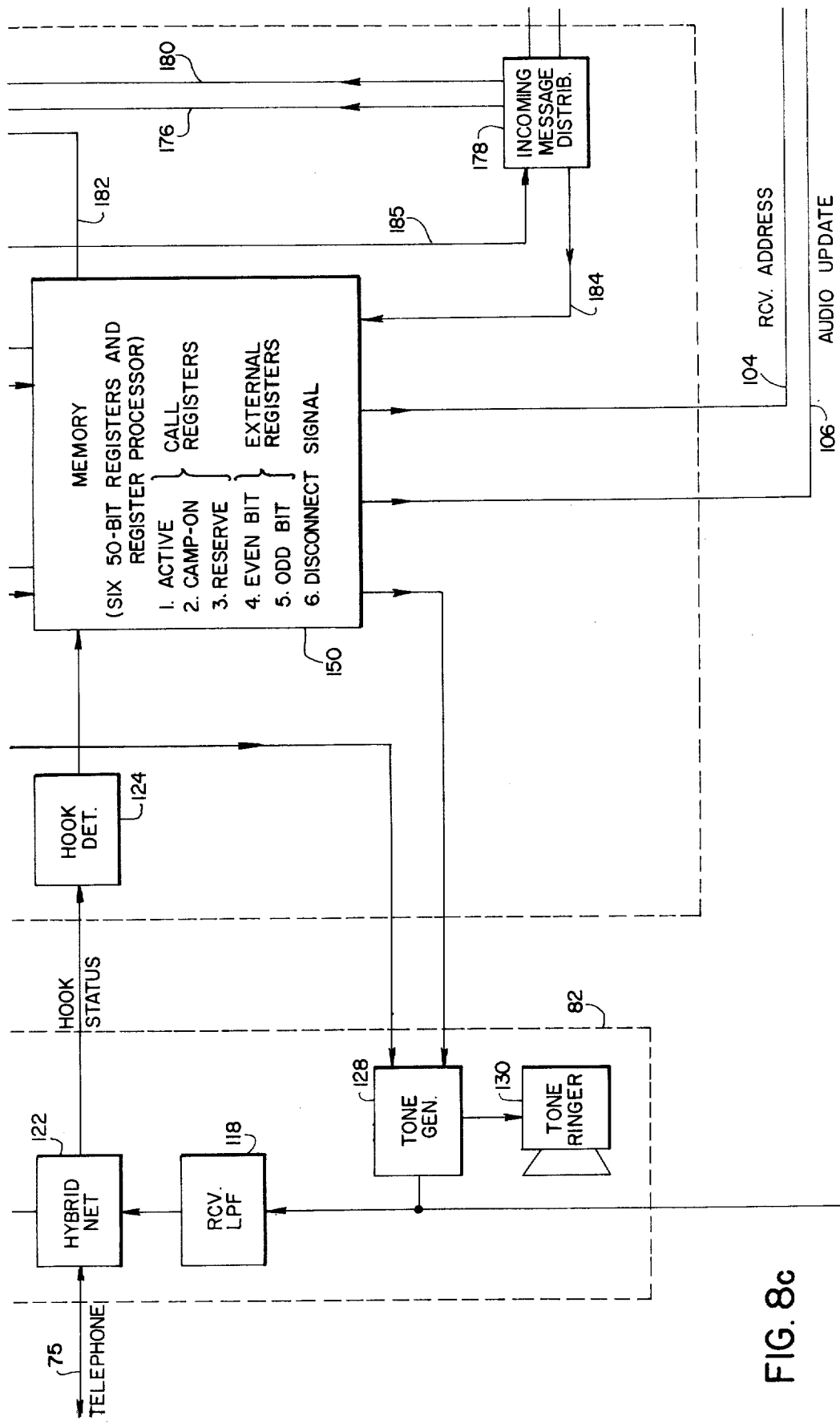

FIG. 8 shows the construction, in block diagram form, of a line applique which is designed for connection by way of a two-wire line 75 to a conventional touch-dial telephone instrument having a 12-key touch-dial pad but without pickup keys or hold button.

Referring to FIG. 8, the illustrated line applique includes two units for gaining access to the transmission cable 20. One of these units is a receiving access unit 76 and the other a sending access unit 77. The receiving access unit 76 accesses the communication line for receiving communication signals therefrom and the sending access unit accesses the communication line for injecting information onto the communication line. A receive control unit 78 operates in conjunction with the receiving access unit 76 and, likewise, a second control unit 80 operates in conjunction with the sending access unit 77. The audio signals received from the communication line pass directly from the receiving access unit 76 to an audio unit 82 over a line 84. The audio unit 82 is connected to the associated telephone by the line 75 and audio signals sent from the telephone to the communication line pass from the audio unit directly to the sending access unit 77 over a line 85.

The binary digital supervision and control signals received from the communication line pass from the access unit 76, through the receive control unit 78, to an applique master control unit 86 which utilizes such signals to perform various supervision and control functions. The master control unit also generates outgoing signalling and supervision messages which are transmitted to the sending control unit 80 for subsequent injection onto the communication line by the sending access unit 77.

The above-described access units 76 and 77, control units 78 and 80, master control unit 86 and audio unit 82 are standard for all line appliques. Individualization of an applique is achieved by a feature selection unit 88. This unit is described in more detail hereinafter in connection with FIG. 18. For the present, however, it may be noted that this unit is adapted to receive a number of plug-in modules each of which when present programs a given feature or features into the applique. One such plug-in module is used to assign an address or identifying number to the applique and at least this module must be present in the applique when installed in the system, each applique, of course, having a different address exclusively assigned to it. Other plug-in modules may be used to assign the applique the ability to store a fixed forward and the ability to store a variable forward. Other plug-in module or modules may be used to assign certain restrictions to the applique. Some of these restrictions are in the form of forbidden dial entries which prevent the applique from mkaing calls to certain forbidden numbers, particularly translator numbers. Other restrictions may prohibit the applique from accepting a camp-on request, accepting a break-in request or making a paging call.

Considering each of the main units of the applique in more detail, and first turning to the receiving access unit 76, this unit is connected to the receiving or return leg 26 of the communication line by a line 89 and is connected to the receiving or return leg 25 of the timing line by a line 90. The connections of the lines 89 and 90 to the lines 26 and 25 occur at the same point along the length of the transmission cable and, therefore, the timing pulses used by the receiving access unit 76 define time slots which are exactly in phase with the time-division-multiplexed signal taken from the communication line by the line 89, due to the timing pulses and communication signals moving in parallel with one another along the transmission line although on different lines. A receive timing extractor network 91 extracts the timing signal from the timing line 25 and a receive communication extractor 92 extracts the communication signals from the communication line 26. The entire extracted communication signal passes through a bit extractor 93 which acts to enhance the pulses of the signal primarily by stretching them to make them of a longer duration. All of the extracted communication signal is applied to a summing pulse width demodulator 95 which is enabled by signals by an audio gate 96 to extract the pulse width modulated audio pulses from desired time slots and to demodulate them into a voice grade audio signal transmitted to the line 84.

The summing pulse width demodulator 95 is capable of simultaneously extracting and demodulating audio signals from a plurality of audio channels of the communication signal so that the subscriber may hear, if desired, voice signals from a number of callers, as in a conference call. Preferably, the summing demodulator is capable of simultaneously demodulating the signals appearing in up to six different audio channels, but, of course, in the ordinary case of a two-way conversation with one caller only, the signals of one voice channel, that of the caller, will be demodulated by the demodulator 95.

The timing pulses from the receive timing extractor 91, which appear at a rate of 675 kHz, are transmitted to the receive control unit 78 and are there used by a receive sync. detector 98, a serial to parallel converter 99 and a 53 bit recirculating shift register 100. The receive sync. detector 98 detects the missing or sync. pulses in the timing pulse train which, as previously mentioned, divide the pulse train into frames of 54 pulses, the 54th pulse of each frame being the missing or sync. pulse. In response to the sync. pulse, the detector 98 produces an output signal transmitted to a receive time slot counter 102 which resets the counter to an initial count. The timing pulses also pass through the detector 98 and are supplied to the counter 102 for counting. Since the counter is reset by the sync. pulse at the end of each frame of timing pulses, the count in the counter will at all times represent the identifying number of the currently present time slot.

The master control unit 86 supplies, over the line 104, signals indicating the addresses or identifying numbers of the audio channels to be received. It should be noted here that the master control unit 86 operates at a much lower clock rate than the 675 kHz rate of the receive control unit 78. Therefore, the signals which periodically appear on the line 104 are temporarily stored in the receive control unit 78 and the storage is updated as the sequence of address signals on the line 104 changes. An audio update line 106 also supplies a signal from the master control unit to the receive control unit 78 which signal, when present, enables the receive control unit to store and update the receive addresses.

In the receive control unit 78 the receive address signals appearing on the line 104 and the audio update signal appearing on the line 106 is supplied to an address and bit buffer 108. This buffer supplies the address signals to a digital comparator 110 which compares the address supplied to it with the count in the counter 102, and when the address is equal to the count of the counter, supplies a signal to an audio update control circuit 112, which is enabled by the audio update signal supplied thereto through the buffer 108. The signal produced by the digital comparator 110 produces an output from the audio update control 112, when the latter is enabled by the audio update signal, which enables the audio gate 96. Also, the output from the audio update control 112 is transferred to the shift register 100 and the bit in that register corresponding to the addressed audio channel is set to 1 so that during each subsequent frame of timing pulses the register 100 at the proper time puts out a pulse, supplied to the audio gate 96 through the audio update control 112, to enable the audio gate 96. This 1 bit stays in the recirculating shift register 100 until it is time for the channel address in question to appear again on the receive address line 104. If the address does appear again on the line 104, the above-described process repeats itself and the 1 bit stays in the register 100 to continue enabling the audio gate 96 at the proper times to cause the demodulator 95 to receive and demodulate the addressed audio channel. If the channel address signal does not reappear on the line 104 within a given time of its last appearance, then the associated 1 bit is dropped from the register 100 and the audio gate 96 is no longer enabled to cause reception of the audio channel in question.

The serial to parallel convertor 99 of the receive control unit 78 operates to remove from the input supplied thereto, by the bit extractor 93, the two binary digital bits of information appearing respectively in the two signalling and supervision time slots of each frame of signals and to convert them from their serial form to a parallel form with the first or even bit of each bit pair appearing on the line 114 and the second or odd bit of each bit pair appearing on the line 116.

The audio unit 82 includes a low pass filter 118 for the incoming audio signal received on the line 84 and another low pass filter 120 for the outgoing audio signal transmitted to the line 85. A hybrid network 122 serves to connect the two-wire telephone line 75 to the audio unit. This network 122 transfers audio signals received from the filter 118 to the telephone line 75 and transfers incoming audio signals from the telephone line 75 to the filter 120. Also, hook signals from the telephone are transferred by the network 122 to a hook detector circuit 124 in the master control unit 86.

Touch-dial dial signals from the touch-dial keys of the telephone instrument also pass by way of the hybrid network 122 through the filter 120 to a tone decoder 126 which converts the tones to binary dial signals. A tone generator 128 in the audio unit generates tones, transmitted to the telephone instrument through the filter 118 and hybrid network 122, for providing audible signals to the user of the telephone, such signals, for example, being dial tone, busy signal, reorder signal, and break-in alert signal. The tone generator 128 also operates a tone ringer 130 which, from the applique, provides a ring signal to the telephone user. If desired, the ringer of the telephone instrument may also be connected to the tone generator 128, with or without the tone ringer 130, to also provide a ring signal.

The send control unit 80 of the applique of FIG. 8 includes a send sync. detector 131 which receives input timing pulses at the 675 kHz rate from a send timing extractor 132 in the sending access unit 77. The detector 131 produuces an output sync. pulse at the end of each frame of timing pulses which are used to reset a sending time slot counter 133. The timing pulses from the send timing extractor 132 pass through the send sync. detector 131 to the counter 133 and are counted thereby so that all times the count in the counter 133 is equal to the identifying number of the currently appearing time slot. The count in the counter 133 is compared in a digital comparator 135 with the applique's own address or identifying number as supplied to the digital comparator by the feature selection unit 88 and, more particularly, by the address plug-in module plugged into the feature selection unit. Therefore, each time the count in the counter 133 equals the applique's address, indicating that the currently appearing time slot is that assigned to the applique, the digital comparator produces an enabling signal transmitted to an audio gate 136 in the send access unit 77.

The information to be transmitted from the applique is supplied to the send control unit 80 by the master control unit 86 in parallel form over lines 137 and 138. That is, the information appearing on these lines is in the form of bit pairs with the line 137 containing the even bit and the line 138 containing the odd bit. A parallel to serial convertor 139 converts these bit pairs into serial form.

The send access unit 77 is connected to the outgoing or sending leg 21 of the communication line by the line 140 and is connected to the outgoing or sending leg 22 of the timing line by the line 141. The connections of the lines 140 and 141 to the lines 21 and 22 are made at the same point along the length of the transmission cable. Therefore, when one bit of information is injected onto the communication line from the line 140, the timing pulse which gates the send access unit 77 to produce such bit injection travels over the timing line in parallel with the injected bit, and when such injected bit is received by the receiving access unit of another applique, such receiving access unit is gated to receive the bit by that timing pulse which, in travelling from the sending unit to the receiving unit, has traveled as far as the injected bit so that problems due to propagation delay in the transmission of the communication and timing signals are completely avoided.

The send timing extractor 132 of the send cable access unit 77 extracts timing pulses from the timing line 22 and supplies them to the send sync. detector 131 of the send control unit 80 and also to a bit gate 142 and the audio gate 136 of the access unit 77. The audio gate 136, when signals are present at both of its inputs, enables a pulse width modulator 144 which samples the audio signal appearing on the audio send line 85 and creates a width modulated pulse which is injected onto the communication send line 21 in the current time slot through a send communication injector network 146. Likewise, when inputs apear at both of the inputs of the bit gate 142, the gate produces an output signal which, through the action of a bit generator 147, is converted into a properly shaped binary digital pulse injected onto the communication send line 21 through the injector network 146 in the current time slot.

The applique master control unit 86 includes a memory 150 comprised of six fifty bit registers and a register processor for periodically updating the information in the registers. Three of the registers are referred to as "call" registers and are designated the "active" register, the "camp-on" register and the "reserve" register. As discussed in more detail hereinafter, these call registers collect or assemble calls made by the applique in question to some other applique or appliques. In each call register, one of the 50 bit positions is exclusively assigned to a respective one of the 50 potential line and trunk appliques. If the $i$-th bit is the bit assigned to the applique in question, this bit will always be zero. The $j$-th bit will be zero if no call is made by the $i$-th applique to the $j$-th applique, and the $j$-th bit will be 1 if a call is made by the $i$-th applique to the $j$-th applique regardless of whether such call is acknowledged or answered by the $j$-th applique.

Two other of the six registers of the memory 150 are referred to as the "even bit external" register and the "odd bit external" register, respectively. These are used to store information indicating the far end status of all other appliques in the system. This stored informationn is the information transmitted by the other appliques to the applique in question by means of the register words appearing in their signalling and supervision messages. In particular, if the applique in question is the $i$-th applique, the $i$-th bit pair of the bit registers will always be 00. The $j$-th bit positions of the even and odd bit registers will store the $i$-th bit pair of the most recent register word received from the $j$-th applique. The different statuses of the $j$-th applique indicated by the various values of the $j$-th are as explained above in connection with the discussion dealing with the register words.

The memory 150 also includes a disconnect signal register which is used as hereinafter described in the process of terminating an answered call.

The set of six registers of the memory 150 is organized as a 50-word random-access read-write memory, each word containing one bit from each of the six registers and each word representing a respective one of the fifty potential line and trunk appliques. The contents of the six registers are updated by the register processor on the basis of information received from the incoming message distributor 178, hereinafter described, over line 184, from the hook detector 124, from the dial-entry processor 152, hereinafter described, over line 160, and from the outgoing call processor, hereinafter described, over line 168. The register processor also supplied information to the audio up-date control 112, by way of the address and bit buffer 108, over lines 104 and 106, to the tone generator 128, to the dial-entry processor 152 over line 156, to the outgoing call processor 164, hereinafter described, over line 174, and to the outgoing message assembler 170, hereinafter described, over line 182. The operation of the register processor, which up-dates the six registers of the memory 150 on the basis of information received from other units in the applique and which supplies other units in the applique with information based on the contents of the six registers, is described in the discussion appearing hereinafter under the heading "Call Register Management, Incoming and Existing Calls".

The master control unit 86 also includes the previously mentioned hook detector 124. This component detects the hook status of the associated telephone instrument and produces off-hook, on-hook and hook flash signals, supplied to the memory 150, which, as hereinafter described, control access to the three different call registers and otherwise control operation of the memory. A dial entry processor 152, described in more detail hereinafter in connection with FIG. 22, is included in the master control unit and processes the binary dial signals received from the tone decoder 126 of the audio unit. By an associated line 154, the dial entry processor 152 is supplied information from the feature selection unit concerning forbidden dial entries, if any. Over the line 156, the dial entry processor 152 is supplied clearing signals and dial tone inhibit signals from the memory 150. On the line 158, the processor 152 transmits dial tone, audible ring, busy and reorder signals to the tone generator 128 of the audio unit. On the line 160, the processor 152 transmits to the memory 150 break-in and camp-on request signals and call register change signals which are produced in response to the receipt by the dial entry processor of a dial signal corresponding to a dial entry of the " # " symbol.

The master control unit also includes an outgoing call processor 164 shown as a single unit in FIG. 8. This processor 164 has basically two different functions. The first function is to handle outgoing calls and to set up variable forwarding instructions, and as to this function, it is involved primarily with the feature selection unit 88, the dial entry processor 152 and the memory 150. The second function is to cooperate with an outgoing message assembler 170 in formatting and assembling outgoing messages. That portion of the outgoing call processor 164 devoted to the first function is described hereinafter in more detail in connection with FIG. 21. The dial entry processor 152 and that portion of the outgoing call processor 164 devoted to the second function are described hereinafter in more detail in connection with FIG. 22. For the present, it may be noted that over the line 162 information is passed between the dial entry processor 152 and the outgoing call processor 164. The line 166 supplies the outgoing call processor with information from the feature selection unit 88 concerning break-in capability, forwarding capability and fixed forwarding address. The outgoing call processor 164 also has as inputs thereto signals supplied to it by the memory 150 over the line 174 and signals supplied to it over the line 176 by an incoming message distributor 178.

The outputs from the outgoing call processor 164 are supplied to the memory 150 on the line 168 and to the outgoing message assembler 170 over a line 172. Information is also sent to the outgoing message assembler 170 from the incoming message distributor 178 over the line 180 and from the memory 150 over the line 182. The message assembler assembles the various information furnished it into proper signalling and supervision messages which are output therefrom in parallel bit pair format and transmitted to the parallel to serial converter 139 of the send control unit 80. The construction of the message assembler 170 is described in more detail hereinafter in connection with FIG. 20.

The incoming message distributor 178 is described in more detail hereinafter in connection with FIG. 19. Briefly, however, its function is to distribute various portions of incoming messages to various other components of the applique. For example, on the line 176, it transmits the incoming address, existence, dood, forward and out-dial words to the outgoing call processor 164 and on the line 184 it transmits the source address and register words to the memory 150. Over the line 185, the incoming message distributor is supplied with information from the feature selection unit as to the applique's own address, and of the applique's preprogrammed capability with regard to camp-on acceptance, used to condition the distributor to either pass on or reject camp-on requests. Upon receipt of an address word addressed to the applique, the distributor sends a message send command to the outgoing message assembler 170, over the line 180, enabling the assembler to output the message assembled therein.

The construction of a trunk applique is similar to that of a line applique as shown in FIG. 8 except that the trunk applique is designed for connection by a line, equivalent to the line 75, to an outside exchange, usually through a trunk interface as previously mentioned. Also, the trunk applique offers no dial-in capability to a caller calling in from the outside exchange to which it is connected. Instead, it offers such a caller access to the system by way of a stored call originated program which holds three call destination addresses stored on a plug-in module.

When the trunk applique is accessed at its trunk line terminal, it sequences through these addresses attempting to establish a completed call. Ordinarily, the first address is that of the attendant's station, if present in the system, the second is that of a subscriber or that of a zone ringer, and the third is that used for a universal ringer call. Any address is allowable and one or more may be dead addresses. With three dead addresses, the applique does not accept incoming calls.

The trunk interface connected to a trunk applique includes logic circuitry which prevents it from passing an acknowledgement signal, acknowledging access, to the outside exchange until a completed call has been established by the stored call originating program. From the standpoint of the outside exchange, there is no response to an accessing signal, a call remains unanswered, and charges do not start until the trunk applique has established a completed internal call. From the system side, a trunk applique is similar to a line applique. It may or may not store either an optional or a forced fixed forward. It may or may not accept incoming internal calls on a camp-on basis.

Ordinarily, but not always, an out-pulser is included in the trunk interface when two-tone dialing signals are received by the trunk applique, over a talking path and from another applique. These are decoded by a tone decoder in the trunk applique and sent to the trunk interface in digital form. These digital signals are stored temporarily in the trunk interface and used to control the out-pulser which transmits equivalent rotary dial signals to the outside exchange.

When the trunk applique receives an out-dialing instruction in a signalling and supervision message on the SS channel, the out-dialing sequence contained in that instruction is also passed on to the trunk interface and used to control the out-pulser. Without an out-pulser in the trunk interface, a trunk applique cannot respond to an out-dialing instruction contained in a signalling and supervision message.

The trunk interface also contains circuitry which recognizes the presence of a dial tone offered by an outside exchange. When a dial tone is detected, audio transmission to the outside exchange is suppressed until out-pulsing has been completed. In addition, the trunk interface contains logic circuitry required for imposing any desired restrictions on the allowed out-dialing sequences sent to the outside exchange. One such restriction, for example, might reject an out-dialing sequence on a local trunk which includes an area code.

GENERAL LINE APPLIQUE FUNCTIONS

A line applique, as described above in connection with FIG. 8, is basically a logic unit and has a memory 150 comprised of six 50 bit registers. Three of these registers are "call registers" in which calls made by the applique are stored. Each call register is capable of storing one set of calls, and, therefore, the applique can handle as many as three co-existing call sets. In the ordinary two-party situation, such set of calls consists of only one call, but in a conference call situation, two or more calls may comprise a set. The three call registers are referred to as the "active" register, the "camp-on" register and the "reserve" register. The telephone instrument associated with the applique, in going from on-hook to off-hook status, automatically accesses the active call register. Subsequent call register access by the telephone instrument is obtained by means of dial entries and/or by hook flashes. When the active call register is accessed, the camp-on call register may be accessed, without call transfer, by a dial entry " # " or the reserve call register may be accessed, without call transfer, by a hook flash. In either case, access to the active call register is terminated and the call (or set of calls), if there is one, in that register is put on hold.

When either the camp-on call register or the reserve call register is accessed, the active call register may be accessed, without call transfer, by a dial entry " # ". In either case, access to the earlier accessed call register, the camp-on call register or the reserve call register, is terminated and the call, if ther is one, in that register is put on hold. In addition, when either the camp-on call register or the reserve call register is accessed, the active call register may be accessed with call transfer by a hook flash. In either case, the call (or set of calls), if there is one, in the earlier accessed call register is transferred to the active call register. If, before the call transfer, there is a call (or set of calls) in the active call register, then that call and the transferred call are automatically conferenced. After the call transfer, the earlier accessed call register is cleared and then available for another call.

Uncompleted calls are not transferred or put on hold when access is shifted from one call register to another. Instead they are cancelled. An uncompleted call is a ringer or paging call which has not been captured or a conventional call, one which ultimately accesses a line or trunk applique, which has neither been answered nor accepted on a camp-on basis. A call to a system subscriber is answered when that subscriber, in response to a ring signal from the called applique, picks up his telephone. A call to an outside exchange is answered when that exchange makes an appropriate response to the accessing signal sent to it by the called applique. When a call is accepted on a camp-on basis, it appears to the calling applique to have been answered and to have then been put on hold.

In accessing a call register, a subscriber picks up the call, if there is one, in that register. When an empty call register is accessed, the subscriber hears a dial tone.

In originating an outgoing call, the subscriber accesses any empty call register of the applique associated with his telephone and is offered a dial tone. He then makes an appropriate dial entry. While an outgoing call is still uncompleted, the caller may set up one or more "call requests" in the calling applique as discussed in more detail hereinafter. If the caller does not make use of the call request feature, the call ends up in one of the following ways: (1) somebody answers, and the call is satisfactorily completed, (2) the caller is offered a dial tone by an outside exchange, and he then out-dials in a normal fashion, (3) the caller hears a dead line (an outside exchange has acknowledged his call, but has not offered him a dial tone), an audible ring (there is no answer), or a busy signal, and after some time he hangs up cancelling the call, (4) the calling applique cancels the call and offers the caller a reorder signal which is replaced, after a short time, by a dial tone.

Outgoing calls from a line applique are initiated at such applique by a call originating dial entry made through the telephone instrument associated with that applique. The telephone instrument is in turn a touch-dial instrument having a twelve-key touch-dial pad. The twelve keys are numbered 1 to 9, 0, and *. As used herein, the symbol 0 refers to the 0 key of the touch-tone pad.

All call originating dial entries consist of either one or two digits. The possible entries, together with their uses, are as follows:

| Dial Entries | Uses |
| --- | --- |
| "0" | A translator call |
| "1" through "5" | Not used, incomplete entries |
| "6" | A capturing call which captures a ringer call of either type |
| "7" through "9" | Translator calls |
| "00" through "09" | Not used, redundant entries |
| "10" through "59" | Line or trunk applique calls |
| "60" | A universal ringer call |
| "61" through "67" | Zone ringer calls |
| "68" | A paging call |
| "69" | A capturing call which captures a paging call |
| "70" through "97" | Translator calls |
| "98" | A call which accesses the repertory dialing attachment of an applique for the purpose of setting up or cancelling a call instruction |
| "99" | A call which accesses the repertory dialing attachment of an applique for the purpose of originating a programmed call |

The dial entry " # " is used for the purpose of changing access from one call register to another, as explained above.

The dial entry "*" is used on connection with call requests, variable forwards and repertory dialing instructions. It is also used at the system clock in connection with call-forwarding instructions stored by extended translators.

An incomplete entry, a one-digit entry 1, 2, 3, 4 or 5, is not acted on by the applique which waits for the entry to be completed. A redundant entry, 0 followed by additional digits, or 10 through 97 followed by additional digits, is processed as though the additional digits were not entered.

A line applique may be equipped with a repertory dialing attachment through which an outgoing call may be initiated, as noted above, by a dial entry 99 followed by a two-digit dial entry, drawn from the set 10 through 51 which accesses a program module in the repertory dialing attachment. The repertory dialing attachment has a number of program modules each of which stores two identifying numbers and an out-dialing instruction. The first identifying number is the number of the module and the second identifying number is either the number of a directly addressable applique connected to the outside exchange through which the programmed call is to be made, or the identifying number of a standard translator which routes calls to an indirectly addressable applique connected to that exchange. The out-dialing instruction, which consists of 14 digits or fewer, is made available to the called applique through which the outside exchange is accessed. Both the second number and the out-dialing instruction may be set up or cancelled by appropriate dial entries made at the applique associated with the repertory dialing attachment.

At a line applique equipped with a repertory dialing attachment, a program module may be accessed by a dial entry 99 followed by a two-digit entry which is the same as the identifying number of the module. If the accessed module stores a program, that is, a second identifying number and an out-dialing instruction, an outgoing call is initiated. If the module does not store a program, or if the accessed module is not installed in the repertory dialing attachment, access to the attachment is automatically cancelled by the applique, the caller hears a reorder signal which is replaced, after a short time, by a dial tone.

When the telephone instrument associated with a line applique is in on-hook status, and when all three call registers in the applique are empty, the applique accepts any incoming call and places it in the active call register. With the instrument in on-hook status, the existence of a non-empty active call register activates the ringer 130 associated with the applique. Also as mentioned previously, if desired, through an accessory, the conventional ringer included in the telephone instrument may also be activated.

When a telephone instrument is in on-hook status and its applique has at least one non-empty call register, the applique accepts an incoming call only if that call is accompanied by a break-in request set up in the calling applique. Indication of such a request set up appears in the signalling and supervision message of the calling applique. An incoming call accompanied by a break-in request is placed in the active call register. Subsequent incoming calls accompanied by break-in requests are also placed in that register, and other incoming calls without break-in requests are not accepted.

When a ringing telephone is answered by a subscriber, it automatically accesses the call register and picks up the call or calls in that register. If more than one incoming call has been accepted, all of the calls are conferenced and become a signal call when the subscriber answers. If one or more of the calls is accompanied by a break-in request, that fact is announced to the subscriber when he answers by a break-in alert signal consisting of a series of short beeps which are locally generated by the called applique and are heard by all of the callers.

When the telephone instrument associated with an applique is in off-hook status, the applique does not accept an incoming call which is not accompanied by a call request.

With the telephone instrument in off-hook status, an incoming call accompanied by a break-in request is accepted and placed in the accessed call register. If there is an existing call in that call register, the incoming call is automatically conferenced with the existing call. The arrival of an incoming call on this basis is announced by a break-in alert signal which is heard by the subscriber and every one else involved in the conferenced call.

With the telephone instrument in off-hook status, an incoming call accompanied by a camp-on request is accepted and placed in the camp-on call register only if both of the following conditions co-exist: (1) the camp-on call register is unaccessed and empty, and (2) the applique does not store a restriction which prevents acceptance of an incoming call on a camp-on basis. If an incoming call is accepted on a camp-on basis, it appears to the caller to have been accepted and put on hold. The called subscriber is notified of the acceptance of such a call by a camp-on alert signal generated locally by his applique and heard only by the subscriber. He may then, if he wishes, access the camp-on register and pick up the call, which he can then put back on hold or transfer to the active call register where it will be conferenced with any call already held in that call register.

An incoming call accompanied by a break-in request is placed in the reserve call register if that call register is accessed when the incoming call arrives. Except for this possibility, no incoming call is ever placed in the reserve call register, which is, therefore, almost always available for making outgoing calls.

An existing call is terminated by hanging up. the call register which was accessed at the time when the telephone instrument went on-hook status is then cleared. If, after that call register is cleared, the active call register is non-empty, the subscriber's phone rings. If, after the clearing process, the active call register is empty but the reserve call register is non-empty, the call in the reserve register is transferred to the active call register and the phone rings. If, after the clearing process, the active call register and the reserve register are both empty, but the camp-on call register is non-empty, the call in the camp-on call register is transferred to the active call register and the phone rings. If, after the clearing process, all three call registers are empty, the applique goes to a quiescent state as soon as it receives acknowledgement of all disconnect signals sent out in connection with the call termination.

At the time of call termination, the applique sends appropriate disconnect signals, individually addressed to the other appliques concerned, by including such signals in its signalling and supervision message. Disconnect signals are sent only to those appliques which are involved in the terminated call and not involved in an unterminated call, if there is one, in another call register. To an applique involved in both the terminated call and an unterminated call, it appears that the terminating applique has put the live call on hold. An applique involved only in an unterminated call receives no signal. That call was, and remains, on hold at the terminating applique. It should be noted that a call register must be accessed in order to terminate a call in that register. Accordingly, the terminated call is picked up, leaving other calls on hold, and is then terminated. An incoming disconnect signal from another applique causes that other applique to be dropped from every call in which it is involved.

A line applique may also store a fixed forward instruction which may be either an optional fixed forward or a forced fixed forward. The existence of a fixed forward of either type causes a calling applique to redirect an unanswered call, not accompanied by a break-in request, to a new destination within the system. In addition, a forced fixed forward causes the calling applique to redirect an unaccepted call, and an optional fixed forward has the same effect when a fixed forward request is set up in the calling applique.

A line applique may also store a variable forward instruction, whether or not a fixed forward instruction is also stored, unless this is prevented by a restriction installed in the applique. A variable forward may be set up or cancelled by appropriate dial entries. When one is set up, it displaces any existing fixed forward. It has the same effect as a forced fixed forward and may also include an out-dialing instruction so that a call can be redirected through an outside exchange to an off-premises destination. In addition, the existence of a variable forward prevents the applique from accepting any incoming call not accompanied by a break-in request.

A line applique, such as described above in connection with FIG. 8, can be connected, with some loss of capability, to a telephone instrument with a ten key dial. It can also be connected to an instrument without a dial, in which configuration a subscriber can accept calls but is totally unable to originate any calls.

If a subscriber requires more call handling capability than is offered by a single line applique, two or more line appliques can be connected, as at an attendant's station, through an accessory interface to a single telephone instrument equipped with a twelve-key dial, pickup keys and a hold button.

A line applique can also be used, generally with an interface, to provide connection between the system and an outside exchange. The use of a line applique in this manner offers dial-in access to the system to an informed caller equipped with a ten key or a twelve key touch-dial pad. If dial-in access from an outside exchange is not required, the use of a trunk applique to provide connection with an outside exchange is nearly always preferred.

FEATURE-SELECTION UNIT

Figure 18:
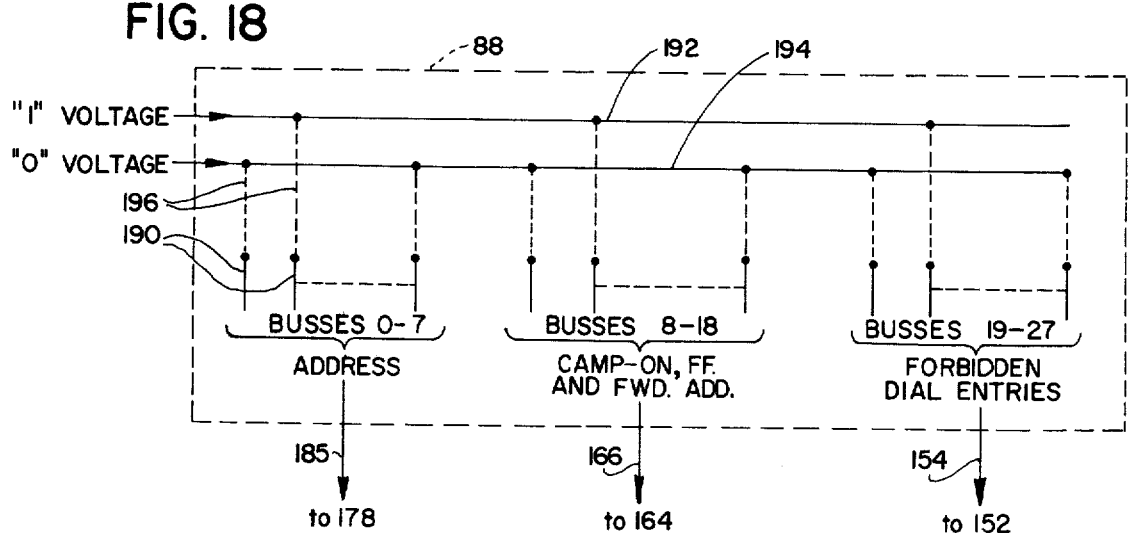
FIG. 18 is a block diagram showing further details of the feature selection unit of FIG. 8.

Referring to FIG. 18, the feature-selection unit of the applique of FIG. 8 is thereshown in more detail. This unit stores 28 bits of information, and makes this information available to other units in the applique. The stored information appears on twenty-eight output busses 190, 190, numbered 0 to 27 and each of which is connected to one or the other of two input voltage lines 192 and 194. The line 192 is maintained at a voltage level interpreted as a "logical zero" so that connection of a buss 190 to it establishes a voltage level, on the buss, which is interpreted as a "logical zero" by other units in the applique. The other line 194 is maintained at a voltage level interpreted as a "logical one" so that connection of a buss 190 to it establishes a voltage level, on the buss, which is interpreted as a "logical one" by other units in the applique. The connections between the lines 192 and 194 and the busses 190, 190 may be made in various ways, but preferably are established by using a socket connector and pre-wired plug-in modules. Exemplary connections are indicated by the broken lines 196, 196 and once made, they set up a pattern of stored binary information on the busses 190, 190. The stored information can be easily changed by replacing plug-in modules, but it is otherwise fixed.

The feature-selection unit 88 stores the information listed below:

a. Eight bits, appearing on busses 0 to 7, which specify the "Address" of the applique. These busses constitute the line 185 of FIG. 8 and supply the address to the incoming message distributor 178.

b. Two bits, appearing on busses 8 and 9, which indicate whether or not a fixed forward call-forwarding instruction is stored by the applique and which also indicate, if such an instruction is stored, whether that instruction is "optional" or "forced".

c. Eight bits, appearing on busses 10 to 17, which specify the forwarding address contained in the fixed forward call-forwarding instruction stored by the applique, if one is stored.

d. One bit, appearing on buss 18, which specifies whether the applique may or may not be permitted to accept incoming calls on a camp-on basis. This buss together with busses 8 to 17 constitute the line 166 of FIG. 8 which supplies information to the outgoing call processor 164.

e. Nine additional bits, appearing on busses 19 to 27, which specify whether or not operation of the applique is restricted in certain respects as to its capability to act on certain dial entries. These restrictions are sometimes referred to as forbidden dial entries. The busses 19 to 27 constitute the line 154 of FIG. 8 and supply the forbidden dial entry information to the dial entry processor 152.

The nine possible restrictions, controlled by busses 9 to 27, each of which may be independently specied, are as follows:

. The applique may or may not be permitted to set up a break-in request in response to appropriate dial entries.

. The applique may or may not be permitted to set up a variable forward call-forwarding instruction in response to appropriate dial entries.

. The applique may or may not be permitted to originate a paging call in response to a two-digit dial entry 68.

. The applique may or may not be permitted to originate a translator call in response to a one-digit dial entry 7.

. Similar to (d) above, but operating on a one-digit dial entry 8.

. Similar to (d) above, but operating on a one-digit dial entry 9.

. Similar to (d) above, but operating on all two-digit dial entries 70 through 79.

. Similar to (d) above, but operating on all two-digit dial entries 80 through 89.

. Similar to (d) above, but operating on all two-digit dial entries 90 through 97.

INCOMING MESSAGE DISTRIBUTOR

Referring to FIG. 19, the incoming message distributor 178 of FIG. 8 is thereshown in more detail as being comprised of a start of message detector 200, a message bit-pair counter 202, a message word counter 204, a word-counter gate 206, a word-counter control 208, a message word switch 210, a gated address comparator 212, an address word register 214, an existence word register 216, a dood word register 218, a forwarding word register 220, and an instruction words register 222.

Incoming signalling and supervision message bit-pairs are brought to the incoming message distributor 178 on the lines 114 and 116, and all incoming bit-pairs appearing on these lines are presented to the start of message detector 200, to the message bit-pair counter 202, to the word-counter gate 206, and to the message word switch 210. The start of message detector 200 identifies the start of an incoming signalling and supervision message. The start is identifiable as a sequence of five or more bit-pairs 00 followed by a bit-pair 11. When this six-pair sequence occurs, the following bit-pair is the first bit-pair (pair No. 0) of the first word (word No. 0 of an incoming signalling and supervision message. (See FIGS. 6 and 7 and the related description for the word and message format.) When the start of a message is detected by the start of message detector 200, it sets the message bit-pair counter 202 and the message word counter 204 to state zero, by a reset signal appearing on the line 224, and it clears the address word register 214, the existence word register 216, the dood word register 218, the forwarding word register 220 and the instruction words register 222, by a clear signal appearing on the line 226.

The message bit-pair counter 202 is a five-state counter which cycles through states 0, 1, 2, 3, 4, 0, 1, and so on. It is advanced from one state to the next by the arrival of an incoming bit-pair, and may be forced to state No. 0 by a reset signal. The message word counter 204 is a 22-state counter. When the word-counter gate 206 is open, the arrival of an incoming bit-pair advances the message word counter 204 from one state to the next unless it is in state No. 21 (in which case the arrival of an incoming bit-pair has no effect). That is, the counter 204 is not a cyclic counter. Instead, it is one which goes to state No. 21 and stays there until reset by a reset signal from the start of message detector 200. When the word-counter gate 206 is closed, the message word counter 204 is not advanced. The message word counter 204 may be forced to state No. 0 by a reset signal, and it may also be forced to states No. 3, No. 16, No. 17 or No. 21 by signals from the word-counter control 208. The word-counter gate 206 is open when the message bit-pair counter 202 is in state No. 4, and is closed when that counter is in any other state.

Incoming bit-pairs are routed to various destinations by the message word switch 210 which senses and is responsive to the state of the message word counter 204. In particular, bit-pairs are sent by the switch 210 to the following destinations depending on the state or count of the word counter 204:

a. to the address word register 214, when the word counter is in state No. 0;
b. to the existence word register 216, when the word counter is in state No. 1;
c. to the dood word register 218, when the word counter is in state No. 2;
d. to the memory 150 on the line 184, when the word counter is in states No. 3 through No. 15 (indicating register words);
e. to the forwarding word register 220, when the word counter is in state No. 16; and
f. to the instruction words register 222, when the word counter is in states No. 17 through No. 20.

The message word switch 210 does not pass incoming bit-pairs to any destination when the message word counter 204 is in state No. 21.

The contents of the existence word register 216 are sent to the word-counter control 208 when the message bit-pair counter 202 is in state No. 0 and the message word counter 204 is in state No. 3, at which point the whole of the existence word has been loaded into the existance word register 216. The word-counter control 204 senses the state, at all times, of the message-word counter 204. It also determines, on the basis of the information provided by the existence word, which other words are omitted from the incoming message. At appropriate times, the word-counter control 208 sends signals to the message word counter 204 to force it to specified states so as to skip over those states which correspond to words that are not included in the message.

The contents of the address word register 214 are sensed by the gated address comparator 212 for comparison with the applique's own address. That address is made available to the gated address comparator 212 by the feature-selection unit 88 over line 185. The comparison is made when the message bit-pair counter 202 is in state No. 0 and the message word counter 204 is in state No. 1, at which point the whole of the address word has been loaded into the address word register 214. If the comparison shows that the address word of the incoming message contains the applique's own address, signals are sent to the outgoing message assembler 170 over line 180 and to the outgoing call processor 164 over line 176 to instruct those units to assemble and deliver an outgoing signalling and supervision message for transmission. In addition, a signal is sent to the word-counter control 208 which, in response to that signal, forces the message word counter 204 to state No. 21.

The states of the message bit-pair counter 202 and the message word counter 204 are made available to the memory 150 over the line 184 and to the outgoing call processor 164 over line 176. The contents of the address word register 214 are also made available to the memory 150 over line 184. The contents of the address word register 214, the existence word register 216, the dood word register 218, the forwarding word register 220 and the instruction words register 222 are also made available to the outgoing call processor 164 over line 176.

OUTGOING MESSAGE ASSEMBLER

Figure 20:
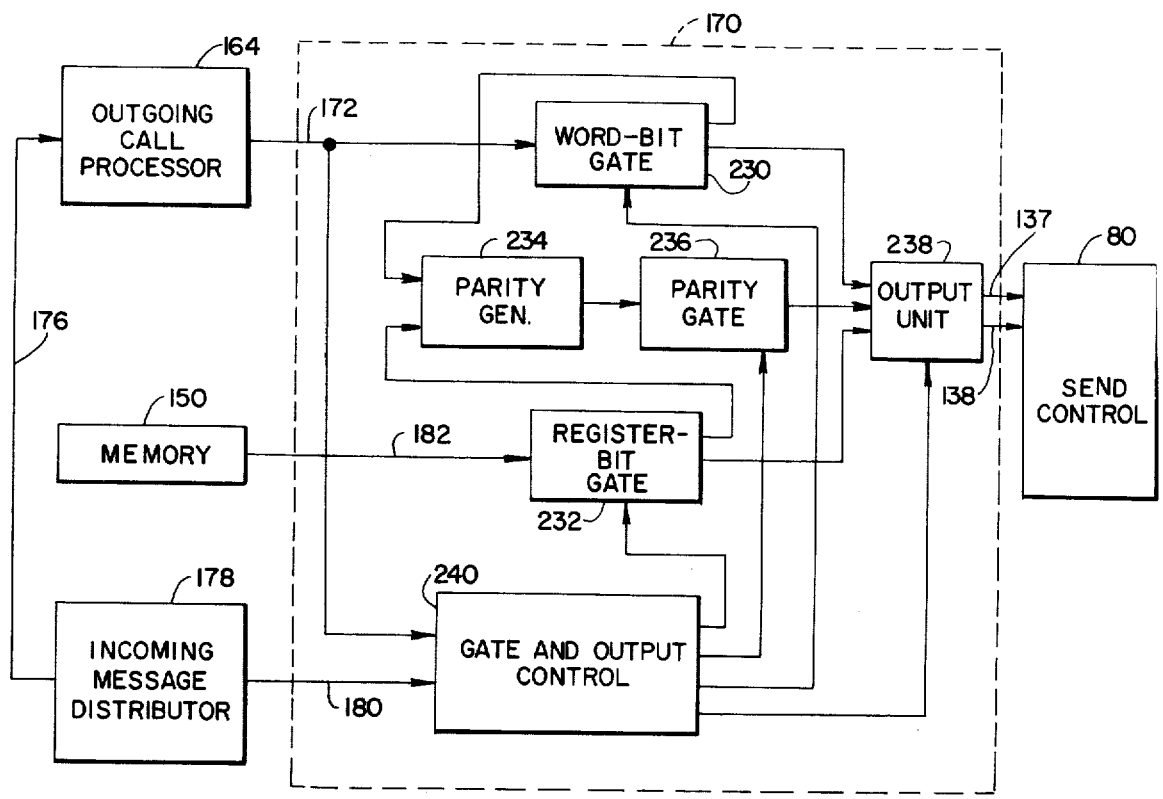
FIG. 20 is a block diagram showing further details of the outgoing message assembler of FIG. 8.

FIG. 20 shows in more detail the construction of the outgoing message assembler 170 of FIG. 8. Referring to FIG. 20, the message assembler 170 comprises a word-bit gate 230, a register-bit gate 232, a parity generator 234, a parity gate 236, an output unit 238 and a gate and output control 240. The message assembler 170 receives information bits and control signals from the outgoing call processor 164 over the line 172, information bits from the memory 150 over the line 182, and control signals from the incoming message distributor 178 over the line 180. It transmits bit-pairs, comprising a message to be sent from the applique, to the send control 80 over the lines 137 and 138.

Information bits from the outgoing call processor 164 are presented to the word-bit gate 230. If that gate is open, it passes those bits to the output unit 238 and to the parity generator 234. Information bits (the register words) from the memory 150 are presented to the register-bit gate 232. If that gate is open, it passes those bits to the output unit 238 and to the parity generator 234. The parity generator 234 receives the eight information bits of an outgoing word, either from the word-bit gate 230 or from the register-bit gate 232. In either case, it generates a parity bit and a terminal bit, which are the last two bits in the outgoing word, and presents them to the parity gate 236. If that gate is open, it passes those bits to the output unit 238.

The output unit 238 receives bits presented to it by the word-bit gate 230, by the register-bit gate 232, or by the parity gate 236 and passes those bits to the send control unit 80 over the lines 137 and 138 if it, the output unit, is enabled. Control signals from the incoming message distributor 178 and from the outgoing call processor 164 are received by the gate and output control 240. In response to those control signals, the gate and output control sends gate-opening and gate-closing signals to the word-bit gate 230, to the register-bit gate 232 and to the parity gate 236 and sends enabling and disabling signals to the output unit 238. In particular, when the address word of an incoming signalling and supervision message contains the applique's own address, signals are sent by the incoming message distributor 178 to the outgoing message assembler 170 over line 180 and to the outgoing call processor 164 over line 176 to instruct those units to assemble and deliver an outgoing signalling and supervision message for transmission.

Prior to receiving the control signal from the incoming message distributor instructing it to assemble and deliver a message, the outgoing message assembler 170 is in a quiescent state in which the word-bit gate 230, the register-bit gate 232 and the parity gate 236 are closed and the output unit 238 is disabled. The control signal from the incoming message distributor 178, which arrives on the line 180, is received by the gate and output control 240 and, in response to that signal, the control 240 sends an enabling signal to the output unit 238 and sends a gate-opening signal to the word-bit gate 230. The outgoing call processor 164, which receives a message-initiating control signal from the incoming message distributor 178 over the line 176, now begins to send information bits to the outgoing message assembler 170 over line 172. These bits are received by the word-bit gate 230.

The outgoing call processor 164 sends two information bits in each of four successive commutation cycles. These bits are passed through the open word-bit gate 230, to the parity generator 234 and to the output unit 238, which output unit presents them in pairs to the send control unit 80 on the lines 137 and 138. After four commutation cycles, during which eight bits have been transmitted by the outgoing call processor 164, that unit sends a control signal to the outgoing message assembler 170 over line 172. This control signal is received by the gate and output control which, in respose, sends a gate-opening signal to the parity gate 236. The parity generator 234 then delivers a parity bit and a terminal bit, through the open parity gate 236, to the output unit 238 which presents them to the send control unit 80 over the lines 137 and 138. This sequence of operations completes the transmission of the existence word of the outgoing message, the existence word being the first word following the address word of the message.

The outgoing call processor 164 now sends one of three different control signals to the outgoing message assembler 170 depending on the nature of the remainder of the outgoing message to be transmitted. In all three cases, the incoming control signal is received and acted-on by the gate and output control 240. The three different cases are as follows:

a. If the next word in the outgoing message is to be a register word, the outgoing call processor 164 sends a signal to the gate and control unit 240 which causes the unit 240 to send a gate-opening signal to the register-bit gate 230 and a gate-closing signal to the parity gate 236.

b. If the next word in the outgoing signalling and supervision message is not to be a register word, the outgoing call processor 164 sends a signal to the gate and control unit 240 which causes the unit 240 to send a gate-opening signal to the word-bit gate 230 and a gate-closing signal to the parity gate 236.

c. If there is to be no next word in the outgoing signalling and supervision message, the outgoing call processor 164 sends a signal to the gate and control unit 24 which causes the unit 240 to send a gate-closing signal to the parity gate 236 and a disabling signal to the output unit 238, thereby returning the outgoing message assembler to its quiescent state and terminating the outgoing message.

If the next word is to be a register word (case (a) the eight information bits of the next word are obtained by the outgoing message assembler 170 from the memory 150 over line 182. They are received by and passed through the open register-bit gate 232 to the parity generator 234 and to the output unit 238 for presentation to the send control unit 80 over the lines 137 and 138. After the transmission of eight information bits obtained from the memory 150, the outgoing call processor 164 sends a control signal to the outgoing message assembler 170. This signal is received by the gate and output control 240 and causes that unit to send a gate-closing signal to the register-bit gate 232 and a gate-opening signal to the parity gate 236. The parity generator 234 then delivers a parity bit and a terminal bit, through the open parity gate, to the output unit 238 which presents them to the send control unit 80 over the lines 137 and 138. This latter sequence of operations completes the transmission of a register word. The outgoing call processor 164 now sends one of the aforementioned three different control signals to the outgoing message assembler 170, depending on the nature of the remainder of the message, and the outgoing signalling and supervision message is either continued or terminated in the appropriate way.

If after the completion of the transmission of one word, the next word of the message is to be a word other than a register word (case (b)), the eight information bits of such next word are sent to the outgoing message assembler 170 by the outgoing call processor 164 over line 172. They are received by and passed through the open word-bit gate 230 to the parity generator 234 and to the output unit 238 for presentation to the send control unit 80. After transmission of these eight information bits by the outgoing call processor 164, that unit sends a control signal to the outgoing message assembler 170. This signal is received by the gate and output control 240 and causes that unit to send a gate-closing signal to the word-bit gate 230 and a gate-opening signal to the parity gate 236. The parity generator 234 then delivers a parity bit and a terminal bit, through thee open parity gate 236, to the output unit 238 which presents them to the send control unit 80. This sequence of operations completes the transmission of a word which is not a register word and the outgoing call processor 164 now sends one of the aforementioned three different control signals to the outgoing message assembler 170 and the outgoing signalling and supervision message is either continued or terminated in the appropriate way.

If after the completion of the transmission of one word, there is to be no further words in the message (case (c)), the outgoing message assembler 170 is put into its quiescent state by the signal described in case (c) and the outgoing signalling and supervision message is terminated.

OUTGOING CALL PROCESSOR — FORMATTING AND ASSEMBLING OUTGOING MESSAGES

As previously mentioned, the outgoing call processor 164 has two different basic functions. In its first function, it is involved with the feature-selection unit 88, the dial-entry processor 152, and the memory 150 in handling outgoing calls and in setting up variable forwardingg instructions. In its second function, it is also involved with those units and with the outgoing message assembler 170 in formatting and assembling outgoing messages. This section describes that portion of the outgoing call processor which is devoted to its second function of cooperating in the formatting and assembling of outgoing messages. In FIG. 8 the dial entry processor 152 and the outgoing call processor 164 are for convenience of discussion illustrated as functionally separate units. They are, however, physically interrelated insofar as they both, in the illustrated embodiment, share a common instruction processor 298 as hereinafter described. Therefore, in FIG. 21 the dial-entry processor and the outgoing call processor are shown as a single unit identified by the reference notation "152 and 164."

Figure 21A:
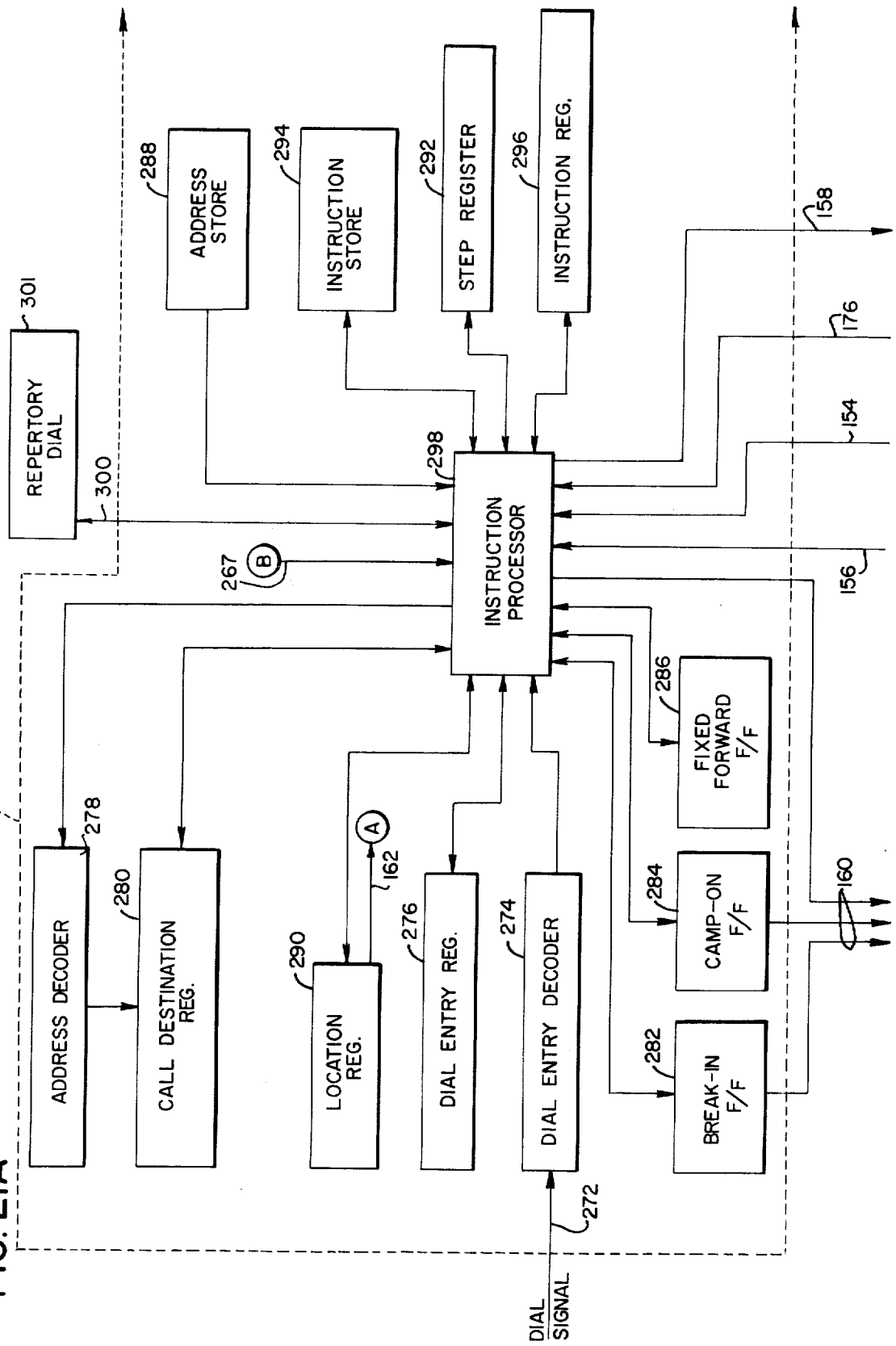

Referring to FIG. 21, that portion of the illustrated unit 152 and 164 which serves principally as the outgoing call processor 164 of FIG. 8 comprises an existence word register 250, an existence word control 252, an instruction words register 254, a bit-pair counter 256, a word counter 258, a word-counter gate 260, a word-counter control 262 and a bit-pair control 264. The existence word register 250 holds the eight information bits of the existence word of the applique's outgoing message. These are maintained in current status by the existence word control 252, which receives information regarding the status of the applique from the memory 150 over line 174, from the feature-selection unit 88 over line 166, from the instruction words register (which stores a variable forwarding instruction when one is stored), over the line 266, and from a location register 290 over line 162. The location register is basically a part of the dial-entry processor described in more detail hereinafter. The conditions in the applique which determine the status of the eight information bits of the existence word are described in the previous section entitled "Signalling and Supervision Word Structure". The question of loading bits into the instruction words register 254 over the line 267 is discussed in the section immediately following this.

When the outgoing call processor portion of the unit 152 and 164 shown in FIG. 21, is in its quiescent state, that is, when no outgoing message is being assembled, the bit-pair control 264 is disabled and no information is passed from it to the outgoing message assembler 170 over line 172. When an outgoing message is to be sent, a signal is received from the incoming message distributor 178 over line 176. This signal is received by the bit-pair counter 256, which it forces to state 0, and by the word counter 258, which it forces to state 1.

The bit-pair counter 256 is a five-state counter which cycles through states 0, 1, 2, 3, 4, 0, 1, and so on. It is advanced once during each commutation frame by a frame-synchronization signal, which appears on the line 268 and which may be taken from the receiving sync. detector 98 of the receive control unit 78 of FIG. 8, and it may be forced to state 0 as already mentioned. The word counter 258 is a 21-state counter which is advanced from state 1 through states 2, 3, and so on to state 21. Having reached state 21, it remains in that state until it is forced to state 1. The word counter 258 is advanced by a frame-synchronization signal if the word-counter gate 260 is open. When that gate is closed, the word counter is not advanced. The word-counter gate 260 is open when the bit-pair counter 256 is in state 4, and is otherwise closed.

The word-counter control 262 receives information bits defining the existence word from the existence word register 250, over the line 270, and on the basis of such bits, determines which words are to be omitted from an outgoing message. It sends forcing signals to the word counter 258 at appropriate times, forcing that counter to skip over those states which correspond to words not included in the message. More specifically, the word-counter control 262 can force the word counter 258 to states 3, 16, 17, or 21.

Operation of the bit-pair control 264 is determined by the states of the bit-pair counter 256 and the word counter 258. In particular, the bit-pair control 264 operates as follows:

a. The bit-pair control 264 is always disabled when the word counter 258 is in states 3 through 15, during which time information bits (comprising register words) are sent to the outgoing message assembler 170 from the memory 150, over line 182 (FIG. 8), under the control of the word counter 258 and the bit-pair counter 256 which send control signals to the memory 150 over line 168.

b. The bit-pair control 264 is always disabled when the word counter 258 is in state 21, a state which that counter reaches at the conclusion of an outgoing message.

c. The bit-pair control 264 is always disabled when the bit-pair counter 256 is in state 4, during which time parity and terminal bits for the outgoing message are generated by the outgoing message assembler 170 as previously described.

d. With the word counter 258 in state 1 and the bit-pair counter 256 in states 0, 1, 2, or 3, the bit-pair control 264 selects appropriate bits (the first, second, third, or fourth bit pairs) respectively, from the existence word register 254 and passes them to the outgoing message assembler 170 over line 172.

e. With the word counter 258 in state 2 and the bit-pair counter 256 in state 0, 1, 2 or 3, the bit-pair control 264 selects appropriate bits (defining a dood word) from the location register, hereinafter described, in the dial-entry processor 152 and passes them to the outgoing message assembler 170 over line 172.

f. With the word counter 258 in state 16 and the bit-pair counter 256 in states 0, 1, 2 or 3, the bit-pair control 264 selects appropriate bits from the fixed forward stored by the feature-selection unit 88 and supplied by the line 166 and passes them to the outgoing message assembler 170 over line 172.

g. With the word counter 258 in states 17, 18, 19 or 20 and the bit-pair counter 256 in states 0, 1, 2 or 3, the bit-pair control 264 selects appropriate bits from the instruction words register 256 and passes them to the outgoing message assembler 170 over line 172.

DIAL ENTRY PROCESSOR AND OUTGOING CALL PROCESSOR — OUTGOING CALLS AND VARIABLE FORWARDING INSTRUCTIONS

As mentioned at the beginning of the preceding section, the outgoing call processor 164 has basically two different functions. This section is a discussion of its first function in which it is intimately involved with the dial entry processor 154 in handling outgoing calls and setting up variable forwarding instructions. This discussion is made in connection with FIG. 21 which shows in greater detail components making up both the dial-entry processor 152 and the outgoing call processor 164 of FIG. 8.

Referring to FIG. 21, that portion of the unit 152 and 164 thereshown which serves as the dial-entry processor and also as that portion of the outgoing call processor concerned with handling outgoing calls and setting up variable forward instructions includes a dial-entry decoder 274, a dial-entry register 276, an address decoder 278 a call destination register 280, a break-in flip-flop 282, a camp-on flip-flop 284, a fixed forward flip-flop 286, an address store 288, a location register 290, a step register 292, an instruction store 294, an instruction register 296 and an instruction processor 298. The instruction store 294 is a read-only random-access memory which contains all of the instructions for operation of the unit 152 and 164. At appropriate times, the instruction processor 298 fetches an instruction from the instruction store 294 and places that instruction in the instruction register 296. Each instruction specifies, either absolutely or conditionally, thee step-number of the following instruction, and one of the operations carried out by the instruction processor 298 at each step is the required up-dating of the contents of the step register 292 which then identifies the instruction to be fetched from the instruction store following completion of the other operations specified by the current instruction.

The steps in the process by which an outgoing call is handled are described hereinafter in detail in the section entitled "General Considerations Concerning Outgoing Calls", and that description states the nature of the instructions stored in the instruction store. These steps are also shown by the flow diagrams of FIGS. 9 to 14. The remainder of this section consists of comments on how the components of FIG. 21 operate during various steps in the call-handling sequence, the purpose of the comments being to provide a better understanding of the flow of information. These comments should be read in conjunction with the statements of the steps made in the section entitled "General Considerations Concerning Outgoing Calls". Applicable comments, once made, are not repeated when they apply at later steps.

Step No. 1

The step register 292, when the combined units of FIG. 22 are cleared, always holds step No. 1. The instruction processor 298 then fetches the corresponding instruction from the instruction store 294 and places it in the instruction register 296. Information about which call register (if any) is accessed, and about whether or not that call register is empty, is made available to the instruction processor 298 by the memory 150 over line 156. Information about the dial-entry (if any) made by a subscriber is made available by the tone decoder 126 (FIG. 8) over the line 272 to the dial-entry decoder 274 which passes the decoded information to the instruction processor 298.

Step No. 2

In case (a) (first dial entry is " # "), the instruction processor 298 sends an appropriate signal to the memory 150 over line 160 to access a new call register. The distinction between cases (b) and (c) is made by the instruction processor 298 on the basis of information made available to it by the feature-selection unit 88 over line 154. A decoded dial-entry, if it is accepted, is placed in the dial-entry register 276 by the instruction processor 298. In case (c), the dial-entry "*" causes the instruction processor 298 to clear the instruction words register 254 by a clear signal transmitted over the line 267. Subsequent dial-entries are decoded and loaded into that register over the line 167.

Step No. 5

In case (a), the dial-entry register 276, the call destination register 280, the location register 290, and the instruction register 296 are cleared. The breakin flip-flop 282, the camp-on flip-flop 284, and the fixed-forward flip-flop 286 are reset. The step register is forced to state 1.

Step No. 7

The repertory dialing attachment 301, if present, and as shown in FIG. 21 is external to the applique and is connected to the instruction processor 298 by the line 300 over which signals are passed between it and the instruction processor. Its operation is discussed further in the subsequent section entitled "Outgoing Calls — Programmed and Repertory — Dialing Calls".

Step No. 9

The dial-entry is taken from the dial-entry register 276 by the instruction processor 298 and presented to the address decoder 278, which delivers a decoded eight-bit binary address to the call destination register 280.

Note that call-request dial-entries, mentioned in the discussion following the hereinafter appearing statement of Step No. 9 are discussed more fully in the section entitled "Call Requests". The effect of a permitted call-request dial-entry is to cause the instruction processor to set the corresponding one of the three flip-flops 282, 284 and 286. That is, a dial-entry signifying a break-in request sets the break-in flip-flop 282; a dial-entry signifying a camp-on request sets the camp-on flip-flop 284; and a dial-entry signifying a fixed forward request sets the fixed forward flip-flop 286.

Step No. 10

For case (a), where the call destination address is one associated with a ringer, paging or capturing call, the special processing scheme which is thereafter followed is described in the section entitled "Outgoing Calls — Ringer, Paging and Capturing Calls".

Step No. 11

The contents of all incoming messages are made available to the instruction processor 298 by the incoming message distributor 178 over line 176.

Step No. 12

The three flip-flops 282, 284 and 286, which can be set and reset by the instruction processor 298, can also be read by that unit.

Step No. 21

The states of the break-in flip-flop 282 and the camp-on flip-flop 284 are made available to the memory 150 over the line 160.

Step No. 22

This information is acquired by the memory 150 from the incoming message and passed to the instruction processor 298 over the line 156.

Referring to the section entitled "Outgoing Calls — Programmed and Repertory — Dialing Calls", the three call destinations involved in the stored program of a trunk applique are stored in the address store 288 of FIG. 22. Those involved in repertory dialing are stored in the associated external repertory-dialing attachment.

CALL FORWARDING AND CALL ORIGINATING INSTRUCTIONS

A call forwarding instruction may be stored in an applique or a translator, and may re-direct a call, addressed to that applique or translator, to another destination. The call-forwarding instruction appears in the signalling and supervision message of the applique or translator in which it is stored, and call re-direction is carried out, by a calling applique, on the basis of information contained in that message. Whether or not a call is re-directed depends on the status of the called applique or translator, as shown in its SS message, and on the call requests set up in the calling applique.

A call-forwarding instruction may be either a "fixed forward", stored in wired form, or a "variable forward", which can be set up or cancelled by an appropriate dial entry.

An applique may or may not store a fixed forward. If it stores one, the fixed forward may be either "optional" or "forced". Either type of fixed forward always re-directs an un-answered call, addressed to the applique in which the fixed forward is stored, after a reasonable time, unless that call is accompanied by a break-in request. In the absence of any call-forwarding instruction stored by the called applique, such a call is automatically cancelled, after a reasonable time, by the calling applique. A forced fixed forward automatically re-directs a call which would otherwise cause the calling applique to offer its caller a busy signal. An optional fixed forward re-directs such a call only if a fixed forward request has been set up in the calling applique. If no call-forwarding instruction is stored by the called applique, a call of this type is automatically cancelled when a fixed-forward request is set up in the calling applique.

The address stored, by an applique, as a fixed forward may be any address used by the system, although ordinarily it is the address of another applique or one of the addresses used for ringer calls. In particular, an applique may store its own addresss as a fixed forward in order to circumvent the time-out feature which limits the duration of an un-answered call when that call is not accompanied by a break-in request. When an applique stores its own address as a fixed forward, it can store it as an optional fixed forward, which allows a caller, who has not set up a fixed-forward request, to hear a busy signal, or as a forced fixed forward. An applique may also store, as a fixed forward, the address used for a paging call.

Two or more appliques may be grouped in a forwarding loop. Each one stores a fixed forward, either optional or forced, which re-directs calls, under appropriate circumstances, to another applique in the group. A call addressed to any applique in the group is then trapped by the forwarding loop and re-directed from one applique to another in the group until it is completed or until it is cancelled by the caller.

An applique may or may not store a restriction which prevents a variable forward from being set up in that applique. In the absence of such a restriction, an applique may store a variable forward, when one is set up, whether or not it also stores a fixed forward of either type. Note, however, that when a variable forward is set up the repertory dialing attachment cannot be accessed for the purpose of originating a call.

A variable forward contains an internal (system) address and may or may not contain an out-dialing instruction as well. The internal address must be one which can be set up by a dial entry at the applique in which the variable forward is stored. It cannot, therefore, be the address of an indirectly-addressable applique, nor can it be any address which corresponds to a call-originating dial entry against which a restriction is stored in the applique. The out-dialing instruction is a sequence of not more than seven digits. Note that an applique may store its own address as a variable forward or, if it is indirectly-addressable, that of the translator or other applique through which it is accessed. In this case, the applique cannot be accessed except by a call which is accompanied by a break-in request.

When a variable forward is stored, it is included, as a call-forwarding instruction, in the signalling and supervision message of the applique in which it is stored and the fixed forward call-forwarding instruction, if one is stored, is dropped from that message. The internal address of the variable forward re-directs calls in exactly the same way as the address of a forced fixed forward. In addition, when a variable forward is stored, the applique appears to be busy and will accept no incoming call which is not accompanied by a break-in request.

When a calling applique accepts, from the signalling and supervision message of another applique or a translator, a call-forwarding instruction which includes an out-dialing instruction, it, the calling applique, includes in its own message the address of the applique or translator which stores that out-dialing instruction. The trunk applique which is ultimately reaches, and which makes use of the out-dialing instruction, obtains that instruction directly from the signalling and supervision message of the applique or translator in which the instruction is stored.

A variable forward is set up or cancelled in the following way:

a. The subscriber accesses an empty call register and hears a dial tone.
b. He then makes a dial entry "*". The dial tone stops. If the applique stores a restriction against setting up a variable forward, he hears a re-order signal which is replaced, after a short time, by a dial tone. If the applique stores no such restriction, he hears nothing and may continue. Any existing variable forward, in either case, is cancelled and the applique now stores no variable forward.
c. The subscriber may now make an appropriate call-originating dial entry (either two digits or one digit followed by a pause) which sets up a stored internal address. If this dial entry is one against which a restriction is stored, or if it is 98 or 99, the subscriber hears a re-order signal which is replaced, after a short time, by a dial tone. The applique is left, in this case, storing no variable forward. If the dial entry is neither 98, 99, nor one against which a restriction is stored, the subscriber hears nothing and may continue. The applique, at this point, stores a system address as a variable forward.
d. The subscriber may now enter an out-dialing instruction, which is limited to a maximum of seven digits. If more than seven are entered, only the first seven are stored. 0 is stored as a binary 10, other digits are stored as their binary equivalents, and unused storage space holds binary zeros. At this point, the applique stores both an internal address and an out-dialing instruction as a variable forward.

The set-up call may be terminated, by the subscriber, after step (b), leaving the applique with no stored variable forward, after step (c), leaving the applique with a stored variable forward which does not include an out-dialing instruction, or after step (d), leaving the applique with a stored variable forward which includes an out-dialing instruction. The call is terminated by accessing a new call register, either by a dial entry " # " or by a hook-flash, or by putting the telephone instrument in on-hook status. The set-up call may also be terminated by the arrival of an incoming call accompanied by a break-in request.

A standard translator always stores a forced fixed forward, which always re-directs a call addressed to that translator. The address stored, as a forced fixed forward, is ordinarily that of an indirectly-addressable applique, but may be any address used by the system. Standard translators are ordinarily used (a) to allow access to an applique, or to a group of appliques, by a dial entry which conforms to standard usage (0 to access the attendant's station, 9 to access a local trunk, for example), or (b) to limit direct access (by dial entry, without assistance) to an applique or to a group of appliques, since direct access to a translator is subject to restrictions stored in each applique, as previously discussed.

An extended translator always stores a variable forward, but that variable forward may or may not be a meaningful one. When a variable forward is set up in an extended translator, any call addressed to that translator is re-directed by the internal address contained in the variable forward. The internal address is, in this case, a meaningful one. When the translator is cleared, it stores, instead of a meaningful address, a "dead address". Any call addressed to the translator and redirected to the dead address is subsequently cancelled by the calling applique. The variable forward stored by an extended translator may be set up or cleared by an appropriate dial entry made at the extended-translator attachment of the system clock.

The internal address stored by an extended translator is either a dead address, when the translator is cleared, or one which can be set up by a call-originating dial entry. The out-dialing instruction stored by the tranlator may be as long as 14 digits, all of which are zeros when the translator is cleared.

The variable forward stored by an extended translator is set up or cancelled, leaving the translator cleared, in the following way:

a. The attendant, or some other authorized person, puts a telephone instrument associated with the extended-translator attachment of the system clock in off-hook status and hears a dial tone. (Instead of a telephone instrument, the attachment may be equipped with a hook-switch, a speaker, and a twelve-key dial.)
b. The attendant makes a dial entry 98 (any other dial entry produces a re-order signal which is replaced, after a short time, by a dial tone), followed by a dial entry designed to access the desired translator. If that translator is not installed in the attachment, or if it is installed but is not an extended translator, the attendant hears a re-order signal followed by a dial tone. If the desired translator is installed in the attachment and is, in fact, an extended translator, the attendant hears nothing and may continue.
c. The attendant makes a dial entry "*", which clears the translator.
d. The attendant may now make a call-originating dial entry, either two digits or one digit followed by a pause. An entry 98 or 99 at this point produces a re-order signal followed by a dial tone, and the translator is left cleared. If the attendant hears nothing, he may continue by entering an out-dialing instruction of 14 digits or fewer. If more are entered, only the first 14 are stored.

The step-up call is terminated by returning the telephone, or its equivalent, to on-hook status. If it is terminated after (b), the translator is not affected, if after (c), the translator is left cleared, if after (d), the translator stores the variable forward which was set up at that step.

A call-originating instruction may be stored in a program module installed in a repertory dialing attachment associated with a line applique. The call-originating instruction, like the variable forward stored by an extended translator, consists of an internal address and an out-dialing instruction which is limited to 14 digits or fewer. The program module, like the extended translator, stores a dead address and 14 zeros when it is cleared.

A call-originating instruction is set up or cancelled in a program module in the following way:

a. The subscriber goes off-hook and accesses an empty call register. He hears a dial tone and makes a dial entry 98 followed by the number of the desired program module. If the line applique is not equipped with a repertory dialing attachment, or if it is so equipped but the desired program module is not installed, the subscriber hears a re-order signal which is followed by a dial tone. If the applique is equipped with a repertory dialing attachment and the accessed program module is installed, he hears nothing and may continue.

b. The subscriber makes a dial entry "*", which clears the program module.

c. The subscriber makes a call-originating dial entry, either two digits or one digit followed by a pause. If the dial entry is 98, 99, or one against which a restriction is stored, in the subscriber's applique, the subscriber hears a re-order signal followed by a dial tone. In this case, the program module is left in a cleared state. If the dial entry is neither 98, 99, nor one against which a restriction is stored, the subscriber hears nothing. At this point, the program module stores an internal address and 14 zeros as an out-dialing instruction. The subscriber may now enter as many digits as he wishes. These, or the first 14 if more than 14 are entered, are stored as an out-dialing instruction.

If the set-up call is terminated after (a), the module is left as it was, if after (b), the module is left in a cleared state, if after (c), the program module stores the call-originating instruction set up by the subscriber at that step.

CALL REQUESTS

An applique, processing an outgoing call, may or may not hold one or more call requests. The available call requests are a "camp-on" request, a "fixed-forward" request, and a "break-in" request.

A camp-on request is a request, made by the calling applique to the called applique, for acceptance of a call on a camp-on basis. A call is never accepted on such a basis unless a camp-on request is set up in the calling applique. Even when a camp-on request is set up, the call may not be accepted on a camp-on basis by the called applique.

A fixed-forward request is an instruction to the calling applique to accept an optional call-forwarding instruction when a call cannot be completed. Acceptance of a forcing call-forwarding instruction in this situation is, of course, mandatory. When a fixed-forward request is set up in a calling applique and no call-forwarding instruction is available, an outgoing call which cannot be completed is cancelled.

A break-in request is an instruction, from a calling applique to a called applique, which makes acceptance of a call, by the called applique, mandatory. However, the call may or may not be answered.

At any time after a call has been initiated, either by a call-originating dial entry or by accessing a repertory dialing attachment, a caller can make a dial entry "*", after which he can set up and cancel various combinations of call requests by means of numerical dial entries. It is not necessary to repeat the dial entry "*".

An applique may or may not store a restriction, in wired form on a plug-in module in the feature selection unit 88, which prevents a break-in request from being set up by a dial entry. Unlike other restrictions, which alert the caller that his dial entry is rejected, usually by offering him a re-order signal followed by a dial tone, this restriction does not offer a caller any audible signal. It simply prevents the break-in request from being set up. The break-in request may, on occasion, be set up automatically during the course of call processing. The restriction, if it is stored, has no effect on automatic set-up of the break-in request.

The situation, after a numerical dial entry has been made to set up or cancel a call request, is as shown below:

| Dial Entry | Camp-On Request | Fixed-Forward Request | Break-In Request |
|---|---|---|---|
| "1" | set up | cancelled | cancelled |
| "2" | cancelled | set up | cancelled |
| "3" | set up | set up | cancelled |
| "4" | cancelled | cancelled | set up |
| "8" | cancelled | cancelled | cancelled |
| ("5") | set up | cancelled | set up |
| ("6") | cancelled | set up | set up |
| ("7") | set up | set up | set up |
| ("9") | set up | cancelled | cancelled |
| ("0") | cancelled | set up | cancelled |

The dial entries shown in parentheses are not ordinarily used. The dial entry "*" is without effect, and leaves the situation unchanged.

GENERAL CONSIDERATIONS CONCERNING OUTGOING CALLS

A caller may initiate an outgoing call, through a line applique, by accessing any empty call register and making a call-originating dial entry. The processing of an outgoing call, initiated in this way, is discussed in this section and in the section which follows. The processing of an outgoing call initiated by the call-originating program stored in a trunk applique is discussed in a subsequent section as is the processing of an outgoing call initiated by accessing the repertory dialing attachment of a line applique.

Initiation and processing of an outgoing call involves the sequence of steps described below. The organization of the first nine steps is shown, in abbreviated form, in FIG. 9.

Before discussing the steps involved in the initiation and processing of an outgoing call, it should be noted that at any point in the described sequence, the caller may return the telephone instrument to on-hook status, or he may access a new call register by making a dial entry " # ", or he may access a new call register by hook-flashing. In any of these cases, the call-processing logic is returned to its quiescent (pre-call) condition. When this happens, any in-process call, that is, any call which has not yet been completed and which is, therefore, still being processed, is cancelled and the accessed call register is cleared. The arrival, at any time, of an incoming call accompanied by a break-in request also returns the processor to its quiescent state but does not clear the accessed call register.

Step No. 1

The caller accesses one of the three call registers in the applique. That call register may or may not be empty.

a. If there is a call in the accessed call register, that call is picked up. In this situation, a dial entry " # " accesses another call register. The operation of call initiation remains at step No. 1, but the conditions may be altered since a new call register has been accessed. Any other dial entry, made in connection with out-dialing to an outside exchange or for any other reason has no affect on the applique and the operation remains with unaltered conditions at step No. 1.

b. If the accessed call register is empty, the caller hears a dial tone and the operation continues to step No. 2.

Step No. 2

The caller enters the first character or digit, which may be the only one, of his sequence of dial entries. As each character or digit is entered, the tones produced by the touch-tone pad are detected and interpreted by the tone decoder 126 of the applique which delivers a digital equivalent of that character or digit to the dial entry processor 152 in the applique. The dial tone stops when the first character or digit is entered.

a. If the first dial entry is " # ", a new call register is accessed and the operation of call initiation returns to step No. 1.

b. If the first dial entry is "*" and the applique stores a restriction against setting up a variable forward, the caller hears a reorder signal which is replaced, after a short time, by a dial tone. The operation of call initiation returns to step No. 1 (b).

c. If the first dial entry is "*" and the applique does not store a restriction against setting up a variable forward, any existing variable forward is cancelled. A situation is now established in which a new variable forward may be set up by appropriate dial entries, and the operation of call initiation is aborted.

d. If the first dial entry is a digit, the operation continues to step No. 3.

Step No. 3

The processor 152 has now accepted the first digit of a sequence of dial entries, and has been shifted from its quiescent of pre-call condition.

a. If the first dial entry is 0, the operation jumps to step No. 9 and continues from that point.

b. If the first dial entry is 1 through 5, the operation jumps to step No. 8 and continues from that point.

c. If the first dial entry is 6 through 9, the operation continues to step No. 4.

Step No. 4

The processor 152 now holds a single digit, which is 6, 7, 8 or 9.

a. If there is a pause, during which no additional dial entry is made, the operation jumps to step No. 6 and continues from that point.

b. If a second dial entry is made without undue delay, so that there is no pause, the operation continues to step No. 5.

Step No. 5

The processor 152, already holding 6, 7, 8 or 9, has now been presented with another dial entry.

a. If this dial entry is " # ", a new call register is accessed. The processor is cleared, that is, returned to its quiescent or pre-call condition, and the operation of call initiation returns to step No. 1.

b. If this dial entry is "*", it is disregarded and processing continues, with the processor holding a one-digit entry, to step No. 6.

c. If this entry is a digit, processing continues to step No. 6.

Step No. 6

The processor 152 now holds either one digit (6 through 9) or two digits (the first of which is 6 through 9). In either case, the digit or digits constitute a complete dial entry. The dial entry is examined to see whether or not it is one against which a restriction is stored in the applique. The restrictions which may apply at this point are those which prevent direct access to certain translators and that which prevents origination of a paging call.

a. If the dial entry is one against which a restriction is stored, the processor is cleared, the caller hears a re-order signal which is replaced, after a short time, by a dial tone, and the operation of call initiation returns to step No. 1 (b).

b. If the dial entry is one against which no restriction is stored, processing continues to step No. 7.

Step No. 7

The processor 152 now holds a complete dial entry against which no restriction is stored in the applique. The dial entry is examined to see whether or not it is one associated with repertory dialing.

a. If the dial entry is 99 and the applique is equipped with a repertory dialing attachment and the applique does not store a variable forward, the processor shifts to a repertory-dialing processing sequence, described hereinafter.

b. If the dial entry is 99 and the applique is not equipped with a repertory dialing attachment, the processor is cleared, the caller hears a re-order signal which is replaced, after a short time, by a dial tone, and the operation of call initiation returns to step No. 1 (b).

c. If the dial entry is 99 and, whether or not the applique is equipped with a repertory dialing attachment, the applique stores a variable forward, the processor is cleared, the caller hears a re-order signal which is replaced, after a short time, by a dial tone, and the operation returns to step No. 1 (b).

d. If the dial entry is 98, a situation is established, whether or not the applique is equipped with a repertory dialing attachment, in which a repertory dialing attachment may be accessed for the purpose of cancelling or setting up a stored call-originating instruction (the access will, of course, be unsuccessful if the attachment is not installed at the applique), and the operation of call initiation is aborted.

e. If the dial entry is neither 98 nor 99, the operation jumps to step No. 9 and continues from that point.

Step No. 8

The processor 152, at this point, holds a single digit (1 through 5) which is an incomplete dial entry. The caller makes another dial entry.

a. If this dial entry is " # ", a new call register is accessed. The processor is cleared, and the operation returns to step No. 1.

b. If this dial entry is "*", it is disregarded and the operation remains at this step (No. 8).

c. If the dial entry is a digit, processing continues to step No. 9.

Step No. 9

The processor 152 now holds a complete call-originating dial entry, one against which no restriction is stored in the applique. This dial entry is converted to an eight-bit address and placed in the "call destination register" of the processor 152.

At this point in the processing sequence, entry of one or more digits is disregarded by the processor and, in fact, has no effect on conditions in the applique. A dial entry " # ", as always, accesses a new call register, returning the processor to its quiescent condition, and the operation of call initiation returns to step No. 1. This situation continues until the processor is cleared or until a dial entry "*" is made, whichever happens first. The effect of a dial entry "*" is described immediately below.

If, at any time after step No. 9 (or after step No. 10 has been reached by way of the repertory-dialing processing sequence described hereinafter) a dial entry "*" is made, subsequent dial entries have the effects described below. This situation continues until the processor is cleared:
a. A dial entry "*" is now disregarded by the processor and, in fact, has no effect on conditions in the applique.
b. Any dial entry which is a digit sets up or cancels one or more call requests.
c. As always, a dial entry " # " accesses a new call register, returning the processor to its quiescent condition, and the operation of call initiation returns to step No. 1.

Whenever the dial entry processor 152 is cleared, all existing call requests are cancelled. In addition, the call destination register is cleared, as is the "instruction location register". Finally, the processor controls both an "audible ring" signal and a "busy" signal. If either of these is turned on at the time when the processor is cleared, it is turned off by the clearing operation.

The contents of the call destination register may be up-dated during the course of call processing. That is, the address held by that register may be replaced by a new one. Whenever this happens, the audible ring signal is turned off, if it is on, the busy signal is turned off, if it is on, and the caller hears a "register up-date" signal (a short beep), except as noted below. The register up-date signal is inhibited for a short time after each occurrence, and if the call destination register is up-dated during the period of inhibition, the signal is not presented to the caller in connection with that up-dating operation.

With the address of a call destination held in the call destination register, processing continues with steps Nos. 10 to 16 as described below. These next seven steps are summarized in FIG. 10 and constitute a busy loop.

Step No. 10
The call destination address held in the call destination register is inspected to see whether or not it is one associated with a ringer, paging or capturing call.
a. If the call destination address is one associated with a ringer, paging or capturing call, the processor shifts to a special processing scheme described hereinafter.
b. If the call destination address is not one associated with a ringer, paging or capturing call, processing continues to step No. 11. Note that the call destination address, in this case, must be either a dead address, the address of a translator, or that of an applique, although not necessarily the address of a translator or an applique which is installed in the system.

Step No. 11
The stream of signalling and supervision messages on the SS channel is inspected, in a search for a message which carries an identifying address the same as the call destination address and which consists of more than simply an address word. That is, the address in the address word of the message must be the same as that held in the call destination register, and the existence word must appear in the message.
a. If, after a reasonable time, no satisfactory message appears, the processor is cleared. The caller hears a re-order signal which is replaced, after a short time, by a dial tone, and the operation of call initiation returns to step No. 1 (b). Note that this always happens when the call destination address is a dead address.
b. If a satisfactory message appears, processing continues to step No. 12.

Step No. 12
The call destination address is examined to see whether it is the address of a translator or that of an applique. A "break-in flip-flop", which stores a break-in request when one is set up, is examined to see whether or not a break-in request is set up.
a. If the call destination address is that of an applique and a break-in request is set up, processing jumps to step No. 21 and a call is placed to the call destination.
b. If the call destination address is that of a translator and/or if no break-in request is set up, processing continues to step No. 13.

Step No. 13
The signalling and supervision message associated with the call destination (the satisfactory message whose appearance was detected in step No. 11 above) is examined to see whether or not the call destination will accept a call not accompanied by a call request. (The call destination will accept such a call if the "busy" bit in the existence word of its message is 0.) Note that the message associated with a translator or that associated with an applique which stores a variable forward always indicates that it, the translator or the applique, will not accept such a call.
a. If the call destination will accept a call not accompanied by a call request, processing jumps to step No. 21 and a call is placed to the call destination.
b. If the call destination will not accept a call which is not accompanied by a call request, processing continues to step No. 14.

Step No. 14
The signalling and supervision message associated with the call destination is examined to see whether or not the call destination will accept a call on a camp-on basis. (The call destination will accept such a call if the "loaded" bit in the existence word of its message is 0.) Note that the message associated with a translator or that associated with an applique which stores a variable forward always indicates that it, the translator or the applique, will not accept such a call. A "camp-on flip-flop", which stores a camp-on request when one is set up, is examined to see whether or not a camp-on request is set up.
a. If the call destination will accept a call on a camp-on basis and a camp-on request is set up, processing jumps to step No. 21 and a call is placed to the call destination.
b. If the call destination will not accept a call on a camp-on basis and/or if no camp-on request is set up, processing continues to step No. 15.

Step No. 15

The signalling and supervision message associated with the call destination is examined to see whether or not it contains a forcing call-forwarding instruction. (The message contains such an instruction if the "forced-forwarding" bit in the existence word of the message is 1.) Note that the message associated with a translator always contains a forcing call-forwarding instruction, and that the message associated with an applique contains a forcing call-forwarding instruction if the applique stores a forced fixed forward or a variable forward or both.

a. If the message contains a forcing call-forwarding instruction, processing jumps to step No. 18 and continues from that point.

b. If the message does not contain a forcing call-forwarding instruction, processing continues to step No. 16. Note that in this case the call destination must be an applique which stores an optional fixed forward and no variable forward, or an applique which stores no forward of any kind.

Step No. 16

A "fixed-forward flip-flop", which stores a fixed-forward request when one is set up, is examined to see whether or not a fixed-forward request is set up.

a. If no fixed-forward request is set up, the caller hears a busy signal. Processing then jumps back to step No. 10 and continues again from that point. If the situation remains unchanged, processing continues to cycle around this loop (steps No. 10 through No. 16) until the caller cancels the outgoing call. Other ways of escaping from the loop are described in the following paragraph.

b. If a fixed-forward request is set up, processing continues to step No. 17.

Aside from call register change or call cancellation by the caller, escape from the busy loop, steps Nos. 10 to 16, described above is possible in the following ways:

a. At step No. 12, by setting up a break-in request, if this is not prevented by a restriction stored in the applique;

b. At step No. 13, by a change in the situation at the call destination (which must be an applique, because the message of a translator always contains a forcing call-forwarding instruction which causes the processor to leave the loop by jumping from step No. 15 to step No. 18) so that it will accept a call not accompanied by a call request;

c. Possibly at step No. 14, if no camp-on request was set up earlier, by setting up a camp-on request;

d. Possibly at step No. 14, if a camp-on request was set up earlier, by a change in the situation at the call destination so that it will accept a call on a camp-on basis;

e. At step No. 16, by setting up a fixed-forward request. The arrival of an incoming call accompanied by a break-in request, of course, clears the processor and breaks the loop.

Figure 11:
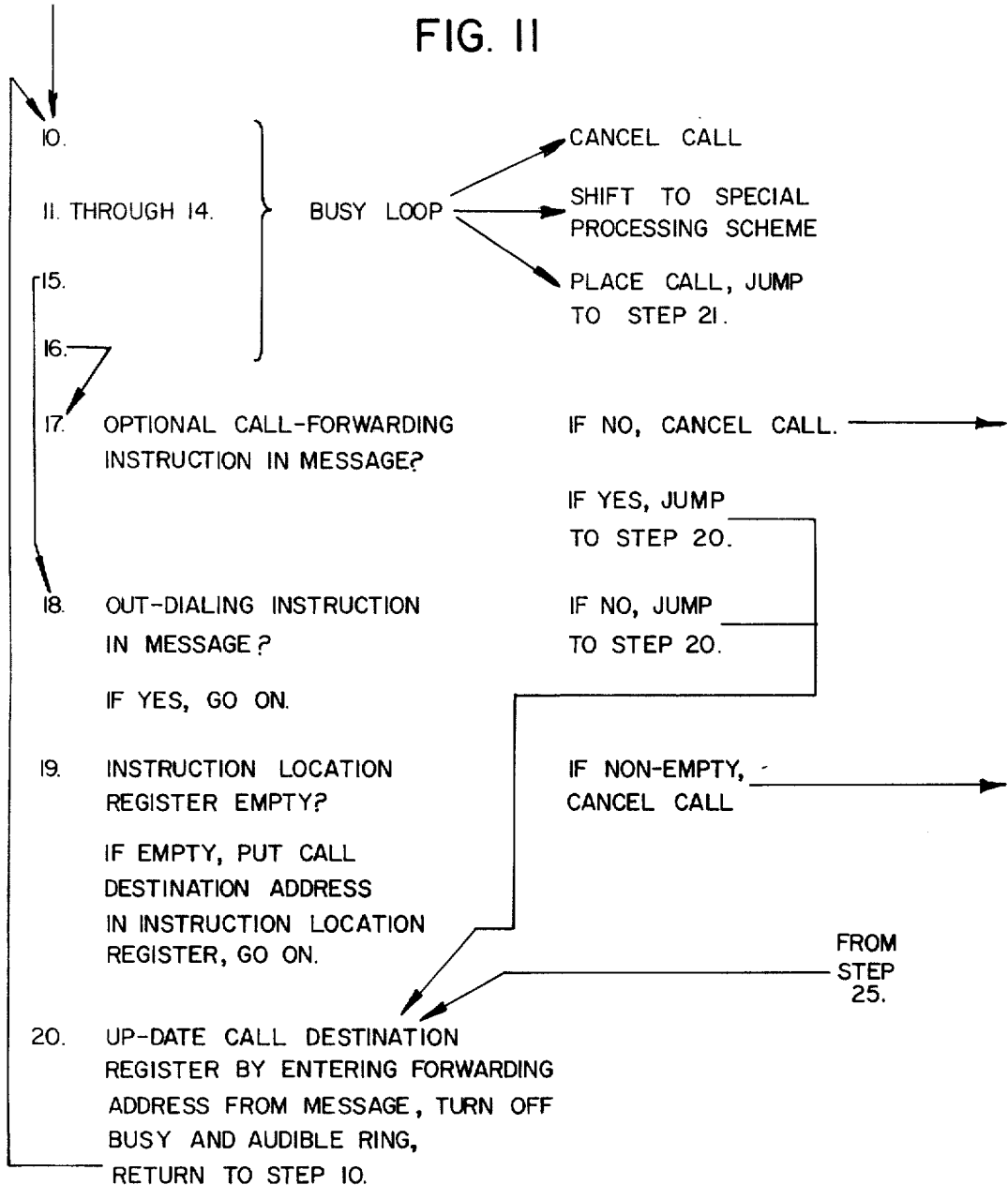

Processing continues with the steps described immediately below and shown in abbreviated form in FIG. 11.

Step No. 17

The signalling and supervision message associated with the call destination is examined to see whether or not it contains an optional call-forwarding instruction. (The message contains such an instruction if the "optional-forwarding" bit in the existence word of the message is 1 and the "forced-forwarding" bit in the same word is 0.) Note that the message associated with an applique contains an optional call-forwarding instruction only if the applique stores an optional fixed forward and no variable forward.

a. If the message contains no call-forwarding instruction, that is, if it does not contain an optional call-forwarding instruction, the processor is cleared. The caller hears a re-order signal which is replaced, after a short time, by a dial tone, and the operation of call initiation returns to step No. 1 (b).

b. If the message contains an optional call-forwarding instruction, processing jumps to step No. 20 and continues from that point.

Step No. 18

The signalling and supervision message associated with the call destination is examined to see whether or not it contains an out-dialing instruction. (The message contains an out-dialing instruction if both the "optional-forwarding" bit and the "forced-forwarding" bit in the existence word of the message are 1.) Note that if the processing reaches this step in the sequence, the message must contain a call-forwarding instruction. If processing reached step No. 17 above and the message contained no call-forwarding instruction, the call would have been cancelled at that step.

a. If the message contains no out-dialing instruction, processing jumps to step No. 20 and continues from that point.

b. If the message contains an out-dialing instruction, processing continues to step No. 19.

Step No. 19

The instruction location (190 of FIG. 22) of the processor 152 is examined to see whether or not it holds an "instruction location" address, that is, an address which specifies the location at which an out-dialing instruction, included in a call-forwarding instruction accepted during the course of processing the call, is stored.

a. If the instruction location register already holds an instruction location address, the processor is cleared. The caller hears a re-order signal which is replaced, after a short time, by a dial tone, and the operation of call initiation returns to step No. 1 (b).

b. If the instruction location register is empty, the call destination address held in the call destination register is placed in the instruction location register, but the call destination register is not cleared, and processing continues to step No. 20. The address, when one is stored, held in the instruction location register is included in the signalling and supervision message of the applique, as a "dood" word. This instructs a called applique to examine the appropriate signalling and supervision message, the one associated with the address held in the instruction location register, and, from that message, to obtain an out-dialing instruction. The called applique then, without any action by the caller, sends the desired out-dialing sequence, as specified by the out-dialing instruction, to the outside exchange to which it is connected. In the absence of an out-dialing instruction, the caller, if he reaches an applique which is connected to a dial-in outside exchange, must out-dial manually in the normal fashion.

Step No. 20

The forwarding address contained in the call-forwarding instruction of the message, associated with the call destination, is placed in the call destination register, replacing the existing call destination address, as a new call destination address. The forwarding address is contained in the "forwarding" word of the message. Processing jumps back to step No. 10. The processor cycles around this loop (steps No. 10 through No. 20), up-dating the call destination register at the end of each cycle, until escape is achieved (at step Nos. 10, 12, 13 or 14), or until the call is cancelled by the applique (at step Nos. 11, 17 or 19) or by the caller.

As pointed out earlier, the busy signal, if it is turned on, is turned off when the contents of the call destination register are up-dated, as is the audible ring signal. In addition, the caller hears a register up-date signal, unless he has just heard one.

The processor cycles around the busy loop until one of the following things happens:
a. The call is cancelled by the caller.
b. The call is cancelled by the applique. The caller then hears a re-order signal which is replaced, after a short time, by a dial tone.
c. The call is (or becomes, as a result of a call-forwarding instruction) a ringer, paging or capturing call. The processor then shifts to a different processing scheme described hereinafter.
d. The processor escapes from the busy loop by way of the forwarding loop. In this case, the call may be cancelled by the caller or by the applique. If it is not cancelled, the processor returns to the busy loop holding a new call destination address.
e. The processor escapes from the busy loop and places the call.

Note that the call is not placed until there is reason to believe (at step Nos. 12, 13 or 14) that the called applique will accept the call.

Figure 12:
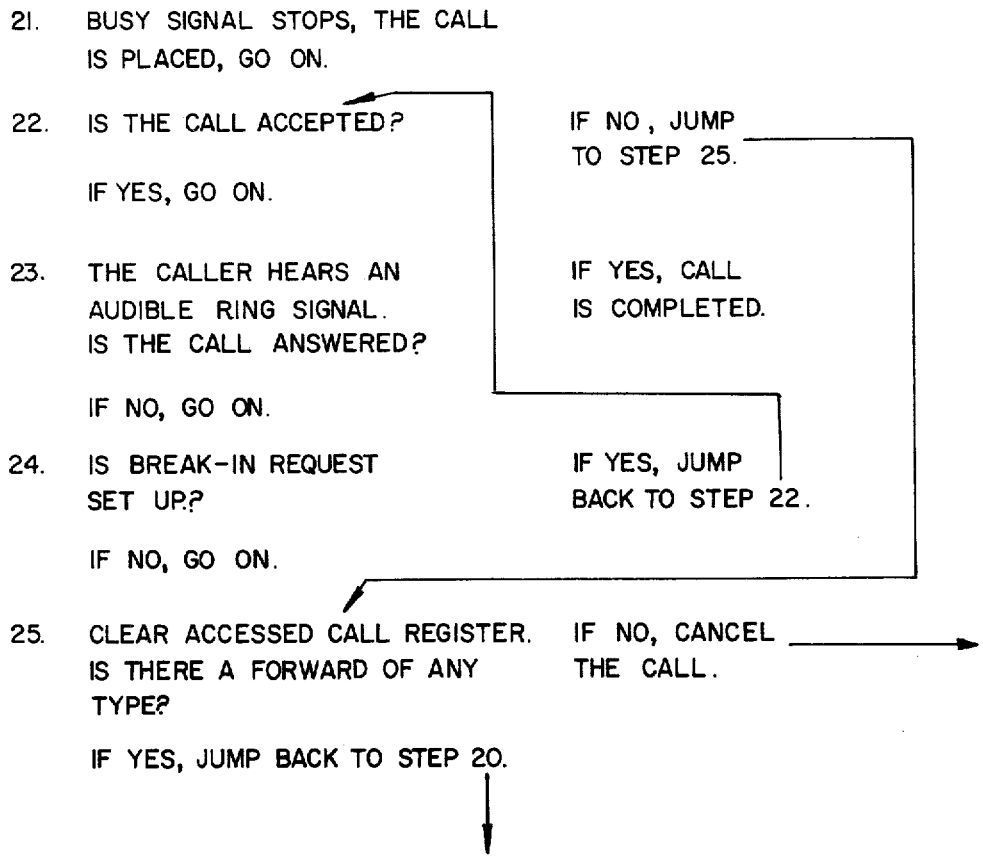

If the call is placed, processing jumps from step Nos. 12, 13 or 14, (see FIG. 10) to step No. 21 and continues as described below. The next steps are shown in FIG. 12.

Step No. 21

The busy signal is turned off, if it is on, and the call is placed in the accessed call register. This caused a signal, addressed to the called applique, to be included in the signalling and supervision message of the calling applique. That message also indicates the existence of break-in and camp-on requests if they are set up in the calling applique. The call is placed by making the appropriate register bits 11 in the message of the calling applique. These bits are the register bit pair, in the message of the calling applique, associated with the called applique. The existence of a break-in request, set up in the calling applique, is indicated by making the "break-in" bit 1 in the first register word of the message. The existence of a camp-on request is indicated by making the "camp-on" bit 1 in the same word. Processing continues to step No. 22.

Step No. 22

The signalling and supervision message of the called applique is examined to see whether or not it, the called applique, accepts the call. Although there is reason to believe that the call will be accepted, the situation at the called applique may change between the time when a decision is made, by the calling applique, to place the call and the time when the called applique is notified, by the message of the calling applique, that the call has been placed. Accordingly, the call may or may not be accepted by the called applique. If the called applique accepts the call, it includes an acknowledgement signal, addressed to the calling applique, in its signalling and supervision message. The calling applique acknowledges acceptance of the call by making the appropriate register bits in its message either 01 or 11. These bits are the register bit pair, in the message of the called applique, associated with the calling applique.
a. If, after a reasonable time, no acknowledgement signal is seen, processing jumps to step No. 25 and continues from that point.
b. If an acknowledgement signal is seen, processing continues to step No. 23.

Step No. 23

The caller now hears an audible ring signal, and the signalling and supervision message of the called applique is examined to see whether that applique is in on-hook or in off-hook status. This is indicated by the "off-hook" bit in the existence word of that message, which is 0 when the applique is in on-hook status, 1 when it is in off-hook status.
a. If the called applique is in off-hook status, the call is a completed call. Either it has been accepted on a live basis, in which case the acknowledgement signal is now 11, or it has been accepted on a camp-on basis, in which case the acknowledgement signal is 01. In either case, the audible ring signal is turned off. The processor is not cleared at this time, and any signals included in the signalling and supervision message of the calling applique in connection with out-dialing by the called applique remain in the message. These signals are the "dood" word and the "instruction" words. The processor is cleared by any of the following events:
   1. The calling applique goes to on-hook status, terminating the call.
   2. The accessed call register is seen to be empty, the call has been terminated by every other applique involved (as a result of call transfers, there may be more than two appliques involved during the course of a call), the caller then hears a dial tone and the operation of call initiation is again at step No. 1 (b).
   3. Another call register is accessed in the calling applique, transferring the call or putting it on hold, and the operation returns to step No. 1.
   4. An incoming call arrives accompanied by a break-in request.
b. After a reasonable time, if the called applique remains in on-hook status (the call is unanswered), processing continues to step No. 24.

If the call is accepted on a camp-on basis, the caller hears a "camp-on acceptance/hold" signal. This signal, however, is not controlled by the dial-entry and outgoing-call processor, and is discussed hereinafter.

Step No. 24

The break-in flip-flop, which stores a break-in request when one is set up, is examined to see whether or not a break-in request is set up in the calling applique.
a. If a break-in request is set up, processing jumps back to step No. 22 and continues from that point.
b. If no break-in request is set up, processing continues to step No. 25.

Processing jumps back to step No. 22 (instead of to step No. 23) to allow repeated verification of the presence of an acknowledgement signal. If the called applique goes to off-hook status and then returns to on-hook status, it appears to the calling applique that its call has been accepted, answered, and then terminated. If, however, all of this happens, at the called applique, between successive message transmissions, the calling applique receives no notification of the temporary transition at the called applique to off-hook status. The calling applique's only indication that anything has happened is cessation of the acknowledgement signal and replacement of that signal by a disconnect signal. This is detected, if it happens, the next time the calling applique returns to step No. 22 in the processing sequence.

Step No. 25

The accessed call register is cleared. If there is an existing call to the called applique in one of the nonaccessed call registers of the calling applique, the register bit pair described in step No. 21 becomes 01. If there is no such call, that register bit pair becomes 10 and subsequently, as a result of call-register processing, 00. The signalling and supervision message of the called applique is examined to see whether or not it contains a call-forwarding instruction of any type. It contains a forward if the "optional-forwarding" bit is 1, if the "forced-forwarding" bit is 1, or if both of these bits are 1.

a. If the message contains a call-forwarding instruction, processing jumps back to step No. 20 and continues from that point.
b. If the message contains no call-forwarding instruction, the call is cancelled. The caller hears a re-order signal followed, after a short time, by a dial tone, and the operation of call initiation returns to step No. 1 (b).

The processor may be trapped, indefinitely, in the break-in loop, which consists of steps Nos. 22, 23 and 24. The calling applique will not cancel a call when the processor 152 is trapped in this loop, if the called applique continues to accept the call, and the processor leaves the break-in loop only when the called applique goes to off-hook status, when the break-in request is cancelled by the caller, or when the call is cancelled by the caller. The loop is entered only when an outgoing call, accompanied by a break-in request set up in the calling applique is accepted by the called applique. An outgoing call which is not accompanied by a break-in request, or one which, whether or not accompanied by a break-in request, is not accepted by the called applique, avoids this loop. The arrival of an incoming call accompanied by a break-in request, of course, clears the processor and so breaks the loop. The accessed call register is not cleared, and the outgoing call remains in that register until it is subsequently removed in the normal course of call-register processing. The audible ring stops when the processor is cleared.

In the case of an unanswered call, not accompanied by a break-in request, or an unaccepted call, the processor returns to step No. 20 instead of going back to step No. 10. This avoids any difficulty which may have arisen because the called applique failed to send the proper message.

OUTGOING CALLS — RINGER, PAGING, AND CAPTURING CALLS

If an outgoing call is a ringer, paging or capturing call, either because it was originated as such a call or as a result of updating the call destination address in accordance with one or more call-forming instructions, the dial-entry and outgoing-call processors in the calling applique depart from the processing sequence described above. The departure is made at step No. 10 of the sequence previously described. Subsequent processing of a ringer, paging or capturing call is described here.

The steps in the sequence which follows are identified, as steps in the special sequence, by the prefix 11, which is the same as the prefix of an address associated with a ringer, paging or capturing call. Processing starts with the steps shown in abbreviated form in FIG. 13 and described below.

Step No. 11-1

The address held in the call destination register (already known to be one associated with a ringer, paging or capturing call) is examined to see whether or not it is one associated with a capturing call.

a. If the address is one associated with either type of capturing call, processing jumps to step No. 11-7 of this sequence and continues from that point.
b. If the address is not one associated with a capturing call, in which case it must be one associated with either a ringer or a paging call, processing continues to step No. 11-2.

Step No. 11-2

The address held in the call destination register is placed in the instruction location register. The call destination register, however, is not cleared. When an address is held in the instruction location register, it is automatically included in the signalling and supervision message of the applique, as a "dood" word, where it serves to signal the appropriate dummies, if the call is a ringer call, or the system clock, if the call is a paging call. Processing continues to step No. 11-3.

Step No. 11-3

The address, still held in the call destination register, is examined to see whether or not it is one associated with a ringer call.

a. If the address is one associated with a ringer call, of either type, the audible ring signal is turned on and processing continues to step No. 11-4.
b. If the address is not one associated with a ringer call, in which case it must be associated with a paging call, processing continues to step No. 11-4. The audible ring signal is not turned on.

Step No. 11-4

The address held in the call destination register is examined to see whether or not it is one associated with a zone ringer call.

a. If the address is not associated with a zone ringer call, in which case it must be associated either with a universal ringer call or a paging call, a break-in request is set up, in the applique, and processing continues to step No. 11-5.
b. If the address is one associated with a zone ringer call, processing continues to step No. 11-5. No break-in request is set up.

Step No. 11-5.

The accessed call register is examined to see whether or not it is empty. The applique will not accept an incoming call in the accessed call register unless that call is accompanied by a break-in request. A capturing call is always accompanied by a break-in request (see Step No. 11-12 below) and is, therefore, accepted by the applique.

a. If the accessed call register is non-empty, the call is now a completed call. That is, it has been captured, either by a capturing call or by some other call addressed to the applique and accompanied by a break-in request. As explained previously, arrival of an incoming call accompanied by a break-in request clears the processor but not the accessed call register. The operation returns to step No. 1 of the main sequence with the completed call in the accessed call register.

b. If, after a reasonable time, the accessed call register is still empty, processing continues to step No. 11-6.

Step No. 11-6

The break-in flip-flop, which stores a break-in request when one is set up, is examined to see whether or not a break-in request is set up.

a. If a break-in request is set up, either set up by the processor at step No. 11-4, or earlier by the caller, processing jumps back to step No. 11-5.

b. If a break-in request is not set up, the call is cancelled and the processor is cleared, which stops the audible ring signal. The caller hears a re-order signal which is replaced, after a short time, by a dial tone, and the operation of call initiation returns to step No. 1 (b) of the main sequence described previously.

It should be noted here that a universal ringer call continues, as does a paging call, either until it is captured, in which case the processor is cleared and the operation returns to step No. 1 with the completed call, or until the existing break-in request is cancelled by the caller, or until the call is cancelled by the caller. A zone ringer call, neither captured nor cancelled by the caller, is automatically cancelled by the applique unless a break-in request is set up by the caller.

Figure 14:
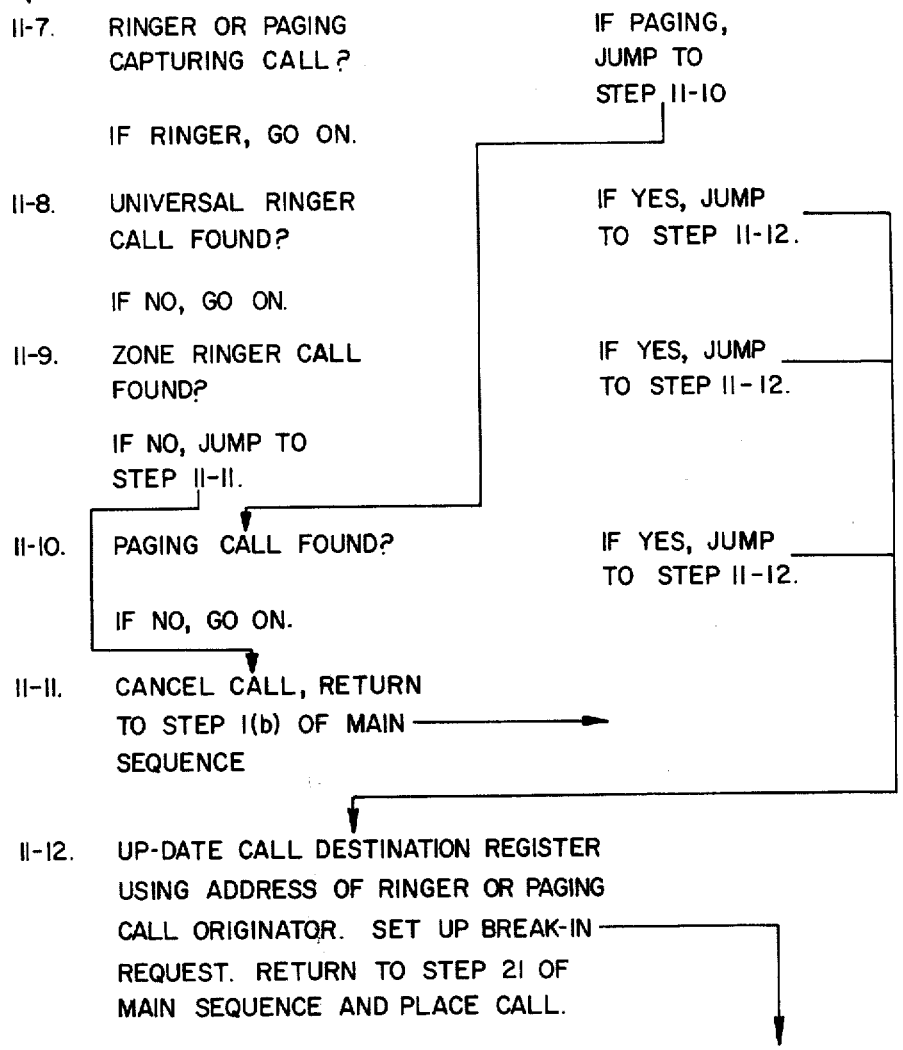
Figure 15:
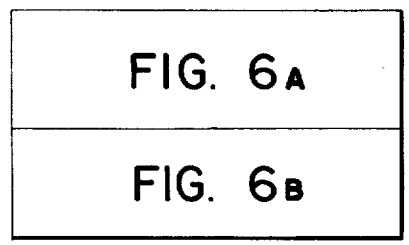
Figure 16:
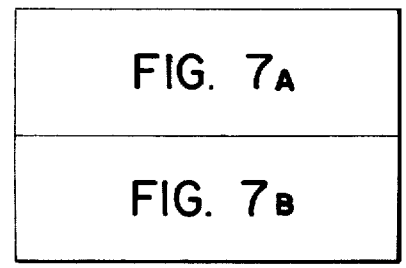
Figure 17:
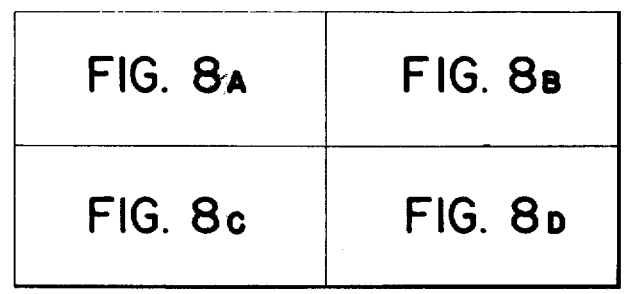

The steps involved in processing a capturing call are shown in abbreviated form in FIG. 14 and are described below.

Step No. 11-7

At this point, the call is known to be a capturing call. The call destination address, held in the call destination register, is examined to see whether it is the address associated with a paging capturing call or the one associated with a ringer capturing call.

a. If the address is one associated with a paging capturing call, processing jumps to step No. 11-10 and continues from that point.

b. If the address is one associated with a ringer capturing call, processing continues to step No. 11-8.

Step No. 11-8

The applique examines the signalling and supervision messages on the SS channel, looking for one which includes the signal, to the dummies, used in a universal ringer call. This signal is contained, as an address, in the "dood" word of a message.

a. If such a message is found, processing jumps to step No. 11-12 and continues from that point.

b. If no such message is found, processing continues to step No. b 11-9.

Step No. 11-9

The applique examines the signalling and supervision messages on the SS channel, looking for one which includes one of the signals, to the dummies, used in a zone ringer call. This signal is contained, as an address, in the "dood" word of a message.

a. If such a message is found, processing jumps to step No. 11-12 and continuous from that point.

b. If no such message is found, processing jumps to step No. 11-11 and continues from that point.

Step No. 11-10

The applique examines the signalling and supervision messages on the SS channel, looking for one which includes the signal, to the system clock, used in paging calls. This signal is contained, as an address, in the "dood" word of a message.

a. If such a message is found, processing jumps to step No. 11-12 and continues from that point.

b. If no such message is found, processing continues to step 11-11.

Step No. 11-11

The processor is cleared, cancelling the capturing call. The caller hears a re-order signal which is replaced, after a short time, by a dial tone. The operation of call initiation returns to step No. 1 (b) of the main sequence.

Step No. 11-12

The address of the applique which originated the looked-for message, whose arrival (at step Nos. 11-8, 11-9 or 11-10) caused the jump to this step in the sequence, is taken from that message and placed in the call destination register as a new call destination address. The address must be that of an applique, since the looked-for signals never appear in the message associated with a translator. The address is contained, as an address, in the "address" word of the message. A break-in request is set up, and processing jumps to step No. 21 of the main sequence. A call, accompanied by a break-in request, is placed to the originator of the captured ringer or paging call.

OUTGOING CALLS — PROGRAMMED AND REPERTORY-DIALING CALLS

An outgoing call may be initiated either by a call-originating dial entry or by a stored call-originating program. Programs of this kind are stored in a trunk applique and in the repertory dialing attachment of a line applique. Their operation is discussed here.

The program stored in a trunk applique contains the addresses of as many as three call destinations. These addresses are stored in wired form, on a plug-in module or modules in the trunk applique, and may be any addresses desired. A fixedforward request is automatically set up in connection with any call originated by the program. A camp-on request, however, cannot be set up. A break-in request is set up, by the processor, if the call, originated by the stored program, is a universal ringer call or a paging call (this happens at step No. 11-4 of the special processing sequence described above), or if the call is a capturing call (this happens at step No. 11-12 of the special sequence). Apart from these calls, no break-in request can be set up in connection with a call originated by the stored program.

In the discussion which follows, it is assumed that the trunk applique is connected, through an accessory interface, to an outside exchange.

If one or more of the call registers in a trunk applique is non-empty, the applique accesses the outside exchange to which it is connected. If all three call registers are empty, the applique remains in a quiescent state unless it is accessed by the outside exchange.

When the trunk applique is accessed by the outside exchange, it responds by going to off-hook status and turning on an internally-generated dial tone. The accessory interface, however, contains logic circuitry which prevents the applique's response from being passed to the outside exchange until the applique holds, in one of its call registers, a completed call. Accordingly, it appears to the outside exchange that its accessing signal has not been acknowledged (a doesn't answer condition). The outside caller hears an audible ring which continues until a completed internal call has been established by the trunk applique. At that time, and not before, the accessory interface acknowledges the accessing signal of the outside exchange (at that point, charges start), and the outside caller is connected to the system.

Whenever, in a trunk applique, the dial tone is turned on, the stored program is accessed. Then:
a. A call destination address, one of those held by the stored program, is delivered to the dial-entry and outgoing-call processor in the applique and placed in the call destination register. The dial tone is turned off;
b. A fixed-forward request is set up;
c. Call processing starts at step No. 10 of the main sequence and goes forward in the usual way.

Processing continues, with three possible results:
a. The internal call is completed and the outside caller is connected to the system;
b. The incoming call, from the outside exchange, is cancelled by the outside caller, the trunk applique, no longer accessed by the outside exchange, goes to on-hook status, and the internal call is cancelled;
c. The trunk applique remains in off-hook status, but the internal call is cancelled by the processor (for any one of several reasons previously described).

In case (c), the processor turns on a re-order signal which is replaced, after a short time, by a dial tone. The presence of a dial tone causes the stored program to be accessed again, and the whole process is repeated resulting in the origination of another internal call. Note that case (c) can never arise if the stored call destination address is that used for either a universal ringer call or a paging call.

The stored program always holds three addresses, each of which is either that of an actual call destination or a dead address which causes the programmed call to be cancelled at step No. 11 of the processing sequence. On the initial access, following transition of the applique from on-hook to off-hook status, the first address is offered. On subsequent accesses, the stored program offers the second address, the third, the first (again), and so on indefinitely until an internal call is completed or the incoming call is cancelled by the caller.

When a system subscriber is served by a trunk applique, the situation is essentially the same as that described above. The subscriber, of course, hears all of the signals (audible ring, busy, re-order, dial tone) generated by the trunk applique. The outside caller does not. The only important difference is that a subscriber can interrupt the call processing sequence by accessing a different call register in the trunk applique. The trunk applique will not accept dial entries, but the subscriber can change call registers by using a hook-flash which does not affect the off-hook status of the applique.

If the subscriber hook-flashes after going off-hook, the outgoing internal call to the first stored call destination is cancelled and a call to the second destination, if two are stored, is originated. A second hook-flash cancels this call, and a call to the third destination, if three are stored, is originated. The subscriber, therefore, has a limited destination-selection capability.

A call is originated by the repertory dialing attachment of a line applique in response to a dial entry 99 followed by an appropriate two-digit entry drawn from the set 10 through 59.

As explained previously (steps No. 1 through No. 7), the repertory dialing attachment is accessed by a dial entry "99" only if it exists (that is, if the line applique is equipped with a repertory dialing attachment) and if the line applique does not store a variable forward.

Following successful access of the attachment, subsequent dial entries produce the following results:
a. An entry " # ", as always, accesses a new call register, cancelling access to the repertory dialing attachment, and returns the operation of call initiation to step No. 1 of the sequence. A hook-flash does the same thing;
b. An entry "*" has no effect after the repertory dialing attachment has been accessed by a dial entry 99. This is the case whether the entry "*" is made immediately after the accessing entry or following entry of one or more digits;
c. No response is produced by the entry of only one digit, and if more than two digits are entered, all but the first two are disregarded.

Assuming, then, that the entry 99 is followed by a two-digit entry, processing starts as described below:
a. If there is no program module installed in the repertory dialing attachment whose identifying number is the same as the two-digit dial entry (which followed 99), the caller hears a re-order signal which is replaced, after a short time, by a dial tone. Access to the attachment is cancelled, and the operation of call initiation returns to step No. 1 (b) of the sequence. This will always happen if the two-digit entry (which follows 99) is one not drawn from the set 10 through 59.
b. If the addressed program module is installed in the repertory dialing attachment but stores no repertory dialing instruction, the result is the same as in (a) above.
c. If the addressed program module is installed in the attachment, and if it stores in repertory dialing instruction, processing continues as described below.

The internal address stored by the program module is transferred to the dial-entry and outgoing-call processor as a call destination address and placed in the call destination register. The applique's own address is entered in the instruction location register and is included in the applique's signalling and supervision message, as a "dood" word, to indicate the location of a stored out-dialing instruction.

The out-dialing instruction stored by the program module is included in the applique's signalling and supervision message, in the "instruction" words. If the out-dialing instruction consists of seven digits or fewer, the full instruction is included in each message. If the instruction contains more than seven digits, it is broken into blocks which are included, sequentially, in successive signalling and supervision messages.

Following entry of the internal address in the call destination register, and entry of the applique's own address in the instruction location register, processing proceeds in the usual fashion, starting with step No. 10 of the main processing sequence.

A dial entry "*", made at this point, establishes conditions for setting up and cancelling call requests, as previously described.

CALL REGISTER MANAGEMENT, INCOMING AND EXISTING CALLS

Each applique broadcasts, to every other applique, a variety of information (whether or not it is in on-hook status, what call-forwarding instructions it stores, and so on) by including that information in its signalling and supervision message. In addition, the appliques maintain two-way communication with each other for the purposes of signalling and supervision. To this end, each applique, as previously described, includes in its signalling and supervision message, on the SS channel, a sequence of 50 register bit pairs, contained in the register words. When every register bit-pair is 00, the register words are omitted in order to reduce traffic on the SS channel. In all other cases, however, they are included in the transmitted message.

The register bit-pairs are numbered, in sequence, No. 0 through No. 49. The $n$-th bit-pair is addressed to the applique whose address has a numerical portion equal to $n$. Each applique, necessarily, includes in its sequence a register bit-pair addressed to itself. That bit-pair is always 00.

As previously pointed out, an applique has three call registers. Outgoing bit-pairs are based primarily on information stored in these call registers, and that information is modified by incoming register bit-pairs (and by other data as well). Each call register stores 50 bits in locations numbered No. 0 through No. 49. Bits stored at the $n$-th location are associated with the $n$-th register bit-pair in the outgoing stream and with the applique to which that bit-pair is addressed. The "disconnect" register, which also stores 50 bits, is associated with the three call registers.

In the P-th applique (the one whose address has a numerical portion equal to P), all four of these registers store zeros at the P-th location. At the Q-th location (where $Q \neq P$), each register, subject to the rules given below, may store either 0 or 1. If a register stores 1 at the Q-th location, it is convenient to say that "Q appears in" that register.

a. If Q appears in the disconnect register, it cannot appear in any of the call registers. If it appears in one or more of the call registers, it cannot appear in the disconnect register.
b. If Q does not appear in any of the four registers, the Q-th outgoing register bit-pair in P's sequence is 00, a NO-CALL signal.
c. If Q appears in the disconnect register (and, necessarily, does not appear in any of the call registers), the Q-th outgoing register bit-pair is 10, a "disconnect" signal.
d. If Q appears in any one, any two, or all three of the call registers (and, necessarily, does not appear in the disconnect register), the Q-th outgoing register bit-pair is either 01, and "on-hold" signal, or 11, a "live-call" signal.
  1. If the P-th applique is in on-hook status, the outgoing bit-pair is 01.
  2. If the P-th applique is in external-hold status, the outgoing bit-pair is 01.
  3. If the P-th applique is in off-hook status and not in external-hold status, the outgoing bit-pair is 11 if Q appears in the accessed call register, 01 if it does not appear in the accessed call register.
e. If all four of the registers (the disconnect register and the three call registers) are empty, that is, if each one stores 50 zeros, every outgoing register bit-pair is 00 and the sequence of outgoing register bit-pairs is omitted from P's signalling and supervision message.

Some of the operations carried out by the applique in connection with the information stored in the disconnect register and the three call registers do not depend directly on the information carried by incoming register bit-pairs received from other appliques. These operations, Nos. 1 through 6, are described below. In the discussion, P is the applique in which the operation is carried out, and Q is some other applique.

The operations described below are not carried out in sequence. Two or more of them may, in fact, be carried out at the same time. Numbers are assigned to the operations only for the purpose of easy reference during the course of the discussion. Also, the statement that "Q is placed in" a register means that 1 is entered at the Q-th location in that register (whether or not 1 is already stored there). Similarly, the statement that "Q is removed from" a register means that 0 is entered at the Q-th location in that register (whether or not 0 is already stored there).

Operation No. 1

When P is in on-hook status, a ring signal is turned on whenever the active call register is non-empty, that is, whenever it stores one or more 1's. This signal accesses the telephone instrument or the outside exchange to which P is connected.
a. The ring signal is turned off when P shifts from on-hook to off-hook status.
b. The ring signal is turned off if, while P is still in on-hook status, the active call register becomes empty.

Operation No. 2

When P is in on-hook status, an automatic transfer is initiated whenever the active call register is empty and at least one of the other call registers is non-empty.
a. If, when the transfer is initiated, the reserve call register is non-empty, all information stored in the reserve call register is entered in the active call register and the reserve call register is cleared.
  1. If Q appears, before the transfer, in the reserve call register, it is placed in the active call register and removed from the reserve call register.
  2. If Q does not appear, before the transfer, in the reserve call register, nothing is done, to any register, at the Q-th location.
b. If, when the transfer is initiated, the reserve call register is empty, in which case the camp-on call register is non-empty, or the transfer would not have been initiated, all information stored in the camp-on call register is entered in the active call register and the camp-on call register is cleared.
  1. If Q appears, before the transfer, in the camp-on call register, it is placed in the active call register and removed from the camp-on call register.
  2. If Q does not appear, before the transfer, in the camp-on call register, nothing is done at the Q-th location.
c. The transfer is stopped if the applique shifts from on-hook to off-hook status while the active call register is still empty, that is, before a 1 has been entered in that call register in connection with the transfer.
d. If the transfer is not stopped as explained in (c) above, it continues, whether or not the applique shifts from on-hook to off-hook status, until the transferred-from call register (the reserve call register in case (a) above, the camp-on call register in case (b) above) is empty.
e. A soon as a 1 is entered in the active call register, that call register becomes non-empty and operation 1 is carried out. The applique must still be in on-hook status at this point, or the transfer would have been stopped as explained in (c) above.

Operation No. 3

If P processes a call addressed to Q, either one originally addressed to Q, or one addressed to Q as a result of acceptance by P of one or more call-forwarding instructions, and reaches step No. 21 in the processing sequence previously described, Q is placed in the accessed call register. At the same time, Q is removed from the disconnect register. Nothing is done, in connection with this operation, at any location except the Q-th location.

Operation No. 4

If P processes a call to Q and reaches step No. 25 in the sequence previously described, Q is removed from the accessed call register. At the same time:

a. If Q does not appear in either of the other unaccessed call registers, Q is placed in the disconnect register;

b. If Q appears in either or both of the other call registers, nothing else, beyond removal of Q from the accessed call register, is done at the Q-th location;

c. Nothing is done at any other location.

Operation No. 5

P's subscriber may transfer a call to the active call register by making a hook-flash when either the camp-on call register or the reserve call register is accessed. Note that this is possible only when P is in off-hook status and not in external-hold status, both before and after the hook-flash is made.

a. If Q appears, before the transfer in the transferred-from call register, it is placed in the active call register and removed from the transferred-from call register.

b. If Q does not appear, before the transfer, in the transferred-from call register, nothing is done at the Q-th location.

c. Once this operation has been initiated, by a hook-flash, it continues until the transferred-from call register is empty, whether or not, during the operation, the applique shifts from off-hook to on-hook status or to external-hold status.

Operation No. 6

If the telephone instrument or the outside exchange to which P is connected stops accessing P, P shifts from off-hook to on-hook status. (Note that this shift is possible only if, before the shift, P is not in external-hold status.) When this happens, the call register which was accessed before the shift, from off-hook to on-hook status, is cleared.

a. If Q appears, before the clearing process, in the being cleared call register and in either or both of the other call registers, it is removed from the being-cleared call register.

b. If Q appears, before the clearing process, in the being-cleared call register and does not appear in either of the other call registers, it is placed in the disconnect register and removed from the being-cleared call register.

c. If Q does not appear, before the clearing process, in the being cleared call register, nothing is done at the Q-th location.

d. Once this process has been initiated, it continues, whether or not the applique returns to off-hook status, until the being-cleared call register is empty.

e. Note that this operation may be initiated while operation No. 5. described immediately above, is still going on. In this case, both operations continue to completion, leaving both the transferred-from call register and the being-cleared call register empty.

As briefly mentioned previously, two other registers, the "even-bit external" register and the "odd-bit external" register, are associated with the three call registers. Each of these registers stores 50 bits. The P-th register bit-pair in Q's signalling and supervision message if the sequence of register bit-pairs is included in that message, is the bit-pair sent by Q and addressed to P. If this bit-pair is accepted by P, it is entered in the external registers at the Q-th location, the first bit in the even-bit external register, the second bit in the odd-bit register. It should be noted, however, that the incoming register bit-pair may not be accepted by P. When the incoming bit-pair is not accepted, or when the sequence of register bit-pairs is not included in Q's message, 00 is entered in the external registers. At the Q-th location in the P-th applique, then, the external registers store either 00 or the most recent register bit-pair sent by Q and addressed to P.

The information stored in the six registers of the memory, the two external registers, the disconnect register and the three call registers, is updated periodically by the register processor in the memory. This processor moves across the six registers, stopping at each location to carry out all of the required operations. Each location is processed during a single frame of timing pulses, that is, within a period of 80 microseconds, and a full update (covering all 50 locations) is, therefore, ordinarily carried out in 4 milliseconds. During transmission and reception of the register bit-pair sequences, however, processing is synchronized with the outgoing or incoming register bit-pair stream. One frame period, 80 microseconds, in every five is then lost, while housekeeping signals, parity bits and the like, are transmitted on or received from the SS channel, and a full update requires 5 milliseconds.

In the absence of an incoming signalling and supervision message sent by an applique, processing at the Q-th location in the P-th applique is based on the register bit-pair stored in the external registers at the Q-th location.

During reception of a signalling and supervision message from Q, processing, at the Q-th location in the P-th applique, is based on the P-th register bit-pair of the sequence included in Q's message (the bit-pair sent by Q and addressed to P) and, on occasion, on the stored bit-pair as well. The incoming bit-pair is understood to be 00 when the sequence of register bit-pairs is omitted from Q's message.

During reception of an incoming signalling and supervision message from the R-th applique (an applique which is neither the P-th applique nor the Q-th), processing at the Q-th location, in the P-th applique, may or may not depend on the incoming information. If R is involved in a call with both P and Q, P must take account of the Q-th register bit-pair in R's message (the bit-pair sent by R and addressed to Q) in order to establish a fully-conferenced call. Note that R may be involved with several other appliques in addition to P. Accordingly, this situation may arise, during reception of R's message, at every location except the R-th.

Processing at the Q-th location in the P-th applique may be carried out according to a "normal" processing scheme and, in addition, according to a "conference" processing scheme.

a. In the absence of a signalling and supervision message sent by an applique, only normal processing is used, based on the bit-pair stored in the external registers.

b. During reception of Q's signalling and supervision message, only normal processing is used, based on the P-th incoming register bit-pair in Q's message.

c. During reception of R's signalling and supervision message, normal processing is used, in which R's message is disregarded (and the situation is handled as in case (a) above), and conference processing may be used as well, based on the Q-th incoming register bit-pair in R's message.

The conditions under which conference processing is used, and the operation involved in conference processing, are discussed hereinafter. Normal processing, operations No. 7 through No. 12, is described below.

Operation No. 7

If the relevant incoming register bit-pair, the P-th bit-pair in Q's message, is 00, or if it is understood, because Q's message contains no register bit-pair sequence, to be 00, that bit-pair is entered at the Q-th location in the external registers, displacing any other bit-pair stored there. In this case, or if there is no incoming message from Q and the external registers already store 00, the Q-th location is processed on a no-call signal basis.

a. If P is in on-hook status or in external-hold status, Q is removed from the disconnect register and from all three of the call registers.

If P is in off-hook status and not in external-hold status, nothing is done to the disconnect register or to any of the call registers.

c. If P is processing an outgoing call addressed to Q and is at step Nos. 22, 23 or 24 of the previously described processing sequence, the outgoing-call processor is advised that no acknowledgement signal (indicating acceptance of the call by Q) has been received from Q.

Operation No. 8

If the relevant incoming register bit-pair is 10, that bit-pair is accepted and entered in the external even bit and odd bit registers. In this case, or if there is no incoming message from Q and the external registers already store 10, the Q-th location is processed on a "disconnect" signal basis.

a. Q is removed from the disconnect register and from all three of the call registers.

b. If P is processing an outgoing call to Q and is at step Nos. 22, 23 or 24 of the processing sequence, the outgoing-call processor is advised that no acknowledgement signal has been received from Q.

c. Note that this operation may leave one or more of the call registers empty. If P is in off-hook status and not in external-hold status, a dial tone is turned on if the accessed call register is left empty by this operation. If P is in on-hook status, operations No. 1 and No. 2 may be affected by the results of this operation.

Operation No. 9

If the relevant incoming register bit-pair is 01, that bit-pair may or may not be accepted.

a. If Q does not appear in the disconnect register or in any of the call registers, the incoming bit-pair is not accepted. In this case, 00 is entered in the external registers.

b. If Q appears in the disconnect register, or in one or more of the call registers, the incoming bit-pair is accepted and entered in the external registers.

In case (a) above, nothing further is done. In case (b) above, or if there is no incoming message from Q and the external register already store 01, the Q-th location is processed on an "on-hold" signal basis as described below.

c. Nothing is done to the disconnect register or to the call registers at the Q-th location.

d. If P is processing an outgoing call to Q and is at step Nos. 22, 23 or 24 of the processing sequence, the outgoing-call processor is advised that an acknowledgement signal has been received from Q.

e. If a call register is accessed (note that no call register is accessed when P is in on-hook status or in external-hold status) and Q appears in that call register, a "hold" flip-flop is set. The hold flip-flop is discussed further in the immediately following paragraph.

The hold flip-flop is set (put in state 1) whenever the register processor finds, at the location being processed, a live-call situation (1 in the accessed call register) and an on-hold (01) external bit-pair. It is reset (put in state 0) when one or more of the following conditions exists:

a. Whenever the applique is in on-hook status or in external-hold status;

b. Whenever the accessed call register is empty;

c. Whenever the call-register processor finds a live-call situation (1 in the accessed call register) and live-call ("11") external bit-pair;

d. Whenever the audible ring signal is on (see step No. 23 of the previously described sequence).

e. In cases (a), (b) and (d) above, the hold flip-flop is held in state 0 as long as the condition continues.

If the hold flip-flop remains set for a reasonable time, a "camp-on acceptance/hold" signal is turned on. This signal, generated locally by the applique, is heard by the applique's caller, and indicates that the call which he has on a live basis has been put on hold at every other applique involved in the call. The camp-on acceptance/hold signal is turned off, if it is on, whenever the hold flip-flop is reset.

In the operations which follow, it is necessary, in processing the Q-th location in the P-th applique, to know something about the call requests set up in the Q-th applique. The signalling and supervision message sent by an applique carries an indication of whether or not a camp-on request is set up in that applique and an indication of whether or not a break-in request is set up in that applique.

Operation No. 10

If the relevant incoming register bit-pair is 11 and the incoming signalling and supervision message (Q's message, when the Q-th location is being processed) contains an indication that a break-in request is set up in the Q-th applique, the incoming bit-pair is accepted and entered in the external registers. The Q-th location is then processed on a "break-in" request basis. (Note that the Q-th location is never processed on a break-in request basis in the absence of an incoming message from Q.)

a. If Q appears in the disconnect register, nothing further is done at the Q-th location.

b. If Q does not appear in the disconnect register, the following operations are carried out.

1. If P is in on-hook status, Q is placed in the active call register.

2. If P is in external-hold status, Q is placed in the last-accessed call register which was accessed before P was shifted to external-hold status and will be again accessed when P is shifted from external-hold status. Note that P must be in off-hook status immediately before it shifts to external-hold status, while it is in external-hold status, and immediately after it shifts from external-hold status.

3. If P is in off-hook status and not in external-hold status, Q is placed in the accessed call register.

4. A signal is sent to the dial-entry and outgoing-call processor which causes that processor to be cleared.

5. The "break-in alert" flip-flop is set. The break-in alert flip-flop is discussed further in the immediately following paragraph.

The break-in alert flip-flop controls a "break-in alert" signal in the following way:

a. If the P-th applique is in off-hook status and not in external-hold status when the break-in alert flip-flop is set, the break-in alert signal is turned on when the flip-flop is set.

b. If the applique is either in external-hold status or in on-hook status when the break-in alert flip-flop is set, the break-in alert signal is turned on when the applique is next in off-hook status and not in external-hold status unless the break-in alert flip-flop is reset before this happens.

The break-in alert signal is a short series of beeps, generated locally in the applique and heard by P's caller and by everyone else involved in his call. A short time after the break-in alert signal has been turned on, the break-in alert flip-flop is automatically reset (put in state 0), which turns the break-in alert signal off. The break-in alert flip-flop is also reset whenever the active call register is empty, and may, therefore, be reset before the break-in alert signal is turned on.

Operation No. 11

If the relevant incoming register bit-pair is 11 and the incoming signalling and supervision message indicates that a camp-on request, but not a break-in request, is set up in the Q-th applique, this operation may or may not be initiated.

a. This operation is initiated, and the Q-th location is processed on a "camp-on" request basis, only if all six of the conditions below co-exist:
  1. P is in off-hook status and not in external-hold status.
  2. P does not store a variable forward.
  3. P does not store a restriction against acceptance of an incoming call on a camp-on basis.
  4. The camp-on call register is not accessed.
  5. The camp-on call register is empty.
  6. Q does not appear in the disconnect register.

b. Under any other circumstances, this operation is not initiated.

In case (a) above, the incoming register bit-pair is accepted and entered in the extenal registers, and the Q-th location is processed on a "camp-on" request basis as described below.

c. Q is placed in the camp-on call register.

d. A "camp-on alert" signal is turned on and then, after a short time, turned off again. This signal is generated by the applique and heard only by the applique's caller. It serves to notify him of the acceptance of Q's call by P on a camp-on basis.

e. If P is processing an outgoing call to Q and is a step Nos. 22, 23 or 24 of the processing sequence, the outgoing-call processor is advised that an acknowledgement signal has been received from Q.

Operation No. 12

If the relevant incoming register bit-pair is 11 and the incoming signalling and supervision message indicates that a break-in request is not set up in the Q-th applique, and if operation No. 11 is not initiated, the incoming bit-pair may or may not be accepted.

a. If Q appears in the disconnect register or in one or more of the call registers, the incoming bit-pair is accepted and entered in the external registers.

b. If P is in on-hook status and all three call registers are empty and P does not store a variable forward, the incoming bit-pair is accepted and entered in the external registers.

c. If neither condition (a) above nor condition (b) above is satisfied, the incoming bit-pair is not accepted. In this case, 00 is entered in the external registers and no processing is carried out at the Q-th location. If either condition (a) above or condition (b) above is satisfied, or if there is no incoming message from Q and the external registers already store 11, the Q-th location is processed on a "live-call" signal basis as described below.

d. If Q appears in the disconnect register or in one or more of the call registers, nothing is done to the disconnect register or the call registers at the Q-th location.

e. If P is in off-hook status and not in external-hold status, and Q appears in at least one of the non-accessed call registers, and Q does not appear in the accessed call register, and the external registers stored 01 before 11 was entered, the camp-on alert signal is turned on very briefly as a "recall alert" signal. In this case, it alerts P's caller to the fact that a call which was put on hold at both P and Q has been picked up by Q.

f. If P is processing an outgoing call to Q and is at step Nos. 22, 23 or 24 of the processing sequence, the outgoing-call processor is advised that an acknowledgement signal has been received from Q.

g. If P is in on-hook status and all three call registers are empty and P does not store a variable forward and Q does not appear in the disconnect register, Q is placed in the active call register.

Conference processing, mentioned earlier in this section, is discussed at this point. Conference processing is never used in the absence of an incoming signalling and supervision message from another applique. Further, conference processing is never used at the Q-th location during reception of an incoming message from the Q-th applique. Finally, conference processing is never used at the Q-th location when the incoming message, from the R-th applique, does not include a sequence of register bit-pairs.

It should be recalled at this point that every signalling and supervision message includes a signal which indicates whether or not a sequence of register bit-pairs is included in that message. If the sequence is included, in which case the message must be one sent by a line or trunk applique, and was also included in the applique's last message, the message also includes a signal which indicates whether or not the sequence in the current message is identical with the one included in the last message. Both of these signals appear early in the message so that there is time to decide, before the register bit-pair sequence is received, whether or not conference processing is to be used.

Conference processing, operation No. 13, is used, in processing every location except the R-th, if R's signalling and supervision message is being received and if all five of the following conditions co-exist:

a. R's current message includes a sequence of register bit-pairs and R's last message also included such a sequence.

b. The two sequences are identical.

c. The external registers store 11 at the R-th location.

d. P is in off-hook status and not in external-hold status.

R appears in the accessed call register.

Note that operation No. 13, conference processing, is not an alternative to normal processing or to any other operation described herein. As pointed out earlier, several processing operations may go on at the same time at the same location.

Operation No. 13

If the conditions, described above, required for conference processing are satisfied and if the relevant incoming register bit-pair (the Q-th bit-pair in R's message, when the Q-th location is being processed) is 11, the Q-th location is processed on a "conference" basis. Note that the incoming bit-pair is not entered in the external registers.

a. If Q appears in the disconnect register or in one or more call registers, nothing is done.
b. If Q does not appear in the disconnect register or in any of the call registers, it is placed in the accessed call register. At the same time, the break-in alert signal is turned on very briefly as a "conference alert" signal. This signal is heard by everybody involved in the call and serves as notification that the call is being conferenced. When, finally, it has again been returned off in every applique involved, cessation of the signal indicates that conferencing has been completed.

The register processor, from each location, sends either an enabling signal or a disabling signal to that portion of the applique which receives signals from the voice channels. An enabling signal, sent while the processor is operating at the Q-th location, gives the applique access to the receiving end of the Q-th voice channel. A disabling signal denies access. Either signal, once sent, remains in force until it is updated (not more than 5 milliseconds later) when the register processor again operates a the same location.

a. An enabling signaliis sent when all three of the following conditions co-exist:
  1. The applique is in off-hook status and not in external-hold status.
  2. Q appears in the accessed call register.
  3. 11 is stored, at the Q-th location, in the external registers (after updating, if the external registers are updated).
b. In any other situation, a disabling signal is sent.

We claim:

1. A communication system for audio information, said system comprising: a lineal transmission medium including a communication line, means time dividing the usage of said communication line into a number of time-division-multiplexed communication channels over which information may be transmitted on said communication line, said communication channels including at least one signalling and supervision channel and a plurality of audio communication channels, a plurality of appliques located along said transmission medium, means providing each of said appliques sending access to an exclusively associated one of said audio communication channels, means providing each of said appliques with receiving access to all of said audio communication channels and to said signalling and supervision channel, each of said appliques including a means for converting an audio information signal input thereto into a modulated pulse signal and for injecting said modulated pulse signal onto said communication line in said one exclusively associated audio communication channel to which it has sending access, each of said appliques also having a dial signal generator associated therewith for generating dial signals identifying a called applique, means responsive to the dial signals generated by a calling applique for producing a message on said signalling and supervision channel identifying both the calling applique and the called applique identified by said dial signals, means in each applique for receiving messages appearing on said signalling and supervision channel and operable in response to the receipt of a message identifying it as the called applique for detecting said message and controlling the receiving access of said called applique to said audio communication channels so as to enable said called applique to accept the modulated pulse signal appearing in the audio channel exclusively associated with the calling applique identified by said detected message.

2. A communication system as defined in claim 1 further characterized by some of said appliques being line appliques each of which serves to provide an interface between a respectively associated telephone and the system, and other of said appliques being trunk appliques each of which serves to provide an interface between a respectively associated telephone trunk line and the system.

3. A communication system as defined in claim 1 further characterized by said means for providing each of said appliques sending access to an exclusively associated one of said audio communication channels being such that each of said appliques has said exclusively associated one of said audio communication channels permanently assigned to it on a dedicated basis.

4. A communication system as defined in claim 1 further characterized by said means for time dividing the usage of said communication line including means for transmitting along with the information on said communication line a timing signal consisting of repetitive frames of pulses which pulses divide each frame into a number of time slots, each of said appliques having a send terminal connected to said communication line at one point along said transmission medium for said sending access and a receive terminal connected to said communication line at a second point along said transmission medium for said receiving access, a first counter in said applique for counting pulses taken from said transmission medium at said one point to identify said time slots, means responsive to the count of said first counter for controlling said sending access of said applique, a second counter in each applique for counting pulses taken from said transmission medium at said second point to identify said time slots, and means responsive to the count of said second counter for controlling said receiving access of said applique.

5. A communication system as defined in claim 1 further characterized by said communication channels also including a further channel in addition to said at least one signalling and supervision channel and said plurality of audio communication channels, at least one paging unit connected to said communication line and adapted to accept all audio communication signals appearing on said further channel and to convert such accepted signals into audible paging signals, a paging transmitter having receiving access to all of said audio communication channels and to said signalling and supervision channel, said paging transmitter including means responsive to signalling and supervision information transmitted thereto on said signalling and supervision channel from any one of said appliques for receiving audio communication signals from the audio channel assigned to said one applique and for injecting such received audio communication signals onto said further channel.

6. A communication system as defined in claim 1 further characterized by said means for producing a message on said signalling and supervision channel including means for causing said appliques to sequentially transmit on said signalling and communication channel messages concerning their status, and memory means in each applique for receiving and storing information obtained at least in part from said messages and indicating the call status of the associated applique with respect to each other one of said appliques.

7. A communication system for audio information comprising: a timing line, a communication line separate from said timing line, a timing signal generator for generating timing signals applied to said timing line and which timing signals divide time into repetitive frames of time slots, said time slots of each frame including at least one thereof assigned exlusively to signalling and supervision use and a plurality of other ones thereof assigned exclusively to audio communication use, and a plurality of appliques each connected to both said timing line and said communication line, said appliques each including a means controlled by said timing signals for inserting signalling and supervision information onto said communication line in said signalling and supervision time slots and a means controlled by said timing signals for extracting from said communication line the signalling and supervision information appearing in said signalling and supervision time slots, said appliques further including means responsive to the signalling and supervision information interexchanged by said appliques over said communication line in said signalling and supervision time slots for making and breaking talking path connections between said appliques, which talking path connections are made over said communication line in said audio communication time slots.

8. A communication system as defined in claim 7 further characterized by said communication line having a communication send portion and a communication receive portion electrically connected in series with one another, means in said communication line for limiting said communication signals to unidirectional flow in said communication send portion in the direction toward said communication receive portion and to unidirectional flow in said communication receive portion in the direction away from said communication send portion, said appliques each having a sending terminal connected to said communication send portion of said communication line for injecting communication signals onto said communication line and a receiving terminal connected to said communication receive portion of said communication line for extracting communication signals from said communication line so that any communication signal injected onto said communication line by any of said appliques passes the receiving terminals of all of said appliques and may be extracted from said communication line by any of said appliques.

9. A communication system as defined in claim 7 further characterized by said timing line and said communication line running parallel to one another, each of said lines having a send portion and a receive portion electrically connected in series with one another, means in said communication line for limiting said communication signals to unidirectional flow in said send portion of said communication line in the direction toward said receive portion of said communication line and to unidirectional flow in said receive portion of said communication line in the direction away from said send portion of said communication line, means in said timing line for limiting said timing signals to unidirectional flow in said send portion of said timing line in the direction toward said receive portion of said timing line and to unidirectional flow in said receive portion of said timing line in the direction away from said send portion of said timing line, said appliques each having a sending terminal connected to said send portion of said communication line for injecting communication signals onto said communication line and a receiving terminal connected to said receive portion of said communication line for extracting communication signals from said communication line, so that any communication signal injected onto said communication line by any of said appliques passes the receiving terminals of all of said appliques and may be extracted from said communication line by any of said appliques, each of said appliques further having a receive timing terminal connected to said receive portion of said timing line for extracting from said timing line timing signals used to time the extraction of communication signals from said communication line by said applique and a send timing terminal connected to said send portion of said timing line for extracting from said timing line timing signals used to time the injection of communication signals from said associated applique onto said communication line, said send timing terminal of each applique being connected to said timing line at a point adjacent to the point at which said sending terminal is connected to said communication line and said receive timing terminal being connected to said timing line at a point adjacent to the point at which said communication receive terminal is connected to said communication line so that a communication signal in traveling from the communication send terminal of a first one of said appliques to the communication receive terminal of a second one of said appliques travels the same distance along said communication line as does a timing signal along said timing line in traveling from the send timing terminal of said first applique to the receive timing terminal of said second applique.

10. A communication system as defined in claim 9 further characterized by said means for limiting said communication signals and said timing signals to unidirectional flow in the same direction along said communication line and said timing line comprising a plurality of signal regenerators located in said lines at spaced points therealong.

11. A communication system as defined in claim 10 further characterized by said signalling and supervision information being in the form of straight-edged pulses and the information transmitted in said audio communication time slots being in the form of straight-edged pulses whereby the information transmitted over said communication line both in said signalling and supervision time slots and in said audio communication time slots consists of straight-edged pulses, said regenerators for both said timing line and said communication line being pulse restorers for receiving slightly degenerated pulses, for restoring such received pulses to their original shape and for launching the reshaped pulses onto the following portion of the associated line.

12. A communication system for audio information comprising: a system clock, a transmission cable having a looped timing line and a looped communication line separate from said timing line and running parallel thereto, each of said lines having an outgoing leg connected to said system clock and outgoing therefrom and a return leg returning from the outer end of said cable to said system clock, a timing signal generator in said system clock for generating timing signals applied to said outgoing leg of said timing line and which timing signals divide time into repetitive frames of time slots used to divide the usage of said communicataion line into a plurality of time-division-multiplexed communication channels, said communication channels including one assigned exclusively to signalling and supervision use and a plurality of audio communication channels assigned exclusively to audio communication use, a plurality of appliques each having a communication receive terminal connected to said outgoing leg of said communication line and a communication receive terminal connected to said return leg of said communication line, each of said appliques also having a send timing terminal connected to said outgoing leg of said timing line and a receive timing terminal connected to said return leg of said timing line, means in each applique for producing status signals representing the current status of the applique, means timed by timing signals extracted from said outgoing leg of said timing line through said send timing terminal for injecting said status signals from each applique through said communication send terminal onto said outgoing leg of said communication line in said signalling and supervision channel thereof, means in each applique timed by timing signals extracted through said receive timing terminal thereof from said return leg of said timing line for extracting through said communication receive terminal thereof signals from said communication line which appear in said signalling and supervision channel, and said appliques further including means responsive to the status signals interexchanged by said appliques over said communication line in said signalling and supervision channel for making and breaking talking path connections between said appliques which talking path connections are made through said audio communication channels.

13. A communication system as defined in claim 12 further characterized by each of said appliques having a unique identifying address assigned to it, said system clock including a message scheduler which schedules message traffic on said signalling and supervision channel by sequentially transmitting onto said outgoing leg of said communication line, in said signalling and supervision channel thereof, a list of address words addressed to respective ones of said appliques, said appliques each including a means responsive to the receipt of an address word addressed to it to inject onto said communication line in said signalling and supervision channel information concerning its current status.

14. A communication system as defined in claim 13 further characterized by said system clock including at least one translator containing information usable by said appliques in making certain talking path connections between appliques, said system clock having a means for transmitting the information contained in said translator on said communication line in said signalling and supervision channel in addition to transmission of said list of address words.

15. In an electronic time-division-multiplexed communication system for audio information, the combination comprising: a timing signal transmission line and an audio signal transmission line, separate from said timing signal line, running parallel to each other and each having a first end and a second end, means for dictating unidirectional signal flow along the length of each of said lines in the electrical direction away from its first end and toward its second end, a timing signal generator for injecting timing signals onto said timing signal line at said first end thereof for propagation therealong to said second end thereof, a plurality of appliques each having an audio send terminal and an audio receive terminal both connected to said audio signal line, each of said appliques further having a send timing terminal and a receive timing terminal both connected to said timing signal line with the aforesaid terminals being so arranged that the signal propagation time along said timing signal line from the send timing terminal of any one of said appliques to the receive timing terminal of any other of said appliques is equal to the signal propagation time along said audio signal line from the audio send terminal of said one applique to the audio receive terminal of said other applique, means in each applique for injecting audio signals onto said audio signal line at times referenced to timing signals received through its send timing terminal, and means in each applique for extracting audio signals from said audio signal line at times referenced to timing signals received through its receive timing terminal.

16. In an electronic time-division-multiplexed communication system, the combination comprising: a linear transmission medium arranged in the form of a loop having a bight at one end of said loop and having two parallel legs of equal length disposed adjacent to one another, a timing signal generator connected to one end of said linear transmission medium for injecting timing signals onto said transmission medium, one of said legs of said linear transmission medium comprising a sending portion beginning at said timing signal generator and extending outwardly therefrom to said bight and the other of said legs comprising a receiving portion beginning at said bight, a plurality of appliques connected to said transmission medium and each including a means for injecting communication signals onto said transmission medium and a means for extracting communication signals from said transmission medium, said communication signal injecting means of each applique including a communication send terminal and a timing send terminal connected to said send portion of said transmission medium and said communication signal extracting means of each applique including a communication receive terminal and a receive timing terminal connected to said receive portion of said transmission medium, said communication signal injecting means of each applique including means responsive to the timing signal obtained from said transmission medium through its send timing terminal for timing the injection of communication signals onto said transmission medium, and said communication signal extracting means of each applique including means responsive to the timing signal obtained through its receive timing terminal for timing the extraction of communication signals from said transmission medium, and means in said transmission medium dictating unidirectional flow of said timing signals and of said communication signals along the length of said sending portion of said transmission medium in the direction away from said timing signal generator and toward said bight and along the length of said receiving portion of said transmission medium in the direction away from said bight.

17. A communication system comprising: a lineal transmission medium including a communication line, means time dividing the usage of said communication line into a number of time-division-multiplexed communication channels over which information may be transmitted on said communication line, said communication channels including at least one signalling and supervision channel and a plurality of audio communication channels, a plurality of appliques located along said transmission medium, means providing each of said appliques both sending and receiving access to said signalling and supervision channel of said communication line, means providing each of said appliques sending access to one of said audio communication channels, means providing each of said appliques with receiving access to all of said communication channels, and means in each applique for conditioning said applique to accept signals from any of said audio communication channels, said conditioning means including a first enabling means controlled directly by said applique for selectively enabling said applique to receive information from any of said audio communication channels and a second enabling means controlled by signalling and supervision information transmitted to said applique by others of said appliques for also selectively enabling said applique to receive information from any of said audio communication channels, said first and second enabling means being in series with one another so that both of said first and second enabling means need to be enabled with respect to any given one of said audio communication channels to condition said applique to accept signals from said one audio communication channel and whereby the completion of a talking path from a sending applique to a receiving applique is controlled both by the sending applique and the receiving applique.

18. A communication system as defined in claim 17 further characterized by said first and second enabling means each being capable of being simultaneously enabled with respect to a plurality of said audio communication channels whereby said applique may be conditioned to simultaneously accept signals from a plurality of said audio communication channels, and a summing demodulator in each applique for demodulating and summing a plurality of signals simultaneously accepted from a plurality of audio communication channels.

19. A communication system comprising: a lineal transmission medium including a communication line, means time dividing the usage of said communication line into a member of time-division multiplexed communication channels over which information may be transmitted on said communication line, said communication channels including at least one signalling and supervision channel and a plurality of audio communication channels, a plurality of appliques located along said transmission medium, means providing each of said appliques both sending and receiving access to said signalling and supervision channel of said communication line, means providing each of said appliques sending access to one of said audio communication channels, means providing each of said appliques with receiving access to all of said audio communication channels, a means for repetitively transmitting onto said signalling and supervision channel of said communication line a list of address words addressed to respective ones of said appliques, means in each applique responsive to the receipt of an address word addressed to it to inject onto said communication line immediately following such address word at least one other word indicating its current status, each address word and such at least one other word immediately following it forming a message, a memory means in each applique for receiving messages appearing on said communication line and for storing information received from said messages concerning the status of all other appliques, a plurality of audio communication sources each connected to a respective one of said appliques and each including a means for supplying control signals to its applique, and means in each applique responsive to the control signals supplied thereto by its audio communication source and by the information stored in its memory means for conditioning each applique to make and break talking path connections with others of said appliques 20. A communication system as defined in claim 19 further characterized by a translator means for transmitting onto said signalling and supervision channel of said communication line a list of messages usable by said appliques in making certain types of talking path connections.

21. A communication system comprising: a lineal transmission medium including a communication line, means time dividing the usage of said communication line into a number of time-division-multiplexed communication channels over which information may be transmitted on said communication line said means time dividing the usage of said communication line including means for transmitting on said transmission medium and along with the information on said communication line a timing signals consisting of repetitive frames of pulses, which pulses divide each frame into a number of time slots, said communication channels including a plurality of audio communication channels, a plurality of appliques located along said transmission medium, means providing each of said appliques sending access to one of said audio communication channels, means providing each of said appliques with receiving access to all of said audio communication channels, each of said appliques having a send terminal connected to said communication line at one point along said transmission medium for said sending access and a receive terminal connected to said communication line at a second point along said transmission medium for said receiving access, a first counter in each applique for counting pulses taken from said transmission medium at the associated said one point to identify said time slots, means in each applique responsive to the count of its said first counter for controlling its sending access to its associated one of said audio communication channels, a second counter in each applique for counting pulses taken from said transmission medium at the associated said second point to identify said time slots, and means in each applique responsive to the count of its said second counter for controlling the receiving access of said applique to said audio communication channels.

22. A communication system as defined in claim 21 further characterized by said means time dividing the usage of said communication line including a timing line running parallel to said communication line and comprising part of said transmission medium, said timing signal being transmitted on said timing line.

23. In an electronic time-division-multiplexed communication system, the combination comprising: a lineal transmission medium including a communication line, means time dividing the usage of said communication line into a number of time-division-multiplexed communication channels over which information may be transmitted on said communication line, said means time dividing the usage of said communication line including means for transmitting on said lineal transmission medium and along with the information on said communication line a timing signal consisting of repetitive frames of pulses, which pulses divide each frame into a number of time slots, said time slots of each frame including at least one thereof assigned to signalling and supervision use and a plurality of others assigned to audio communication use, each time slot assigned to audio communication usage as repeated in repetitive frames defining one of a plurality of said communication channels referred to as audio communication channels and the at least one time slot assigned to signalling and supervision usage as repeated in repetitive frames defining another of the aforementioned communication channels referred to as a signalling and supervision communication channel, a plurality of appliques each connected to said communication line, means providing each of said appliques with sending access to one of said audio communication channels, means providing each of said appliques with receiving access to all of said audio communication channels and to said signalling and supervision channel, means connected with said communication line and having sending access to said signalling and supervision channel for inserting signalling and supervision messages into said signalling and supervision channel, means in each of said appliques for receiving and utilizing the information transmitted over said signalling and supervision channel, audio utilization means connected to each applique for utilizing the information transmitted on any one of said audio communication channels, and means in each applique responsive to the received signalling and supervision messages for controlling said receiving access of such applique to said audio communication channels to cause such applique to receive and pass to its audio utilization means only information appearing on an audio communication channel identified in a signalling and supervision message received by such applique.

24. The combination defined in claim 23 further characterized by said means for inserting signalling and supervision messages into said signalling and supervision channel including a means for controlling the appearance of binary coded digital pulses in successive ones of the time slots of said signalling and supervision channel, each of said signalling and supervision messages consisting of a number of binary digits larger than the number of time slots of each of said frames devoted to signalling and supervision usage, whereby the transmission of a complete signalling and supervision message is carried out during the occurrence of a number of said frames.

25. The combination defined in claim 23 further characterized by said communication line having a first end and a second end and an intermediate point located between said first and second ends, means in said communication line dictating unidirectional signal flow along the length of said line in the electrical direction away from said first end and towards said second end, each of said appliques having a send terminal connected with said communication line through which said sending access to one of said audio communication channels is had, each of said appliques also having a receive terminal connected to said audio communication line through which receive terminals said receiving access to all of said audio communication channels and to said signalling and supervision channel is had, all of said sending terminals being connected to said communication line between said first end thereof and said intermediate point thereof and all of said receiving terminals being connected to said communication line between said intermediate point thereof and said second end thereof, and said means for inserting signalling and supervision messages into said signalling and supervision channel also being connected to said communication line between said first end thereof and said intermediate point thereof whereby all signals inserted into said audio communication channels through said send terminals and all signals inserted into said signalling and supervision channel by said signalling and supervision message inserting means pass all of said receive terminals and are available for reception by all of said appliques.

26. The combination defined in claim 23 further characterized by said means for inserting signalling and supervision messages into said signalling and supervision channel including a plurality of dial signal generators each associated with a respective one of said appliques and operable to produce dial signals identifying a called applique, and said means for inserting signalling and supervision messages also including means responsive to the dial signals generated by a calling applique for producing and injecting into said signalling and supervision channel a message identifying both the calling applique and the called applique, and means in each applique operable in response to the receipt of a signalling and supervision message identifying it as a called applique and also identifying another applique as a calling applique for controlling the receiving access of said called applique to said audio communication channel so as to enable said called applique to accept signals from the audio channel exclusively associated with the calling applique.

27. The combination defined in claim 15 further characterized by said timing signals of said timing signal generator comprising repetitive frames of pulses dividing time into repetitive frames of time slots, said means in each applique for injecting audio signals into said audio signal line including a first counter for counting pulses of said timing signal as received through said timing send terminal of said applique to identify said time slots, and said means in each applique for extracting audio signals from said audio signal line including a second counter separate from said first counter for counting pulses of said timing signal as received through said receive timing terminal to identify said time slots.

* * * * *